United States Patent [19]
Itou et al.

[11] Patent Number: 5,870,217
[45] Date of Patent: Feb. 9, 1999

[54] MULTI-WAVELENGTH OPTICAL BATCH AMPLIFICATION APPARATUS

[75] Inventors: Hiroyuki Itou, Sapporo; Kazuo Yamane; Michikazu Shima, both of Kawasaki, all of Japan

[73] Assignee: Fujitsu Limited, Kanagawa, Japan

[21] Appl. No.: 799,936

[22] Filed: Feb. 13, 1997

Related U.S. Application Data

[63] Continuation of Ser. No. 561,890, Nov. 22, 1995, abandoned.

[30] Foreign Application Priority Data

Mar. 20, 1995 [JP] Japan ................................ 7-061386

[51] Int. Cl.⁶ .................................................. H04B 10/16
[52] U.S. Cl. ........................ 359/179; 359/176; 359/161; 359/341
[58] Field of Search ................................... 359/179, 176, 359/177, 174, 173, 337, 341, 161

[56] References Cited

U.S. PATENT DOCUMENTS

| | | | |
|---|---|---|---|
| 5,396,360 | 3/1995 | Majima | 359/176 |
| 5,455,704 | 10/1995 | Mizuochi et al. | 359/176 |
| 5,500,756 | 3/1996 | Tsushima et al. | 359/174 |
| 5,502,810 | 3/1996 | Watanabe | 359/177 |
| 5,535,037 | 7/1996 | Yoneyama | 359/177 |
| 5,555,477 | 9/1996 | Tomooka et al. | 359/179 |
| 5,563,731 | 10/1996 | Azahi | 359/177 |

FOREIGN PATENT DOCUMENTS

| | | |
|---|---|---|
| 0 543 314 A2 | 5/1993 | European Pat. Off. . |
| 4275530 | 10/1992 | Japan . |
| 5110511 | 4/1993 | Japan . |
| 5337663 | 12/1993 | Japan . |
| 2268852 | 1/1994 | United Kingdom ................... 359/177 |
| 2 294 170 | 4/1996 | United Kingdom . |

OTHER PUBLICATIONS

Cable TV Sessions, Montreux, Jun. 10–15, 1993, No. Symp. 18, 11 Jun. 1993, Postes: Telephones Et Telegraphes Suisses, pp. 297–308, XP000379355, Eyberg R: "Cascaded Optical Fiber Amplifiers for Broadband CATV Transmission Systems", *abstract—p. 297*, * p. 299, line 1–line 8*, *optical amplifier—pp. 302 and 303*.

L'Onde Electrique, No. 2, Apr. 1993, Paris, France, pp. 24–19, XP000360312, Lemaire V. et al: "GIGA 5: Un Systeme De Transmission Sous–Marine Transoceanique A 5 Gbits/S Utilisant L'Amplification Optique", *abstract*, p. 28, column 1, line 12—column 2, line 31*.

(List continued on next page.)

Primary Examiner—Rafael Bacares
Attorney, Agent, or Firm—Helfgott & Karas, P.C.

[57] ABSTRACT

The invention provides a multi-wavelength optical batch amplification apparatus wherein, upon batch amplification of a multi-wavelength input optical signal, the powers of optical signals on the input and output sides of an optical amplifier are monitored totally or individually to control the powers of optical signals of the output optical signal of the optical amplifier so that they may be fixed equally. The apparatus includes an entire input light detection section for monitoring the power of the entire input optical signals on the input side of the optical amplifier, an individual output light detection section for monitoring the powers of the output optical signals on the output side of the optical amplifier, an optical amplifier output adjustment section for adjusting the output of the optical amplifier, and a control section for controlling the optical amplifier output adjustment section based on results of detection by the entire input light detection section and the individual output light detection section so that the powers of the output optical signals on the output side of the optical amplifier may be fixed equally.

32 Claims, 35 Drawing Sheets

OTHER PUBLICATIONS

Patent Abstracts of Japan, vol. 015, No. 036 (E–1027), 29 Jan. 1991, & Jp 02 273976 A (Nippon Telegr & Teleph Corp), 8 Nov. 1990, *abstract*.

Patent Abstracts of Japan, vol. 018, No. 148 (E–1522), 11 Mar. 1994 & JP 05 327662 A (Matsushita Electric Ind Co Ltd), 10 Dec. 1993, *abstract*.

Patent Abstracts of Japan, vol. 95, No. 001 & JP 07 030520 A (NEC Corp), 31 Jan. 1995, *abstract*.

IEEE Photonics Technology Letters, vol. 6, No. 5, 1 May 1994 pp. 629–631, XP000446979, Dentai A et al: "Electrically Tunable Semiconductor Fabry–Perot Filter", *abstract*.

(PRIOR ART) FIG. 33

MULTI-WAVELENGTH OPTICAL BATCH AMPLIFICATION APPARATUS

This is a continuation of application Ser. No. 08/561,890, filed Nov. 22, 1995, now abandoned.

BACKGROUND OF THE INVENTION

1. Field of the Invention

This invention relates to a multi-wavelength optical batch amplification apparatus.

2. Description of the Related Art

In an optical communication field in recent years, a technique of multiplexing and transmitting a plurality of input optical signals of different wavelengths has been and is being investigated energetically, and also development of a multi-wavelength optical batch amplification apparatus which amplifies a plurality of input optical signals of different wavelengths in a batch has been and is being performed rapidly.

Actually, however, the gain to input optical signal wavelength characteristic of an optical amplifier is not flat, and when a plurality of input optical signals having different wavelengths are amplified in a batch, the gains of the wavelengths of the input optical signals rely upon the total number, the wavelengths, the powers and so forth of input optical signals. Consequently, the optical amplifier exhibits a very complicated behavior.

Therefore, a multi-wavelength optical batch amplification apparatus is demanded which can amplify input optical signals having different wavelengths from each other in a batch so that the powers of output optical signals may equally exhibit a desired output value without being influenced by the conditions of the input optical signals.

FIG. 33 shows in block diagram a construction of an ordinary multi-wavelength optical batch amplification apparatus. Referring to FIG. 33, the multi-wavelength optical batch amplification apparatus shown includes a plurality of optical signal sources (E/O) 100-1 to 100-N (N is a natural number), a wavelength multiplexing (WDM) wave combiner 101, two couplers (CPL) 102 and 107, two isolators (ISO) 103 and 106, an erbium doped fiber (EDF) optical amplifier 104, a wave combiner 105, two photodiodes (PD) 109 and 110, a laser diode (LD) 111, and an automatic level control (ALC) circuit 112.

The optical signal sources 100-1 to 100-N output optical signals having different wavelengths $\lambda 1$ to $\lambda n$ (n being a natural number) from each other. The WDM wave combiner 101 combines the optical signals of the different wavelengths from the optical signal sources 100-1 to 100-N to multiplex them in wavelength. Each of the couplers 102 and 107 branches an optical signal inputted thereto.

Each of the isolators 103 and 106 removes, from an optical signal from the WDM wave combiner 101 or the wave combiner 105, noise components caused by an insertion loss of the WDM wave combiner 101 or the wave combiner 105 or by reflected light during transmission of the optical signal. The EDF optical amplifier 104 amplifies component optical signals of a wavelength multiplexed signal from the WDM wave combiner 101 in a batch to a desired power. The wave combiner 105 combines the output of the EDF optical amplifier 104 and the output of the laser diode 111.

Further, each of the photodiodes 109 and 110 produces an electric signal corresponding to the power of an optical signal branched by the coupler 102 or 107. The laser diode 111 generates pumping light to be combined with the output of the EDF optical amplifier 104 by the wave combiner 105. The ALC circuit 112 performs feedback control of the EDF optical amplifier 104 based on the outputs of the photodiodes 109 and 110 so that the output of the EDF optical amplifier 104 may be fixed.

In the multi-wavelength optical batch amplification apparatus having the construction described above, a plurality of optical signals having different wavelengths ($\lambda 1$ to $\lambda n$) from the optical signal sources 100-1 to 100-N are multiplexed in wavelength by the WDM wave combiner 101 and inputted by way of the coupler 102 and the isolator 103 to the EDF optical amplifier 104, by which the component optical signals of the wavelength multiplexed optical signal are amplified in a batch to a desired power.

The optical signal amplified by the EDF optical amplifier 104 in this manner is combined with pumping light from the laser diode 111 by the wave combiner 105 so that a wavelength multiplexed optical signal ($\lambda 1 + \lambda 2 + \ldots + \lambda n$) wherein the optical signals are individually amplified to the desired power is obtained by way of the isolator 106 and the coupler 107.

By the way, the optical signal branched by the coupler 107 is converted into an electric signal corresponding to the total power of the component optical signals of the output optical signal then by the photodiode 110, and the electric signal is inputted to the ALC circuit 112. The ALC circuit 112 controls the output of the laser diode 111 based on the output of the photodiode 110, that is, based on the total power of the output optical signal, to perform feedback control so that the output of the EDF optical amplifier 104 may be fixed. It is to be noted that also the optical signal branched by the coupler 102 is converted into an electric signal in accordance with the power of the optical signal by the photodiode 109, and the electric signal is inputted to the ALC circuit 112. In this instance, the electric signal is supplied as input light interruption information of the output of zero when an input optical signal or signals are interrupted.

However, with the multi-wavelength optical batch amplifier described above, since the power control of an output optical signal is formed by way of ALC control of the total power of the component optical signals of the output optical signal having the wavelengths from $\lambda 1$ to $\lambda n$, when some of the input optical signals enter into an interrupted condition, the output optical signal varies per one wave by $$\Delta P = 10 \cdot \log[K/(K-F)] \quad (1)$$

where K is an initial number of signals, and F is a number of interrupted signals. In this instance, it is assumed that the EDF optical amplifier 104 has no wavelength characteristic.

In particular, for example, when three optical signals of wavelengths $\lambda 1$ to $\lambda 3$ are being outputted equally with a desired output power as seen in FIG. 34(a), if the input optical signal of the wavelength $\lambda 3$ enters into an interrupted condition, then the powers of the other output optical signals of the wavelengths $\lambda 1$ and $\lambda 2$ rise as seen in FIG. 34(b). Then, if also the input optical signal of the wavelength 12 enters into an interrupted condition, then the power of the output optical signal of the wavelength $\lambda 1$ further rises as seen in FIG. 34(c). Consequently, no output optical signal of the desired power can be obtained any more.

Also multi-wavelength optical batch amplification apparatus have been proposed which can suppress such variation of the output optical signal power per one wave as described above. An exemplary one of multi-wavelength optical batch amplification apparatus of the type just mentioned is shown in FIG. 35. Referring to FIG. 35, the multi-wavelength optical batch amplification apparatus shown includes, in addition to a plurality of optical signal sources 100-1 to 100-N, an optical signal source 100-M (M>N) which outputs a control optical signal having a wavelength $\lambda m$ (m>n). When one of the input optical signals enters into an interrupted condition, the variation of the output optical signal power per one wave is suppressed using the control optical signal from the optical signal source 100-M. It is to be noted that, in FIG. 35, those elements denoted by like reference characters to those of FIG. 33 are similar to those described hereinabove with reference to FIG. 33.

However, the multi-wavelength optical batch amplification apparatus described hereinabove with reference to FIG. 33 as well as the multi-wavelength optical batch amplification apparatus described hereinabove with reference to FIG. 35 are disadvantageous in several points. In particular, the multi-wavelength optical batch amplification apparatus shown in FIG. 33 is disadvantageous in that it is low in resisting property to a power variation (including an interrupted condition) of input optical signals. In particular, if all of the input optical signals of the wavelengths from $\lambda 1$ to $\lambda n$ exhibit variations by an equal level, then the output powers of the component optical signals of the output optical signals can be made equal to each other to some degree, but in any other case, it is almost impossible to make the output powers of the component optical signals of the output optical signal equal to each other.

Meanwhile, with the multi-wavelength optical batch amplification apparatus shown in FIG. 35, the output power variations of component optical signals of an output optical signal which occur when some of input optical signals enter into an interrupted condition can be suppressed to some degree using the control input optical signal (wavelength $\lambda m$) from the optical signal source 100-M. However, if the control optical signal enters into an interrupted condition, then the power control of the output optical signal is still disabled.

It seems a possible idea to use the control optical signal of the wavelength $\lambda m$ as an optical signal for exclusive use for controlling the output optical signal power. However, from the object of wavelength multiplexing which is employed in order to assure an enlarged transmission capacity, it should be avoided to use one wavelength only for output control in this manner.

Further, the multi-wavelength optical batch amplification apparatus are effective only when it is assumed that, upon multi-wavelength batch amplification by the EDF optical amplifier 104, the gain tilt thereof is free from input optical signal wavelength dependency, input optical signal power dependency and pumping light power dependency. In any other case, however, it is very difficult to control the output optical signal powers of different wavelengths strictly equal to each other.

SUMMARY OF THE INVENTION

It is an object of the present invention to provide a multi-wavelength optical batch amplification apparatus wherein, upon batch amplification of a plurality of input optical signals having different wavelengths from each other, the powers of optical signals on the input side and the output side of an optical amplifier are monitored totally or individually to control the powers of optical signals of the output optical signal on the output side of the optical amplifier uniformly to an equal level.

In order to attain the object described above, according to an aspect of the present invention, there is provided a multi-wavelength optical batch amplification apparatus, comprising a plurality of optical signal sources for outputting a plurality of optical signals having different wavelengths from each other, a plurality of optical signal input lines for transmitting the optical signals of the different wavelengths from the optical signal sources, a wave combiner for combining the input optical signals from the optical signal input lines into a multi-wavelength optical signal, an optical amplifier for amplifying the multi-wavelength optical signal from the wave combiner in a batch, entire input light detection means for monitoring a power of the entire input optical signals on the input side of the optical amplifier, individual output light detection means for monitoring a power of the output optical signal on the output side of the optical amplifier for the individual different wavelengths, optical amplifier output adjustment means for adjusting the output of the optical amplifier, and control means for controlling the optical amplifier output adjustment means based on results of detection by the entire input light detection means and the individual output light detection means so that the power of the output optical signal on the output side of the optical amplifier may be fixed equally for the individual different wavelengths.

According to another aspect of the present invention, there is provided a multi-wavelength optical batch amplification apparatus, comprising a plurality of optical signal sources for outputting a plurality of optical signals having different wavelengths from each other, a plurality of optical signal input lines for transmitting the optical signals of the different wavelengths from the optical signal sources, a wave combiner for combining the input optical signals from the optical signal input lines into a multi-wavelength optical signal, an optical amplifier for amplifying the multi-wavelength optical signal from the wave combiner in a batch, individual input light detection means for monitoring powers of the input optical signals on the input side of the optical amplifier, entire output light detection means for monitoring a power of the entire output optical signal on the output side of the optical amplifier, optical amplifier output adjustment means for adjusting the output of the optical amplifier, and control means for controlling the optical amplifier output adjustment means based on results of detection by the individual input light detection means and the entire output light detection means so that the power of the output optical signal on the output side of the optical amplifier may be fixed equally for the individual different wavelengths.

According to a further aspect of the present invention, there is provided a multi-wavelength optical batch amplification apparatus, comprising a plurality of optical signal sources for outputting a plurality of optical signals having different wavelengths from each other, a plurality of optical signal input lines for transmitting the optical signals of the different wavelengths from the optical signal sources, a wave combiner for combining the input optical signals from the optical signal input lines into a multi-wavelength optical signal, an optical amplifier for amplifying the multi-wavelength optical signal from the wave combiner in a batch, individual input light detection means for monitoring powers of the input optical signals on the input side of optical amplifier, individual output light detection means for monitoring a power of the output optical signal on the output side of the optical amplifier for the individual different wavelengths, optical amplifier output adjustment means for adjusting the output of the optical amplifier, and control means for controlling the optical amplifier output adjustment means based on results of detection by the individual input light detection means and the individual output light detection means so that the power of the output optical signal on the output side of the optical amplifier may be fixed equally for the individual different wavelengths.

Accordingly, with the multi-wavelength optical batch amplification apparatus according to the aspects of the present invention described above, since the power of the output optical signal can be controlled so that it may be fixed equally for the individual different wavelengths, they are advantageous in that, when the power of an optical signal of a certain wavelength from among the input optical signals drops, an output optical signal having an equal power can be obtained for the different wavelengths.

According to a still further aspect of the present invention, there is provided a multi-wavelength optical batch amplification apparatus, comprising a plurality of optical signal sources for outputting a plurality of optical signals having different wavelengths from each other, a plurality of optical signal input lines for transmitting the optical signals of the different wavelengths from the optical signal sources, a wave combiner for combining the input optical signals from the optical signal input lines into a multi-wavelength optical signal, an optical amplifier for amplifying the multi-wavelength optical signal from the wave combiner in a batch, individual input light detection means including a tunable optical filter for monitoring powers of the input optical signals on the input side of the optical amplifier, optical amplifier output adjustment means for adjusting the output of the optical amplifier, and control means for controlling the optical amplifier output adjustment means based on a result of detection by the individual input light detection means so that the power of the output optical signal on the output side of the optical amplifier may be fixed equally for the individual different wavelengths.

Accordingly, with the multi-wavelength optical batch amplification apparatus according to the aspect of the present invention just described, since the power of the output optical signal on the output side of the optical amplifier can be controlled so that it may be fixed equally for the individual different wavelengths, it is advantageous in that, when the power of an optical signal of a certain wavelength from among the input optical signals drops, an output optical signal having an equal power can be obtained for the different wavelengths with a simpler construction.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENTS a. Aspects of the Invention

Different aspects of the present invention will be described prior to description of several preferred embodiments of the present invention.

Figure 1:
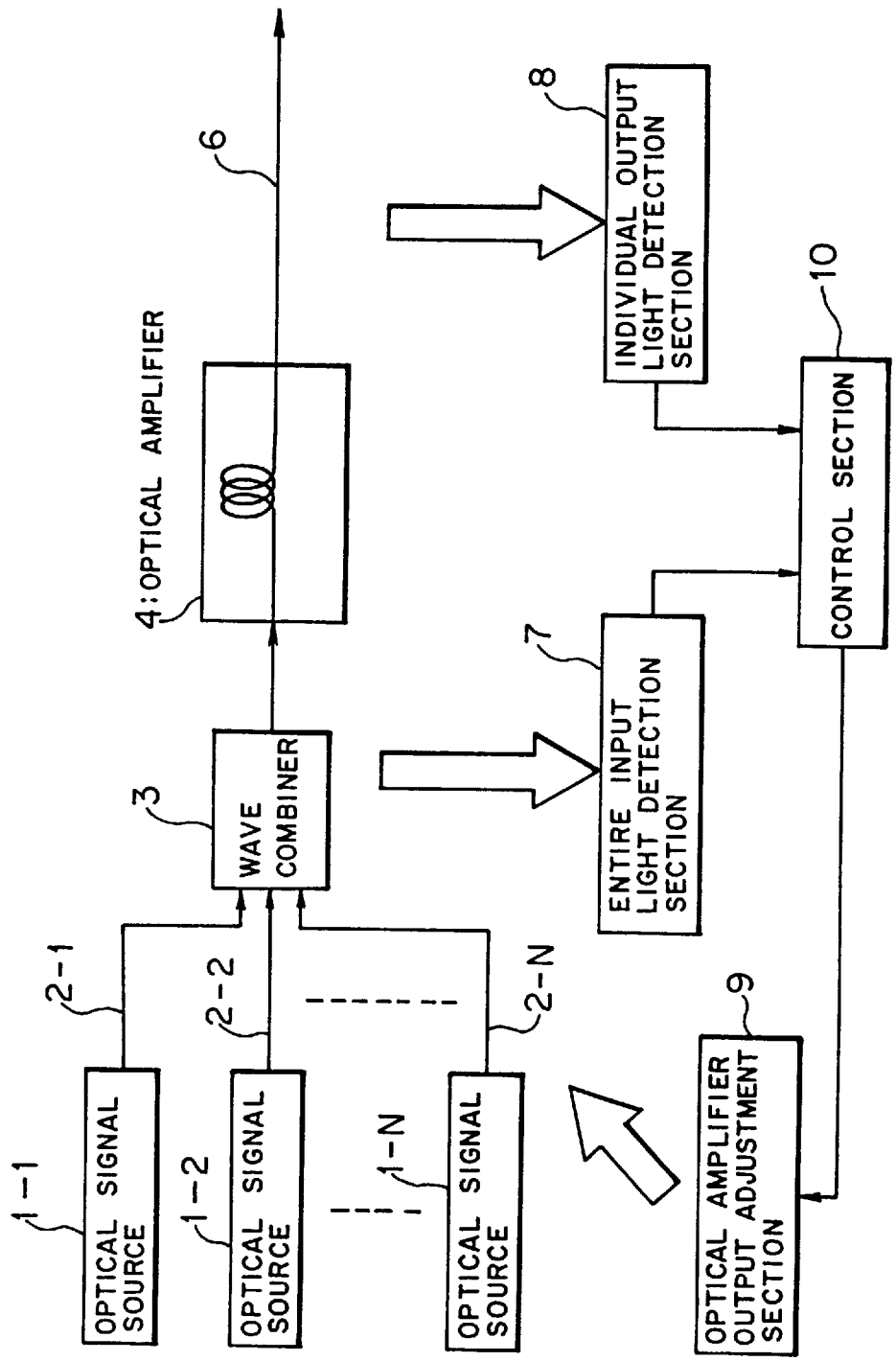
FIGS. 1 to 4 are block diagrams illustrating different aspects of the present invention.

Referring first to FIG. 1, there is shown in block diagram a multi-wavelength optical batch amplification apparatus according to a first aspect of the present invention. The multi-wavelength optical batch amplification apparatus shown includes a plurality of optical signal sources 1-1 to 1-N (N is a natural number) for outputting a plurality of optical signals having different wavelengths from each other, a plurality of optical signal input lines 2-1 to 2-N for transmitting the optical signals of the different wavelengths from the optical signal sources 1-1 to 1-N, respectively, a wave combiner 3, an optical amplifier 4, and an optical signal output line 6.

The multi-wavelength optical batch amplification apparatus further includes an entire input light detection section 7, an individual output light detection section 8, an optical amplifier output adjustment section 9, and a control section 10.

The wave combiner 3 combines input optical signals from the optical signal input lines 2-1 to 2-N into a multi-wavelength optical signal, and the optical amplifier 4 amplifies the multi-wavelength optical signal from the wave combiner 3 in a batch.

The entire input light detection section 7 monitors the power of entire input optical signals on the input side of the optical amplifier 4. The individual output light detection section 8 monitors the power of an output optical signal on the output side of the optical amplifier 4 for the individual different wavelengths. The optical amplifier output adjustment section 9 adjusts the output of the optical amplifier 4. The control section 10 controls the optical amplifier output adjustment section 9 based on results of detection by the entire input light detection section 7 and the individual output light detection section 8 so that the power of the output optical signal on the output side of the optical amplifier 4 may be fixed equally for the individual different wavelengths.

In the multi-wavelength optical batch amplification apparatus described above, a plurality of input optical signals having different wavelengths from each other from the optical signal sources 1-1 to 1-N are transmitted through the optical signal input lines 2-1 to 2-N, respectively, and combined into a multi-wavelength optical signal by the wave combiner 3. The multi-wavelength optical signal is amplified in a batch by the optical amplifier 4.

In this instance, the entire input light detection section 7 monitors the power of the entire input optical signals on the input side of the optical amplifier 4 while the individual output light detection section 8 monitors the power of the output optical signal on the output side of the optical amplifier 4 for the individual different wavelengths. The control section 10 controls the optical amplifier output adjustment section 9 based on results of the detection so that the power of the output optical signal on the output side of the optical amplifier 4 is fixed equally for the individual different wavelengths.

More particularly, the individual output light detection section 8 includes a tunable optical filter to monitor the power of the output optical signal on the output side of the optical amplifier 4 for the individual different wavelengths. However, the individual output light detection section 8 may alternatively monitor the powers of optical signals separated from the output optical signal on the output side of the optical amplifier 4.

Where the individual output light detection section 8 is constructed particularly as described above, the power of the output optical signal on the output side of the optical amplifier 4 is monitored for the individual different wavelengths by the tunable optical filter. Or, the powers of optical signals separated from the output optical signal on the output side of the optical amplifier 4 can be monitored.

Meanwhile, the optical amplifier output adjustment section 9 particularly includes a pumping light source for the optical amplifier 4, and the control section 10 controls the pumping light source based on results of detection by the entire input light detection section 7 and the individual output light detection section 8 so that the power of the output optical signal on the output side of the optical amplifier 4 may be fixed equally for the individual different wavelengths.

In this instance, the control section 10 controls the pumping light source based on results of detection by the entire input light detection section 7 and the individual output light detection section 8. Consequently, the power of the output optical signal on the output side of the optical amplifier 4 can be fixed equally for the individual different wavelengths Alternatively, the optical amplifier output adjustment section 9 may include an optical signal attenuation section provided for the optical signal input lines 2-1 to 2-N. In this instance, the control section 10 controls the optical signal attenuation section based on the results of detection by the entire input light detection section 7 and the individual output light detection section 8 so that the power of the output optical signal on the output side of the optical amplifier 4 may be fixed equally for the individual different wavelengths.

In this instance, the control section 10 controls the optical signal attenuation section based on the results of detection by the entire input light detection section 7 and the individual output light detection section 8. Consequently, the power of the output optical signal on the output side of the optical amplifier 4 can be fixed equally for the individual different wavelengths.

The optical signal sources 1-1 to 1-N may individually be formed as adjustable output optical signal sources which serve also as the optical amplifier output adjustment section 9. In this instance, the control section 10 controls the adjustable output optical signal sources based on the results of detection by the entire input light detection section 7 and the individual output light detection section 8 so that the power of the output optical signal on the output side of the optical amplifier 4 may be fixed equally for the individual different wavelengths.

In this instance, the control section 10 controls the adjustable output optical signal sources based on the results of detection by the entire input light detection section 7 and the individual output light detection section 8. Consequently, the power of the output optical signal on the output side of the optical amplifier 4 can be fixed equally for the individual different wavelengths.

The optical amplifier output adjustment section 9 may include a plurality of optical signal attenuation sections for individually adjusting attenuation factors of optical signals separated from the output optical signal on the output side of the optical amplifier 4. In this instance, the control section 10 controls the optical signal attenuation sections based on the results of detection by the entire input light detection section 7 and the individual output light detection section 8 so that the power of the output optical signal on the output side of the optical amplifier 4 may be fixed equally for the individual different wavelengths.

In this instance, the control section 10 controls the optical signal attenuation sections based on the results of detection by the entire input light detection section 7 and the individual output light detection section 8. Consequently, the power of the output optical signal on the output side of the optical amplifier 4 can be fixed equally for the individual different wavelengths.

Figure 2:
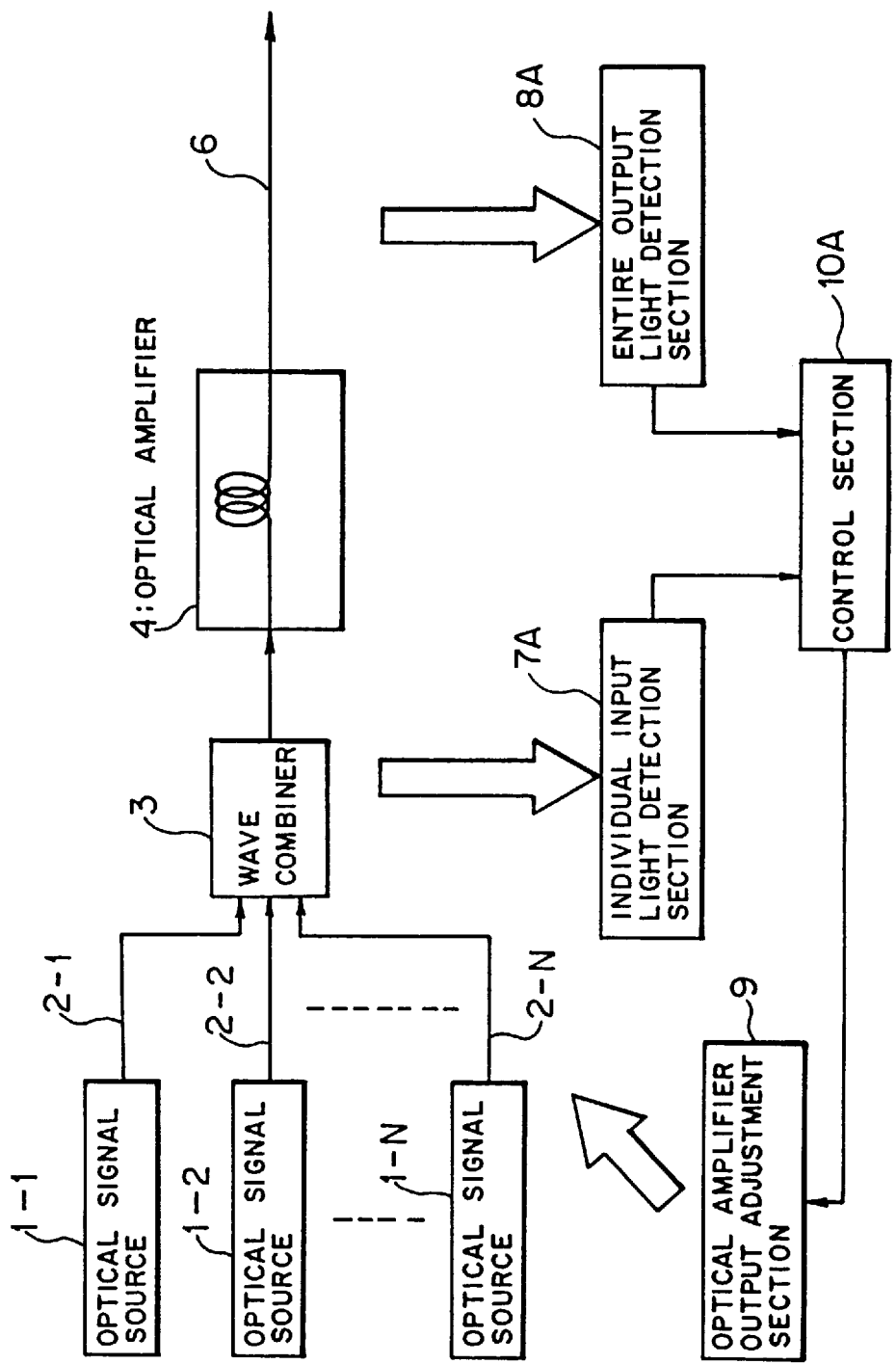

Referring now to FIG. 2, there is shown in block diagram a multi-wavelength optical batch amplification apparatus according to a second aspect of the present invention. The multi-wavelength optical batch amplification apparatus shown includes a plurality of optical signal sources 1-1 to 1-N (N is a natural number) for outputting a plurality of optical signals having different wavelengths from each other, a plurality of optical signal input lines 2-1 to 2-N for transmitting the optical signals of the different wavelengths from the optical signal sources 1-1 to 1-N, respectively, a wave combiner 3, an optical amplifier 4, an optical signal output line 6, an individual input light detection section 7A, an entire output light detection section 8A, an optical amplifier output adjustment section 9 which is similar to that described hereinabove with reference to FIG. 1, and a control section 10A.

The individual input light detection section 7A monitors the powers of the input optical signals on the input side of the optical amplifier 4. The entire output light detection section 8A monitors the power of an entire output optical signal on the output side of the optical amplifier 4. The optical amplifier output adjustment section 9 adjusts the output of the optical amplifier 4.

The control section 10A controls the optical amplifier output adjustment section 9 based on results of detection by the individual input light detection section 7A and the entire output light detection section 8A so that the power of the output optical signal on the output side of the optical amplifier 4 may be fixed equally for the individual different wavelengths.

In the multi-wavelength optical batch amplification apparatus of FIG. 2 described above, a plurality of input optical signals having different wavelengths from each other from the optical signal sources 1-1 to 1-N are amplified in a batch by the optical amplifier 4. In this instance, the individual input light detection section 7A monitors the powers of the individual input optical signals on the input side of the optical amplifier 4 while the entire output light detection section 8A monitors the power of the entire output optical signal on the output side of the optical amplifier 4. The control section 10A controls the optical amplifier output adjustment section 9 based on results of the detection. Consequently, the power of the output optical signal on the output side of the optical amplifier 4 can be fixed equally for the individual different wavelengths.

Also in the multi-wavelength optical batch amplification apparatus described above, the individual input light detection section 7A may include a tunable optical filter to monitor the powers of the input optical signals on the input side of the optical amplifier 4. Alternatively, however, the individual input light detection section 7A may monitor the powers of the input optical signals from the optical signal sources 1-1 to 1-N or the optical signal input lines 2-1 to 2-N.

Where the individual input light detection section 7A is constructed particularly as described above, the powers of the input optical signals on the input side of the optical amplifier 4 are monitored by the tunable optical filter of the individual input light detection section 7A. Or, the powers of the input optical signals from the optical signal sources 1-1 to 1-N or the optical signal input lines 2-1 to 2-N are monitored by the individual input light detection section 7A.

The optical amplifier output adjustment section 9 may include a pumping light source for the optical amplifier 4. In this instance, the control section 10A controls the pumping light source based on the results of detection by the individual input light detection section 7A and the entire output light detection section 8A so that the power of the output optical signal on the output side of the optical amplifier 4 may be fixed equally for the individual different wavelengths.

In this instance, the control section 10A controls the pumping light source based on the results of detection by the individual input light detection section 7A and the entire output light detection section 8A. Consequently, the power of the output optical signal on the output side of the optical amplifier 4 can be fixed equally for the individual different wavelengths.

Alternatively, the optical amplifier output adjustment section 9 may include an optical signal attenuation section provided for the optical signal input lines 2-1 to 2-N. In this instance, the control section 10A controls the optical signal attenuation section based on the results of detection by the individual input light detection section 7A and the entire output light detection section 8A so that the power of the output optical signal on the output side of the optical amplifier 4 may be fixed equally for the individual different wavelengths.

In this instance, the control section 10A controls the optical signal attenuation section based on the results of detection by the individual input light detection section 7A and the entire output light detection section 8A. Consequently, the power of the output optical signal on the output side of the optical amplifier 4 can be fixed equally for the individual different wavelengths.

Or, the optical signal sources 1-1 to 1-N may individually be formed as adjustable output optical signal sources which serve also as the optical amplifier output adjustment section 9. In this instance, the control section 10A controls the adjustable output optical signal sources based on the results of detection by the individual input light detection section 7A and the entire output light detection section 8A so that the power of the output optical signal on the output side of the optical amplifier 4 may be fixed equally for the individual different wavelengths.

In this instance, the control section 10A controls the adjustable output optical signal sources based on the results of detection by the individual input light detection section 7A and the entire output light detection section 8A. Consequently, the power of the output optical signal on the output side of the optical amplifier 4 can be fixed equally for the individual different wavelengths.

Or else, the optical amplifier output adjustment section 9 may include a plurality of optical signal attenuation sections for individually adjusting attenuation factors of optical signals separated from the output optical signal on the output side of the optical amplifier 4. In this instance, the control section 10A controls the optical signal attenuation sections based on the results of detection by the individual input light detection section 7A and the entire output light detection section 8A so that the power of the output optical signal on the output side of the optical amplifier 4 may be fixed equally for the individual different wavelengths.

In this instance, the control section 10A controls the optical signal attenuation sections based on the results of detection by the individual input light detection section 7A and the entire output light detection section 8A. Consequently, the power of the output optical signal on the output side of the optical amplifier 4 cam be fixed equally for the individual different wavelengths.

Figure 3:
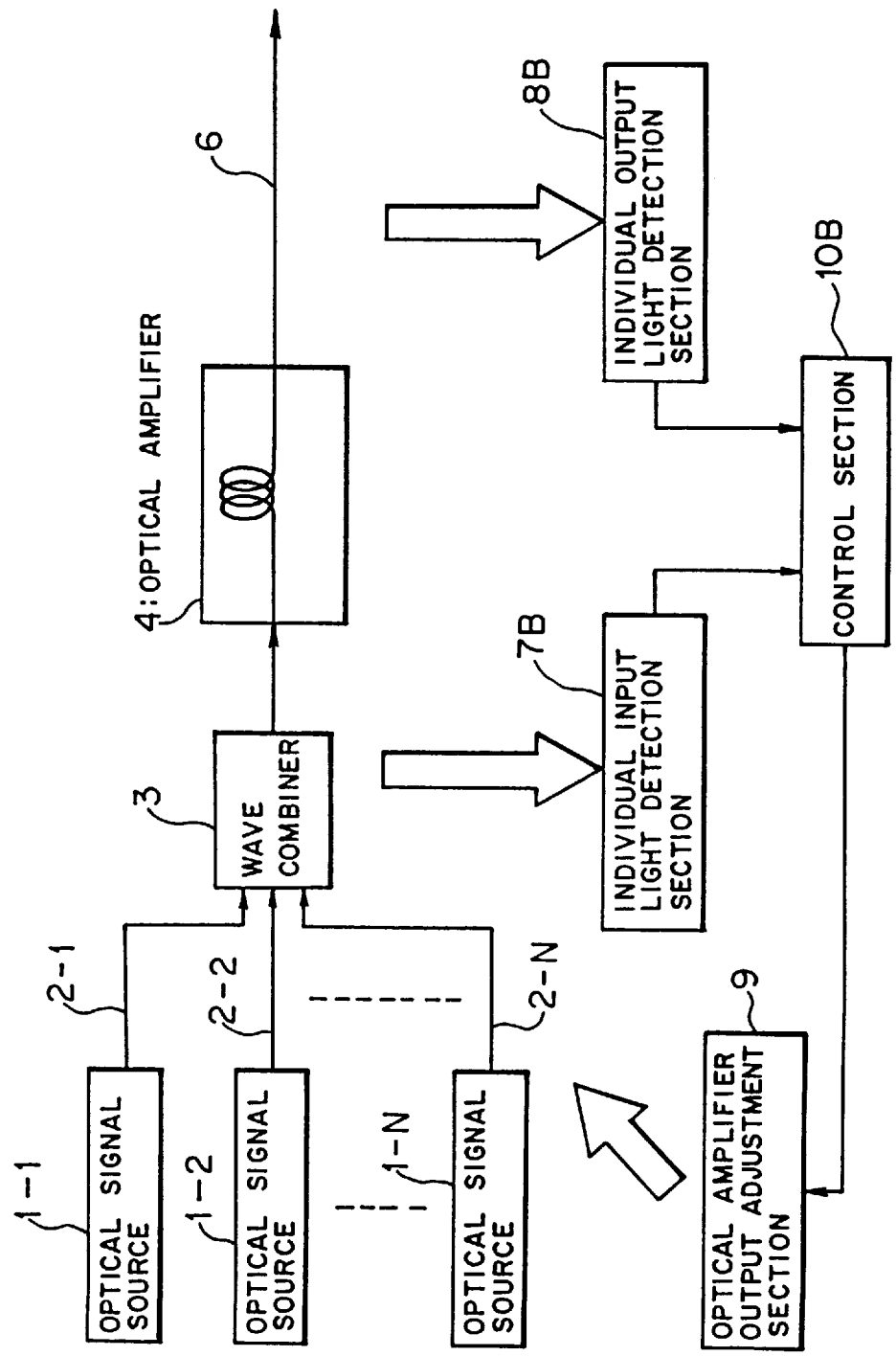

Referring now to FIG. 3, there is shown in block diagram a multi-wavelength optical batch amplification apparatus according to a third aspect of the present invention. Also the multi-wavelength optical batch amplification apparatus shown includes a plurality of optical signal sources 1-1 to 1-N (N is a natural number) for outputting a plurality of optical signals having different wavelengths from each other, a plurality of optical signal input lines 2-1 to 2-N for transmitting the optical signals of the different wavelengths from the optical signal sources 1-1 to 1-N, respectively, a wave combiner 3, an optical amplifier 4, and an optical signal output line 6.

The multi-wavelength optical batch amplification apparatus further includes an individual input light detection section 7B, an individual output light detection section 8B, an optical amplifier output adjustment section 9, and a control section 10B.

The individual input light detection section 7B monitors the powers of input optical signals on the input side of optical amplifier 4. The individual output light detection section 8B monitors the power of an output optical signal on the output side of the optical amplifier 4 for the individual different wavelengths. The optical amplifier output adjustment section 9 adjusts the output of the optical amplifier 4. The control section 10B controls the optical amplifier output adjustment section 9 based on results of detection by the individual input light detection section 7B and the individual output light detection section 8B so that the power of the output optical signal on the output side of the optical amplifier 4 may be fixed equally for the individual different wavelengths.

Also in the multi-wavelength optical batch amplification apparatus of FIG. 3 described above, a plurality of optical signals having different wavelengths from each other from the optical signal sources 1-1 to 1-N are amplified in a batch by the optical amplifier 4. In this instance, the individual input light detection section 7B monitors the powers of the individual input optical signals on the input side of the optical amplifier 4 while the individual output light detection section 8B monitors the power of the output optical signal for the individual different wavelengths on the output side of the optical amplifier 4. The control section 10B controls the optical amplifier output adjustment section 9 based on results of the detection. Consequently, the power of the output optical signal on the output side of the optical amplifier 4 can be fixed equally for the individual different wavelengths.

More particularly, the individual input light detection section 7B includes a tunable optical filter for monitoring powers of the input optical signals on the input side of the optical amplifier 4. Alternatively, however, the individual input light detection section 7B may monitor the powers of the input optical signals from the optical signal sources 1-1 to 1-N or the optical signal input lines 2-1 to 2-N.

Where the individual input light detection section 7B is constructed particularly as described above, the powers of the input optical signals on the input side of the optical amplifier 4 are monitored by the tunable optical filter of the individual input light detection section 7B. Or, the powers of the input optical signals from the optical signal sources 1-1 to 1-N or the optical signal input lines 2-1 to 2-N are monitored by the individual input light detection section 7B.

Meanwhile, the individual output light detection section 8B may include a tunable optical filter for monitoring the powers of the output optical signal on the output side of the optical amplifier 4 for the individual different wavelengths. Alternatively, however, the individual output light detection section 8B may monitor the powers of optical signals separated from the output optical signal on the output side of the optical amplifier 4.

Where the individual output light detection section 8B is constructed in such a manner as described above, the powers of the output optical signal on the output side of the optical amplifier 4 are monitored for the individual different wavelengths by the tunable optical filter. Or, the powers of optical signals separated from the output optical signal on the output side of the optical amplifier 4 can be monitored by the individual output light detection section 8B.

The optical amplifier output adjustment section 9 particularly includes a pumping light source for the optical amplifier 4. In this instance, the control section 10B controls the pumping light source based on the results of detection by the individual input light detection section 7B and the individual output light detection section 8B so that the power of the output optical signal on the output side of the optical amplifier 4 may be fixed equally for the individual different wavelengths.

In this instance, the control section 10B controls the pumping light source based on the results of detection by the individual input light detection section 7B and the individual output light detection section 8B. Consequently, the power of the output optical signal on the output side of the optical amplifier 4 can be fixed equally for the individual different wavelengths.

Alternatively, the optical amplifier output adjustment section 9 may include an optical signal attenuation section provided for the optical signal input lines 2-1 to 2-N. In this instance, the control section 10B controls the optical signal attenuation section based on the results of detection by the individual input light detection section 7B and the individual output light detection section 8B so that the power of the output optical signal on the output side of the optical amplifier 4 may be fixed equally for the individual different wavelengths.

In this instance, the control section 10B controls the optical signal attenuation section based on the results of detection by the individual input light detection section 7B and the individual output light detection section 8B. Consequently, the power of the output optical signal on the output side of the optical amplifier 4 can be fixed equally for the individual different wavelengths.

Or, the optical signal sources 1-1 to 1-N may individually be formed as adjustable output optical signal sources which serve also as the optical amplifier output adjustment section 9. In this instance, the control section 10B controls the adjustable output optical signal sources based on the results of detection by the individual input light detection section 7B and the individual output light detection section 8B so that the power of the output optical signal on the output side of the optical amplifier 4 may be fixed equally for the individual different wavelengths.

In this instance, the control section 10B controls the adjustable output optical signal sources based on the results of detection by the individual input light detection section 7B and the individual output light detection section 8B. Consequently, the power of the output optical signal on the output side of the optical amplifier 4 can be fixed equally for the individual different wavelengths.

Or else, the optical amplifier output adjustment section 9 may include a plurality of optical signal attenuation sections for individually adjusting attenuation factors of optical signals separated from the output optical signal on the output side of the optical amplifier 4. In this instance, the control section 10B controls the optical signal attenuation sections based on the results of detection by the individual input light detection section 7B and the individual output light detection section 8B so that the power of the output optical signal on the output side of the optical amplifier 4 may be fixed equally for the individual different wavelengths.

In this instance, the control section 10B controls the optical signal attenuation sections based on the results of detection by the individual input light detection section 7B and the individual output light detection section 8B. Consequently, the power of the output optical signal on the output side of the optical amplifier 4 can be fixed equally for the individual different wavelengths.

Figure 4:
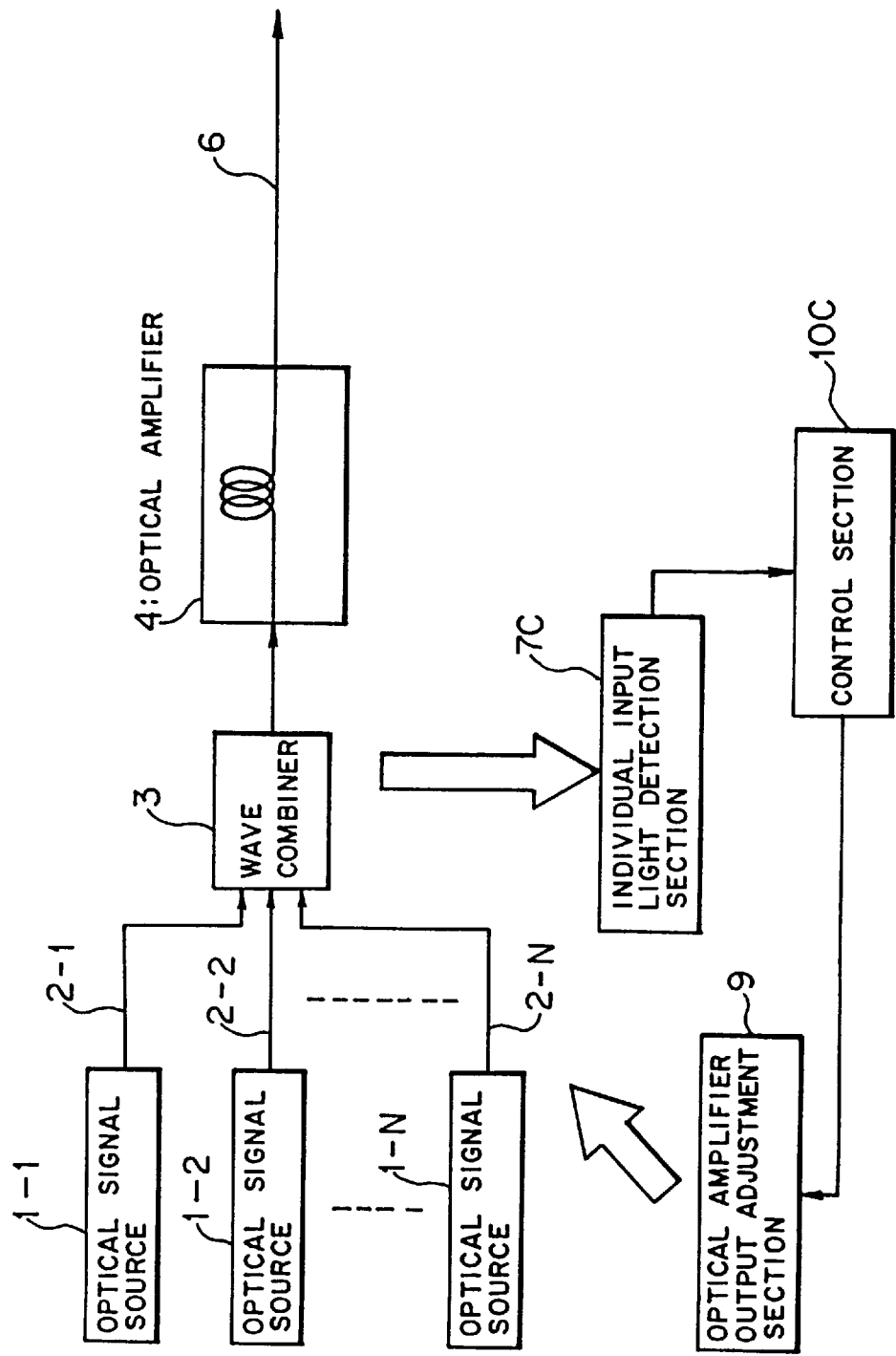

Referring now to FIG. 4, there is shown in block diagram a multi-wavelength optical batch amplification apparatus according to a fourth aspect of the present invention. Also the multi-wavelength optical batch amplification apparatus shown includes a plurality of optical signal sources 1-1 to 1-N (N is a natural number) for outputting a plurality of optical signals having different wavelengths from each other, a plurality of optical signal input lines 2-1 to 2-N for transmitting the optical signals of the different wavelengths from the optical signal sources 1-1 to 1-N, respectively, a wave combiner 3, an optical amplifier 4, and an optical signal output line 6.

The multi-wavelength optical batch amplification apparatus further includes an individual input light detection section 7C, an optical amplifier output adjustment section 9, and a control section 10C.

The individual input light detection section 7C includes a tunable optical filter to monitor the powers of input optical signals on the input side of the optical amplifier 4. The optical amplifier output adjustment section 9 adjusts the output of the optical amplifier 4. The control section 10C controls the optical amplifier output adjustment section 9 based on a result of detection by the individual input light detection section 7C so that the power of the output optical signal on the output side of the optical amplifier 4 may be fixed equally for the individual different wavelengths.

Also in the multi-wavelength optical batch amplification apparatus of FIG. 4 described above, a plurality of input optical signals having different wavelengths from each other from the optical signal sources 1-1 to 1-N are amplified in a batch by the optical amplifier 4. In this instance, the individual input light detection section 7C monitors, using the tunable optical filter thereof, the powers of the individual input optical signals on the input side of the optical amplifier 4. Then, the control section 10C controls the optical amplifier output adjustment section 9 based on results of the detection so that the power of the output optical signal on the output side of the optical amplifier 4 can be be fixed equally for the individual different wavelengths.

More particularly, also in this instance, the optical amplifier output adjustment section 9 includes a pumping light source for the optical amplifier 4. In this instance, the control section 10C controls the pumping light source based on the result of detection by the individual input light detection section 7C so that the power of the output optical signal on the output side of the optical amplifier 4 may be fixed equally for the individual different wavelengths.

In this instance, the control section 10C controls the pumping light source based on the result of detection by the individual input light detection section 7C. Consequently, the power of the output optical signal on the output side of the optical amplifier 4 can be be fixed equally for the individual different wavelengths.

Alternatively, the optical amplifier output adjustment section 9 may include an optical signal attenuation section provided for the optical signal input lines 2-1 to 2-N. In this instance, the control section 10C controls the optical signal attenuation section based on the result of detection by the individual input light detection section 7C so that the power of the output optical signal on the output side of the optical amplifier 4 may be fixed equally for the individual different wavelengths.

In this instance, the control section 10C controls the optical signal attenuation section based on the result of detection by the individual input light detection section 7C. Consequently, the power of the output optical signal on the output side of the optical amplifier 4 can be fixed equally for the individual different wavelengths.

Or, the optical signal sources 1-1 to 1-N may individually be formed as adjustable output optical signal sources which serve also as the optical amplifier output adjustment section 9. In this instance, the control section 10C controls the adjustable output optical signal sources based on the result of detection by the individual input light detection section 7C so that the power of the output optical signal on the output side of the optical amplifier 4 may be fixed equally for the individual different wavelengths.

In this instance, the control section 10C controls the adjustable output optical signal sources based on the result of detection by the individual input light detection section 7C. Consequently, the power of the output optical signal on the output side of the optical amplifier 4 can be fixed equally for the individual different wavelengths.

Or else, the optical amplifier output adjustment section 9 may include a plurality of optical signal attenuation sections for individually adjusting attenuation factors of optical signals separated from the output optical signal on the output side of the optical amplifier 4. In this instance, the control section 10C controls the optical signal attenuation sections based on the result of detection by the individual input light detection section 7C so that the power of the output optical signal on the output side of the optical amplifier 4 may be fixed equally for the individual different wavelengths.

In this instance, the control section 10C controls the optical signal attenuation sections based on the result of detection by the individual input light detection section 7C. Consequently, the power of the output optical signal on the output side of the optical amplifier 4 can be fixed equally for the individual different wavelengths.

With the multi-wavelength optical batch amplification apparatus according to the first to third aspects of the present invention described above, when a plurality of input optical signals having different wavelengths from each other are amplified in a batch by an optical amplifier, the power of the entire input optical signals is monitored by the entire input light detection section 7 and the power of the output optical signal is monitored for the individual different wavelengths by the individual output light detection section 8, or the powers of the individual input optical signals are monitored by the individual input light detection section 7A and the power of the entire output optical signal is monitored by the entire output light detection section 8A, or else the powers of the individual input optical signals are monitored by the individual input light detection section 7B and the power of the output optical signal is monitored for the individual different wavelengths by the individual output light detection section 8B. Then, the control section 10, 10A or 10B controls the optical amplifier output adjustment section 9 based on results of the detection so that the power of the output optical signal can be fixed equally for the individual different wavelengths. Consequently, the multi-wavelength optical batch amplification apparatus are advantageous in that, when the power of an optical signal of a certain wavelength from among the input optical signals drops, an output optical signal having an equal power can be obtained for the different wavelengths.

Where the individual input light detection section 7A or 7B described above monitors the powers of the input optical signals from the optical signal sources 1-1 to 1-N or the optical signal input lines 2-1 to 2-N, the powers of the input optical signals can be monitored for the individual different wavelengths with a higher degree of certainty.

Particularly, where the individual input light detection section 7A or 7B or the individual output light detection section 8 or 8B described above includes a tunable optical filter, the powers of the input optical signals on the input side of the optical amplifier 4 or the power of the output optical signal on the output side of the optical amplifier 4 can be monitored for the individual different wavelengths with a much simplified construction.

Where the individual output light detection section 8 or 8B monitors the powers of optical signals separated from the output optical signal on the output side of the optical amplifier 4, the power of the output optical signal can be monitored for the individual different wavelengths with a higher degree of certainty.

Where the optical amplifier output adjustment section 9 particularly includes a pumping light source for the optical amplifier 4, the control section 10, 10A, 10B or 10C controls the pumping light source to control the power of the output optical signal on the output side of the optical amplifier 4 so that it may be fixed equally for the individual different wavelengths. Consequently, when the power of an optical signal of a certain wavelength from among the input optical signals drops, an output optical signal having an equal power can be obtained for the different wavelengths with a much simplified construction.

Where the optical amplifier output adjustment section 9 includes an optical signal attenuation section provided for the optical signal input lines or is formed as adjustable output optical signal sources or else includes a plurality of optical signal attenuation sections for individually adjusting attenuation factors of optical signals separated from the output optical signal on the output side of the optical amplifier as described hereinabove, the control section 10, 10A. 10B or 10C controls the optical signal attenuation section or sections or the adjustable output optical signal sources so that the power of the output optical signal on the output side of the optical amplifier 4 can be fixed equally for the individual different wavelengths. Consequently, an output optical signal having an equal power for the individual different wavelengths can be obtained with a higher degree of certainty.

Also with the multi-wavelength optical batch amplification apparatus according to the fourth aspect of the present invention described above, the power of the output optical signal on the output side of the optical amplifier 4 can be fixed equally for the individual different wavelengths. Consequently, the multi-wavelength optical batch amplification apparatus is advantageous in that, when the power of an optical signal of a certain wavelength from among the input optical signals drops, an output optical signal having an equal power can be obtained for the different wavelengths with a much simplified construction.

Also in this instance, where the optical amplifier output adjustment section 9 particularly includes a pumping light source for the optical amplifier 4, the control section 10C controls the pumping light source to control the power of the output optical signal on the output side of the optical amplifier 4 so that it may be fixed equally for the individual different wavelengths. Consequently, an output optical signal having an equal power for the individual different wavelengths can be obtained with a simpler construction.

Further, also in this instance, where the optical amplifier output adjustment section 9 includes an optical signal attenuation section provided for the optical signal input lines 2-1 to 2-N or is formed as adjustable output optical signal sources or else includes a plurality of optical signal attenuation sections for individually adjusting attenuation factors of optical signals separated from the output optical signal on the output side of the optical amplifier 4, the control section 10C controls the optical signal attenuation section or sections or the adjustable output optical signal sources so that the power of the output optical signal can be fixed equally for the individual different wavelengths. Consequently, an output optical signal having an equal power for the individual different wavelengths can be obtained with a higher degree of certainty.

b. First Embodiment

Figure 5:
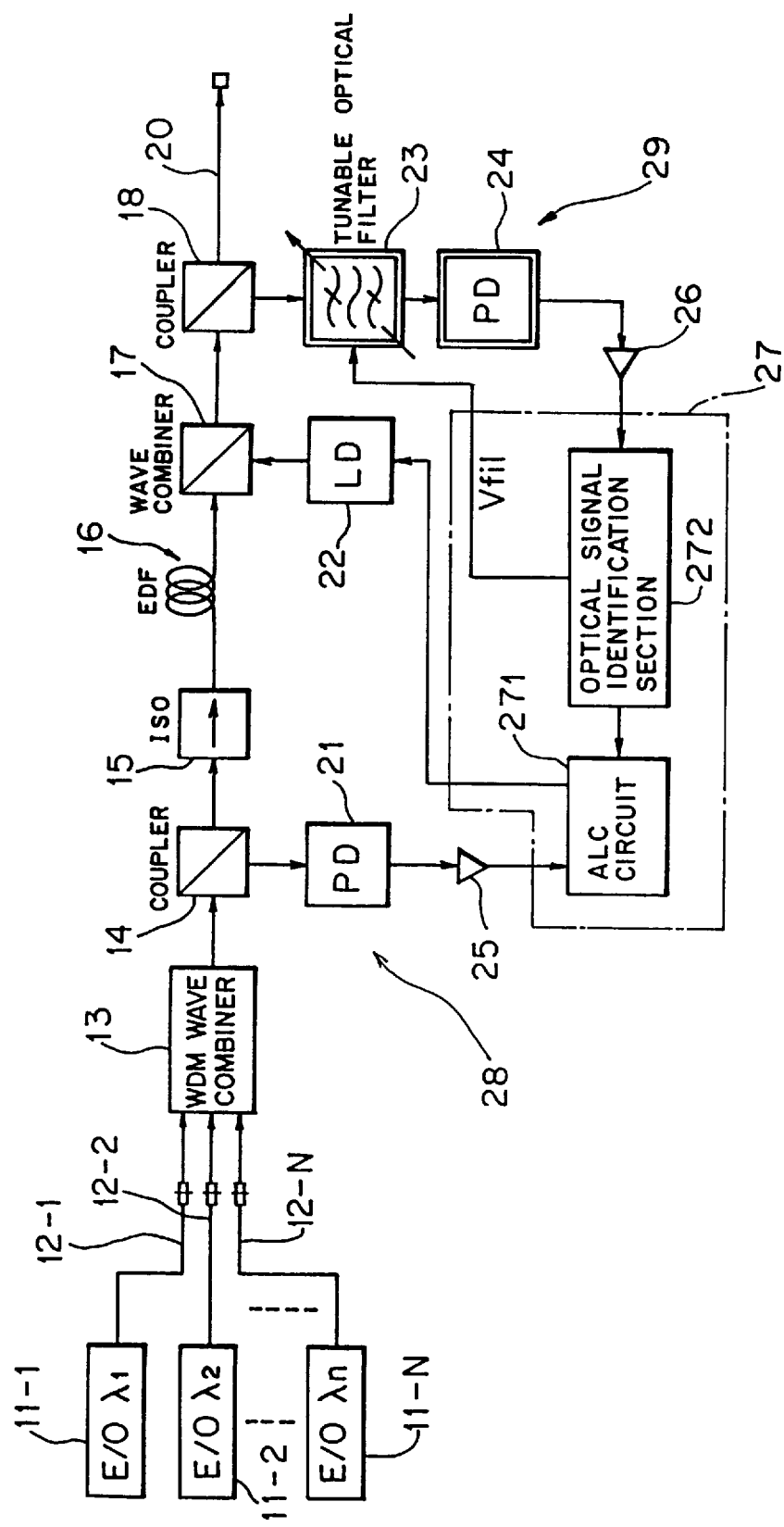
FIG. 5 is a block diagram showing a construction of a multi-wavelength optical batch amplification apparatus to which the present invention is applied.

Referring now to FIG. 5, there is shown in block diagram a construction of a multi-wavelength optical batch amplification apparatus according to a first preferred embodiment of the present invention. The multi-wavelength optical batch amplification apparatus shown includes a plurality of optical signal sources (E/O) 11-1 to 11-N (N is a natural number) which output optical signals (input optical signals) having different wavelengths $\lambda 1$ to $\lambda n$ (n is a natural number) from each other, and a plurality of optical signal input lines 12-1 to 12-N for transmitting the optical signals of the different wavelengths from the optical signal sources 11-1 to 11-N, respectively.

The multi-wavelength optical batch amplification apparatus further includes a wavelength multiplexing (WDM) wave combiner 13, two couplers (CPL) 14 and 18, an isolator (ISO) 15, an erbium doped fiber (EDF) optical amplifier 16, a wave combiner 17, and an optical signal output line 20 for transmitting an output optical signal amplified after wavelength multiplexing.

The multi-wavelength optical batch amplification apparatus further includes two photodiodes (PD) 21 and 24, a laser diode (LD) 22, a tunable optical filter 23, two amplification sections 25 and 26 for amplifying electric signal outputs of the photodiodes 21 and 24 to a required signal level, respectively, and a control section 27.

The WDM wave combiner 13 combines optical signals of different wavelengths from the optical signal sources 11-1 to 11-N transmitted by way of the optical signal input lines 12-1 to 12-N to multiplex them in wavelength. Each of the couplers 14 and 18 branches an optical signal inputted thereto.

The isolator 15 removes noise components of an optical signal which are caused by an insertion loss of the WDM wave combiner 13, reflected light during transmission of the optical signal and so forth. The EDF optical amplifier 16 amplifies optical signals wavelength multiplexed by the WDM wave combiner 13 in a batch to a desired output optical signal power. The wave combiner 17 combines the output of the EDF optical amplifier 16 and the output of the pumping laser diode 22 with each other.

The photodiode 21 produces an electric signal corresponding to the power of the input optical signals wavelength multiplexed by the WDM wave combiner 13 and branched by the coupler 14. In the present embodiment, the photodiode 21 and the amplification section 25 form an entire input light detection section 28 for monitoring the total power of input optical signals on the input side of the EDF optical amplifier 16.

The pumping laser diode (optical amplifier output adjustment section) 22 outputs pumping light in response to a control signal from a control section 27 which will be hereinafter described. The pumping light from the pumping laser diode 22 is combined with the output of the EDF optical amplifier 16 by the wave combiner 17 to adjust the power of the output optical signal of the EDF optical amplifier 16.

Figure 6A:
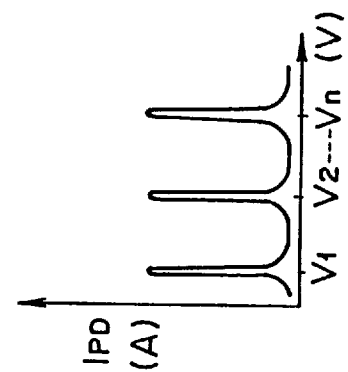
FIGS. 6(a) to 6(c) are diagrams illustrating operation of an tunable optical filter employed in the multi-wavelength optical batch amplification apparatus of FIG. 5.
Figure 6B:
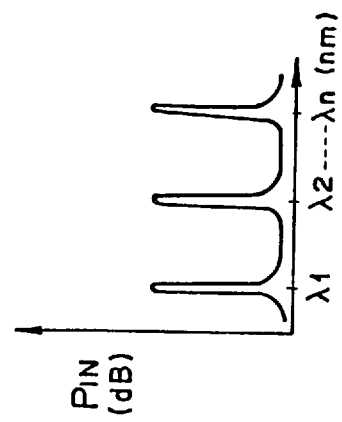
Figure 6C:
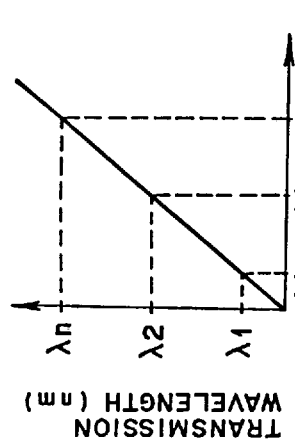

The tunable optical filter 23 outputs a multi-wavelength batch-amplified output optical signal branched by the coupler 18 for the individual wavelengths λ1 to λn. More particularly, the tunable optical filter 23 has such an application voltage to transmission wavelength characteristic as seen in FIG. 6(a). Thus, for example, when an optical signal having such a spectrum as shown in FIG. 6(b) is inputted to the tunable optical filter 23, such voltages V1 to Vn as seen in FIG. 6(c) are applied to the tunable optical filter 23, whereupon an optical signal is outputted for each of the wavelengths λ1 to λn.

The photodiode 24 converts an output optical signal for each of the individual wavelengths λ1 to λn outputted from the tunable optical filter 23 into an electric signal in accordance with the power of the output optical signal. In the present embodiment, the tunable optical filter 23, the photodiode 24 and the amplification section 26 construct individual output light detection section 29 for monitoring the power of the output optical signal for the individual wavelengths λ1 to λn on the output side of the EDF optical amplifier 16.

The control section 27 controls the output power of pumping light to be outputted from the pumping laser diode 22 based on results of detection of optical signals monitored by the entire input light detection section 28 and the individual output light detection section 29 described above to control, on the output side of the EDF optical amplifier 16, the powers of the component optical signals of the output optical signal of the individual wavelengths λ1 to λn to be outputted from the optical signal output line 20 so that they may be substantially equal to each other.

To this end, the control section 27 includes an automatic level control (ALC) circuit 271 and an optical signal identification section 272 as seen in FIG. 5.

The ALC circuit 271 outputs a control signal for the pumping laser diode 22 based on a result of detection of a total power of input optical signals monitored by the entire input light detection section 28 and the number of optical signals identified by the optical signal identification section 272. The optical signal identification section 272 identifies the number of output optical signals (number of optical signals having different wavelengths) from output optical signals for the individual wavelengths λ1 to λn obtained by the individual output light detection section 29 which includes the tunable optical filter 23, and produces and outputs a control signal for the ALC circuit 271 based on the number of output optical signals to the ALC circuit 271.

Figure 7:
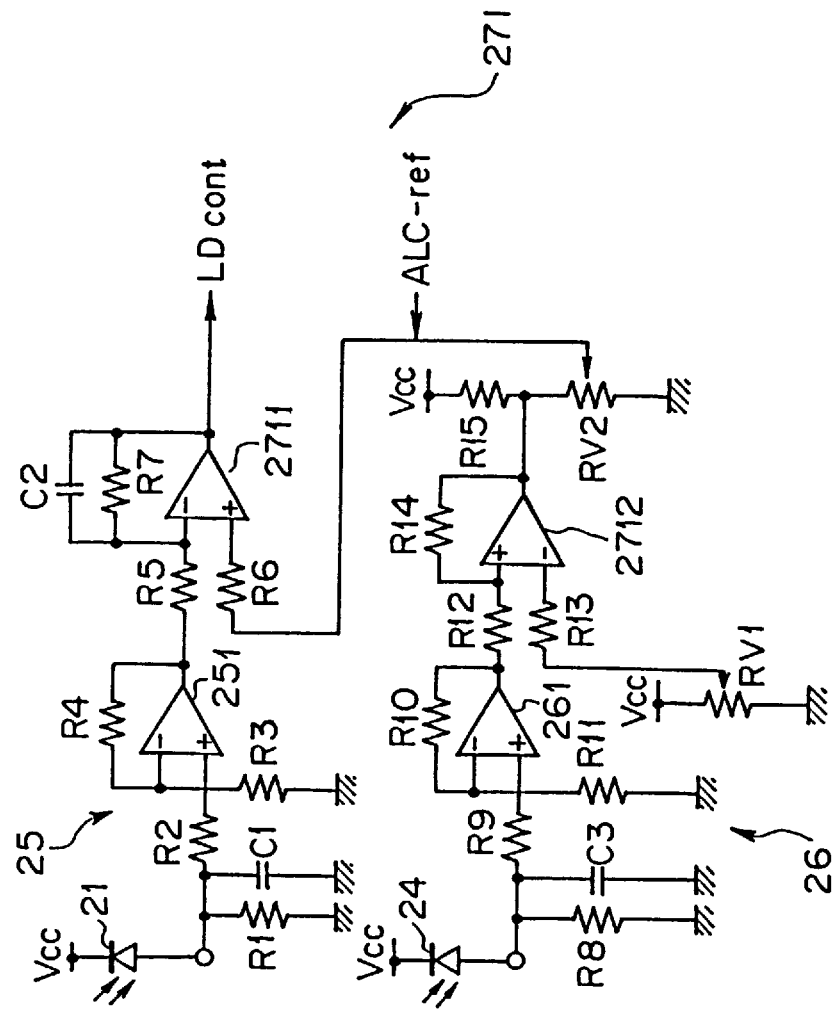
FIG. 7 is a block diagram showing a detailed construction of an ALC circuit of the multi-wavelength optical batch amplification apparatus of FIG. 5.
Figure 8:
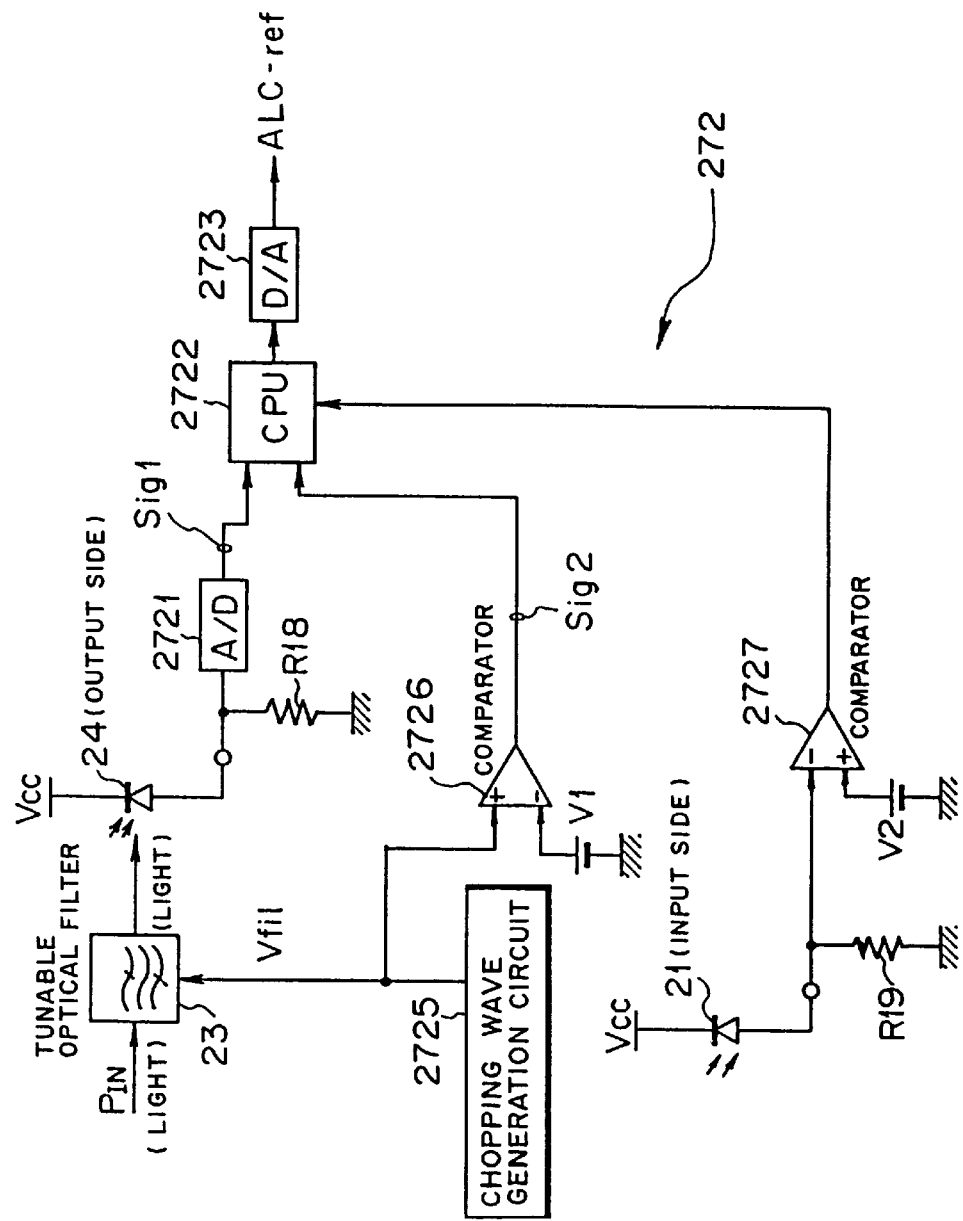
FIG. 8 is a block diagram showing a detailed construction of an optical signal identification section of the multi-wavelength optical batch amplification apparatus of FIG. 5.

FIG. 7 shows in block diagram an example of detailed constructions of the amplification sections 25 and 26 and the ALC circuit 271 described above. Referring to FIG. 7, the amplification section 25 includes an amplifier 251, resistors R1 to R4, and a capacitor C1. Similarly, the amplification section 26 includes an amplifier 261 and resistors R8 to R11. The ALC circuit 271 includes two amplifiers 2711 and 2712, and resistors R5 to R7, and resistors R12 to R15, RV1 and RV2. In the present embodiment, the ALC circuit 271 uses a control voltage produced by the optical signal identification section 272 as a reference voltage (ALC-ref) for the amplifier 2711 to control a control voltage (LD Cont) for the pumping laser diode 22 to be outputted from the amplifier 2711 thereby to control the output power of pumping light of the pumping laser diode 22 It is to be noted that reference characters C2 and C3 denote each a capacitor. Further, the resistor RV1 is used to set a detection level to be used when an input optical signal is interrupted, and the resistor RV2 is used to set the output power of an optical signal FIG. 8 shows in block diagram an example of a construction of the optical signal identification section 272 described above. Referring to FIG. 8, the optical signal identification section 272 includes an analog to digital (A/D) converter 2721 for converting an electric signal in the form of an analog amount obtained in accordance with the power of an output optical signal by the photodiode 24 on the output side into a digital amount, a central processing unit (CPU) 2722, a digital to analog (D/A) converter 2723 for converting an electric signal in the form of a digital amount into an analog amount, a chopping wave generation circuit 2725, and a pair of comparators 2726 and 2727. It is to be noted that reference character R18 denotes a resistor, V1 a voltage value which serves as a reference voltage for the comparator 2726, and V2 a voltage value which is used to set a level with which it is determined, when the level of an optical signal of a certain wavelength from among the wavelengths λ1 to λn drops (including an interrupted condition), that the optical signal has been interrupted.

Figure 9A:
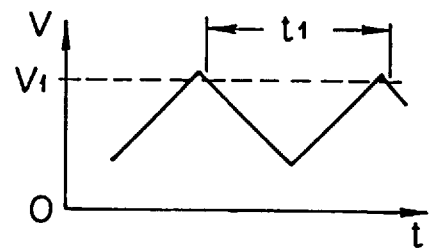
FIGS. 9(a) to 9(c) are diagrams illustrating operation of the optical signal identification section of FIG. 8.

The chopping wave generation circuit 2725 generates a chopping wave which exhibits a maximum voltage value (the maximum voltage has a voltage value higher than the reference voltage V1 of the comparator 2726), for example, after each period t1 as seen in FIG. 9(a) and supplies the chopping wave as an application voltage Vfil to the tunable optical filter 23 and an application voltage to the comparator 2726. The comparator 2726 compares the output voltage of the chopping wave generation circuit 2725 with the reference voltage V1 and outputs a "H" level pulse each time the output voltage of the chopping wave generation circuit 2725 exhibits a higher level than the reference voltage V1.

The comparator 2727 compares the voltage of a signal obtained in accordance with a total power of input optical signals by the photodiode 21 on the input side with the reference voltage V2 and outputs a "H" level pulse when the total power of input optical signals exhibits a lower level than the reference voltage V2. When a "H" level pulse is outputted from the comparator 2727, the CPU 2722 recognizes that some of the input optical signals has dropped (including an interrupted condition). It is to be noted that, when the output of the comparator 2727 has dropped to "0", that is, when the input optical signals have entered into an interrupted condition, a signal to the pumping laser diode 22 is cut by the CPU 2722.

The CPU 2722 produces a signal which serves as a reference signal for the amplifier 2711 (refer to FIG. 7) of the ALC circuit 271 described above in response to the outputs of the A/D converter 2721 and the comparators 2726 and 2727.

In the multi-wavelength optical batch amplification apparatus of the present embodiment having the construction described above, input optical signals of the different wavelengths λ1 to λn from the optical signal sources 11-1 to 11-N are transmitted by way of the optical signal input lines 12-1 to 12-N, respectively, and multiplexed and combined into a multi-wavelength optical signal by the WDM wave combiner 13. The multi-wavelength optical signal is amplified in a batch by the EDF optical amplifier 16 and outputted by way of the optical signal output line 20.

Meanwhile, in the entire input light detection section 28, the multi-wavelength optical signal branched by the coupler 14 is converted into an electric signal corresponding to the total power thereof by the photodiode 21 on the input side of the EDF optical amplifier 16. The electric signal is amplified to a required signal level (voltage value) by the amplification section 25 and inputted to the control section 27 so that the power of the entire input optical signals is monitored by the control section 27.

Then, in the individual output light detection section 29, an output optical signal (wavelengths $\lambda 1$ to $\lambda n$) amplified in a batch by the EDF optical amplifier 16 and branched by the coupler 18 is inputted to the tunable optical filter 23. The tunable optical filter 23 thus transmits the output optical signal for the individual wavelengths $\lambda 1$ to $\lambda n$ as described hereinabove with reference to FIGS. 6(a) to 6(c) with an application voltage Vfil (refer to FIG. 9(a)) supplied thereto from the chopping wave generation circuit 2725 (refer to FIG. 8) of the control section 27. The output optical signal transmitted through the tunable optical filter 23 is amplified to the required signal level by the amplification section 26 and inputted to the control section 27 so that the output optical signal is monitored for the individual wavelengths $\lambda 1$ to $\lambda n$ by the control section 27.

Figure 9B:
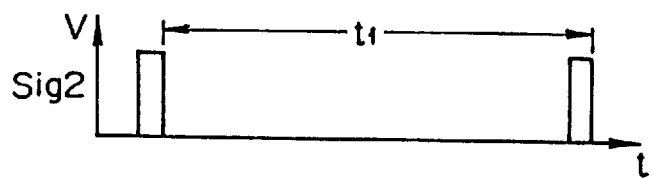

In the optical signal identification section 272 of the control section 27, the chopping wave which exhibits a maximum voltage after each period t1 as seen in FIG. 9(a) is supplied also to the comparator 2726 from the chopping wave generation circuit 2725. The comparator 2726 compares the voltage of the chopping wave with the reference voltage V1 and outputs a "H" level pulse each time the voltage of the chopping wave exhibits a higher level than the reference voltage, that is, each time a maximum point (maximum voltage) of the chopping wave is received. Consequently, the comparator 2726 outputs a pulse signal Sig2 which exhibits a "H" level after each period t1 as seen in FIG. 9(b).

Figure 9C:

Meanwhile, the A/D converter 2721 converts an electric signal in the form of an analog amount, which is outputted from the tunable optical filter 23 each time the tunable optical filter 23 receives light during sweeping of a transmission wavelength region, into a signal of a digital amount to produce, for example, such a pulse signal Sig1 as seen in FIG. 9(c). The CPU 2722 receives the pulse signals Sig1 and Sig2 and counts the number of pulses of the pulse signal Sig1 included in one period t1 of the pulse signal Sig2 to detect number information of those optical signals of the output optical signal which has transmitted through the tunable optical filter 23. For example, when the number of pulses of the pulse signal Sig1 during one period t1 is "6", the number of optical signals is "3".

The optical signal number information detected as described above is converted into a voltage value in the form of an analog amount by the D/A converter 2723. For example, when the number of optical signals is 1, it is converted into 1 V, and when the number is 2, it is converted into 2 V. The resulted voltage is outputted as a reference voltage (ALC-ref) for the amplifier 2711 in the ALC circuit 271 (refer to FIG. 7).

As a result, the ALC circuit 271 controls the control voltage (LD Cont) for controlling the power of a pumping light output of the laser diode 22 to be outputted from the amplifier 2711 in accordance with the voltage (ALC-ref) supplied thereto from the optical signal identification section 272 to control the output optical signal powers of the wavelengths $\lambda 1$ to $\lambda n$ on the output side of the EDF optical amplifier 16 so that they may be equal to each other.

In short, the control section 27 calculates the power per one wave of the wavelengths $\lambda 1$ to $\lambda n$ based on the total power of the input optical signals on the input side of the EDF optical amplifier 16 detected by the entire input light detection section 28 and the output optical signal number information detected by the individual output light detection section 29 and controls (feedback controls) the pumping light output power of the pumping laser diode 22 so that the powers of the individual component optical signals of the output optical signal on the output side of the EDF optical amplifier 16 may be equal to one another among the individual wavelengths $\lambda 1$ to $\lambda n$.

As described above, with the multi-wavelength optical batch amplification apparatus described above, when a plurality of input optical signals of different wavelengths $\lambda 1$ to $\lambda n$ are to be amplified in a batch by the EDF optical amplifier 16 to output an output optical signal, the total power of the input optical signals is monitored on the input side of the EDF optical amplifier 16 by the entire input light detection section 28 and the number of component optical signals of an output optical signal is detected on the output side of the EDF optical amplifier 16 by the individual output light detection section 29, and the control section 27 calculates the power per one wavelength and controls the pumping light output power of the pumping laser diode 22 based on the thus calculated power. Consequently, the powers of the individual component optical signals of the output optical signal can be controlled for the individual wavelengths $\lambda 1$ to $\lambda n$ so that they may be equal to each other. Accordingly, even if the power of an input optical signal of some wavelength drops, this does not have an influence upon the input optical signals of the other wavelengths and component output optical signals of an equal power can be obtained for the individual wavelengths $\lambda 1$ to $\lambda n$.

Figure 10:
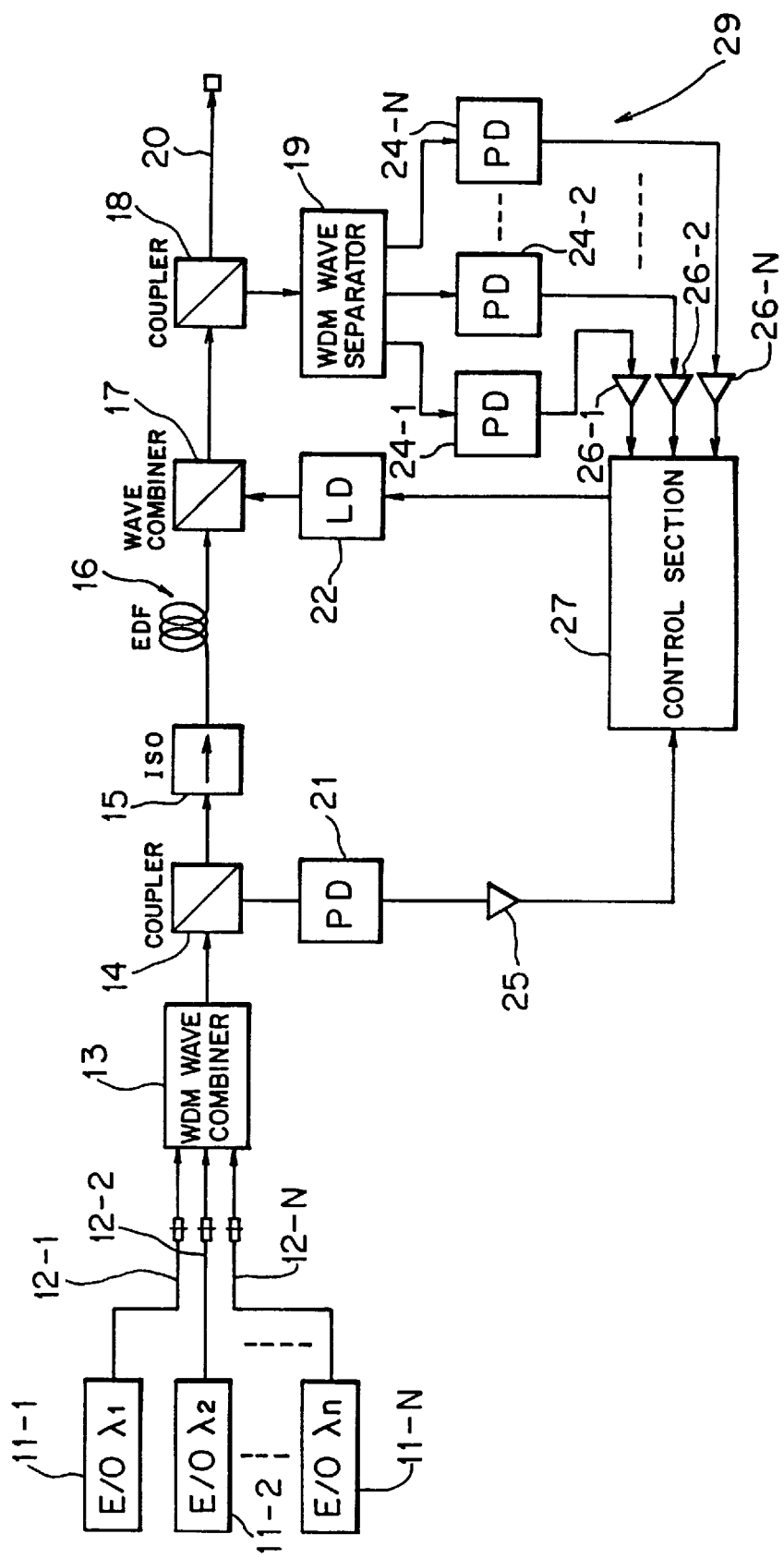
FIG. 10 is a block diagram showing a modified construction of the multi-wavelength optical batch amplification apparatus of FIG. 5.

While the multi-wavelength optical batch amplification apparatus described above is constructed such that the tunable optical filter 23 is used for the individual output light detection section 29 so that input optical signals can be monitored for the individual wavelengths $\lambda 1$ to $\lambda n$, it may be modified in such a manner as shown, for example, in FIG. 10. Referring to FIG. 10, the modified multi-wavelength optical batch amplification apparatus shown is different from the multi-wavelength optical batch amplification apparatus of FIG. 5 in the individual output light detection section 29 and the optical signal identification section 272 of the control section 27. In particular, the individual output light detection section 29 is formed from a coupler 18, a WDM wave separator 19, photodiodes (PD) 24-1 to 24-N and amplification sections 26-1 to 26-N and is constructed such that the output of the EDF optical amplifier 16 is branched by the coupler 18 and then separated into signals of the individual wavelengths $\lambda 1$ to $\lambda n$ by the WDM wave separator 19, and then the input optical signals of the individual wavelengths $\lambda 1$ to $\lambda n$ are individually converted into electric signals corresponding to the powers thereof by the photodiodes 24-1 to 24-N to monitor the input optical signals for the individual wavelengths $\lambda 1$ to $\lambda n$, respectively.

Figure 11:
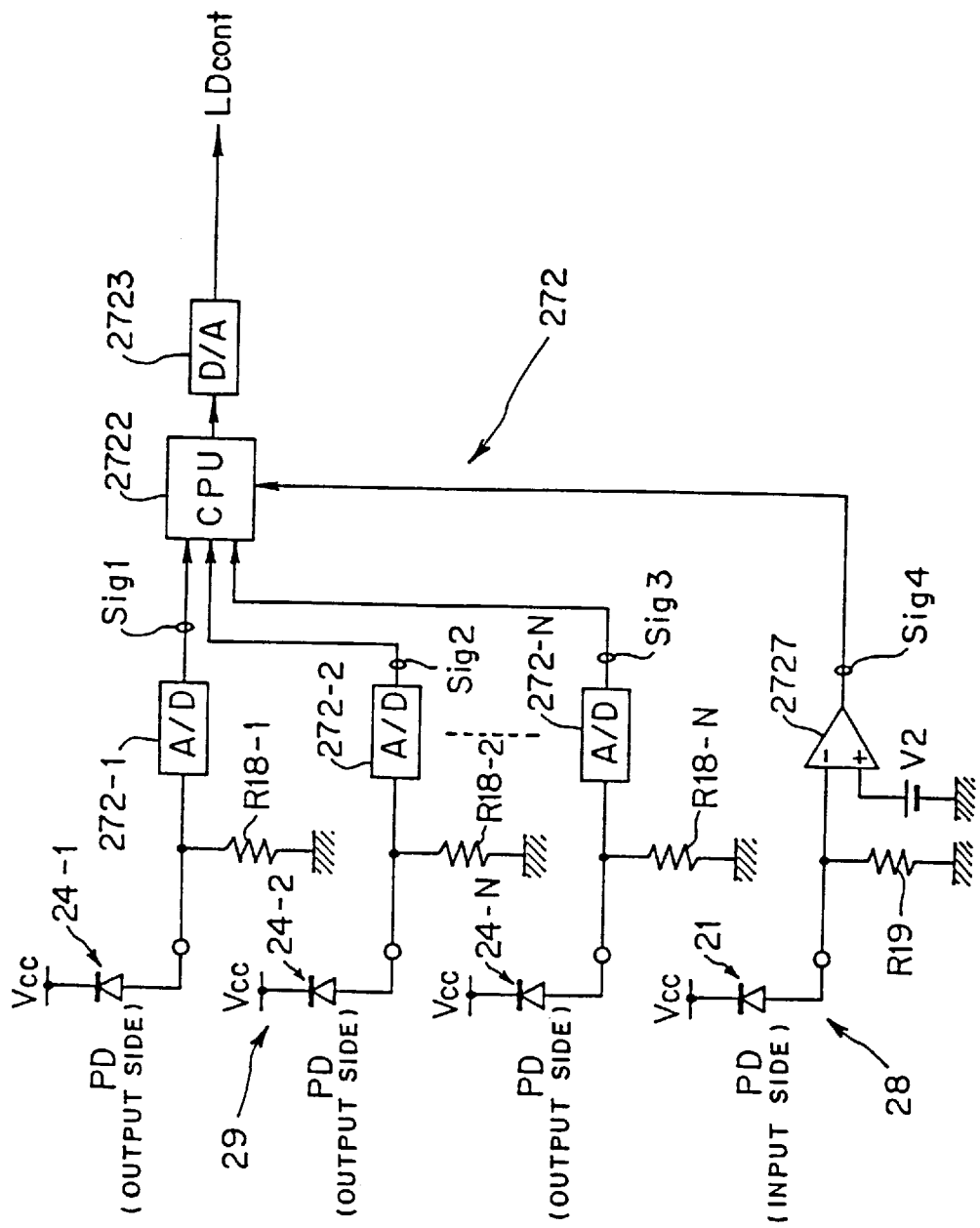
FIG. 11 is a block diagram showing a detailed construction of the optical signal identification section of the multi-wavelength optical batch amplification apparatus of FIG. 10.

Meanwhile, referring to FIG. 11, the optical signal identification section 272 of the control section 27 includes several common components to those of the optical signal identification section 272 described hereinabove with reference to FIG. 8. In particular, the optical signal identification section 272 shown in FIG. 11 includes a plurality of A/D converters 272-1 to 272-N, a CPU 2722 and a D/A converter 2723.

The A/D converters 272-1 to 272-N convert electric signals obtained by the photodiodes 24-1 to 24-N corresponding the powers of the input optical signals for the individual wavelengths $\lambda 1$ to $\lambda n$ individually into digital signals, and the CPU 2722 supplies a reference voltage (ALC-ref) for the amplifier 2711 (refer to FIG. 7) of the ALC circuit 271 based on the outputs of the A/D converters 272-1 to 272-N. It is to be noted that reference characters resistors R18-1 to R18-N denote each a resistor.

In the modified multi-wavelength optical batch amplification apparatus of the construction described above, the CPU 2722 in the optical signal identification section 272 calculates the power of an output optical signal per one wavelength based on number information of component optical signals of the output optical signal obtained by reading the digital outputs of the A/D converters 272-1 to 272-N and the total power of the input optical signals from the photodiode 21 and outputs a voltage in the form of a digital value with which the power of the output optical signal per one wave obtained in this manner may be equal to the required output optical signal power.

Thereafter, the digital signal is, as described hereinabove with reference to FIG. 8, converted into an analog signal by the D/A converter 2723 and supplied as the reference voltage (ALC-ref) for the amplifier 2711 (refer to FIG. 7) of the ALC circuit 271 so that the control voltage (LD Cont) to be outputted from the amplifier 2711 is controlled in accordance with the reference voltage (ALC-ref). As a result, the pumping light output power of the pumping laser diode 22 is controlled to control the output optical signal powers of the individual wavelengths $\lambda 1$ to $\lambda n$ on the output side of the EDF optical amplifier 16 so that they may be equal to each other.

Figure 12:
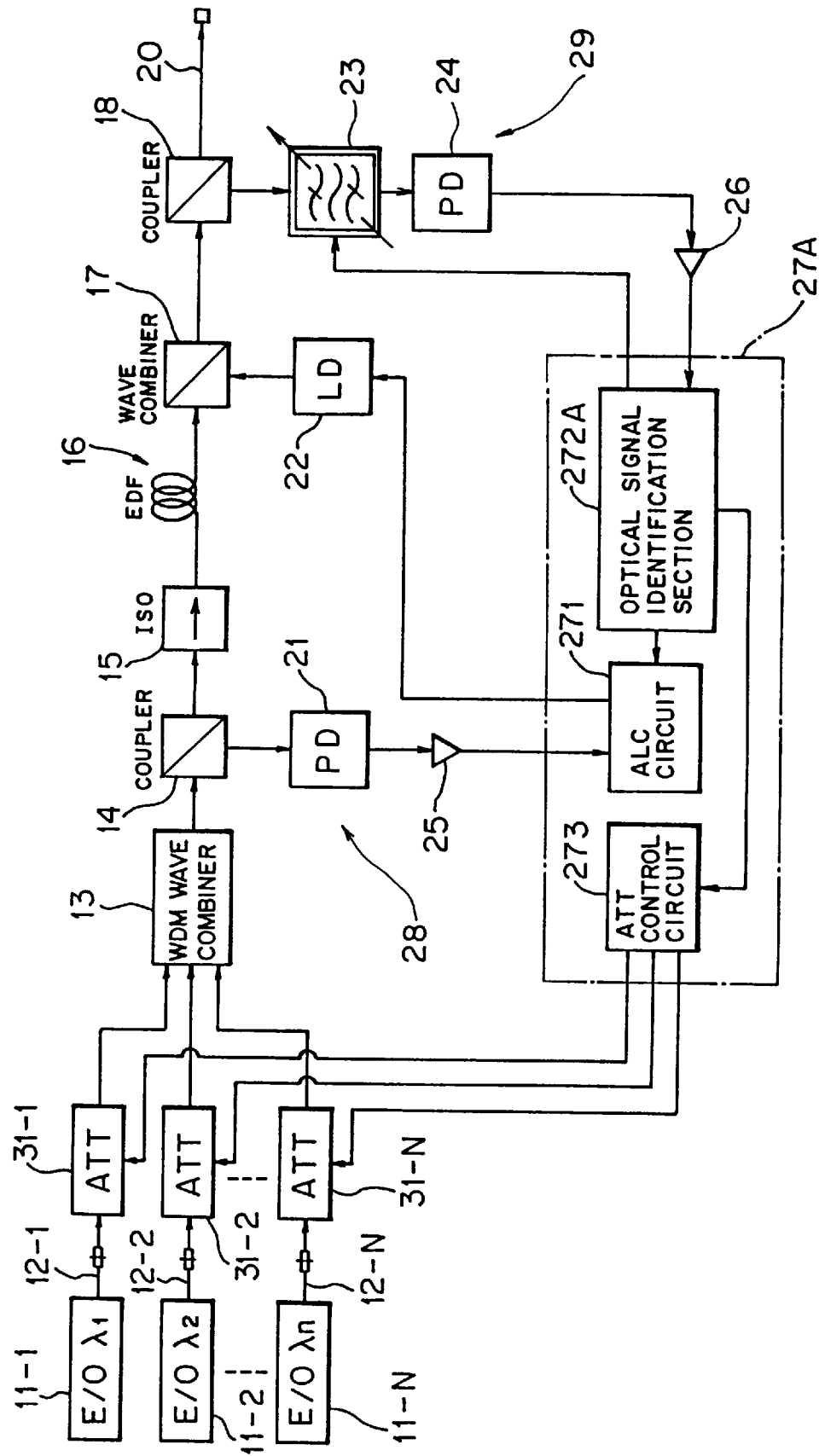
FIG. 12 is a block diagram showing another modified construction of the multi-wavelength optical batch amplification apparatus of FIG. 5.

Further, while the multi-wavelength optical batch amplification apparatus described above is constructed such that the control section 27 controls the pumping laser diode (optical amplifier output adjustment section) 22 to control the powers of component optical signals of the output optical signal equally to a fixed value, it may be modified in such a manner as shown in FIG. 12. Referring to FIG. 12, the modified multi-wavelength optical batch amplification apparatus shown is different from the multi-wavelength optical batch amplification apparatus of FIG. 5 in that it additionally includes a plurality of variable optical attenuators (ATT: optical signal attenuation sections) 31-1 to 31-N and includes a control section 27A in place of the control section 27. In particular, the variable optical attenuators 31-1 to 31-N are provided for the optical signal input lines 12-1 to 12-N, respectively, and the control section 27A controls the variable optical attenuators 31-1 to 31-N and the pumping laser diode 22 so that the powers of component optical signals of the output optical signal may be fixed equally.

Figure 13:
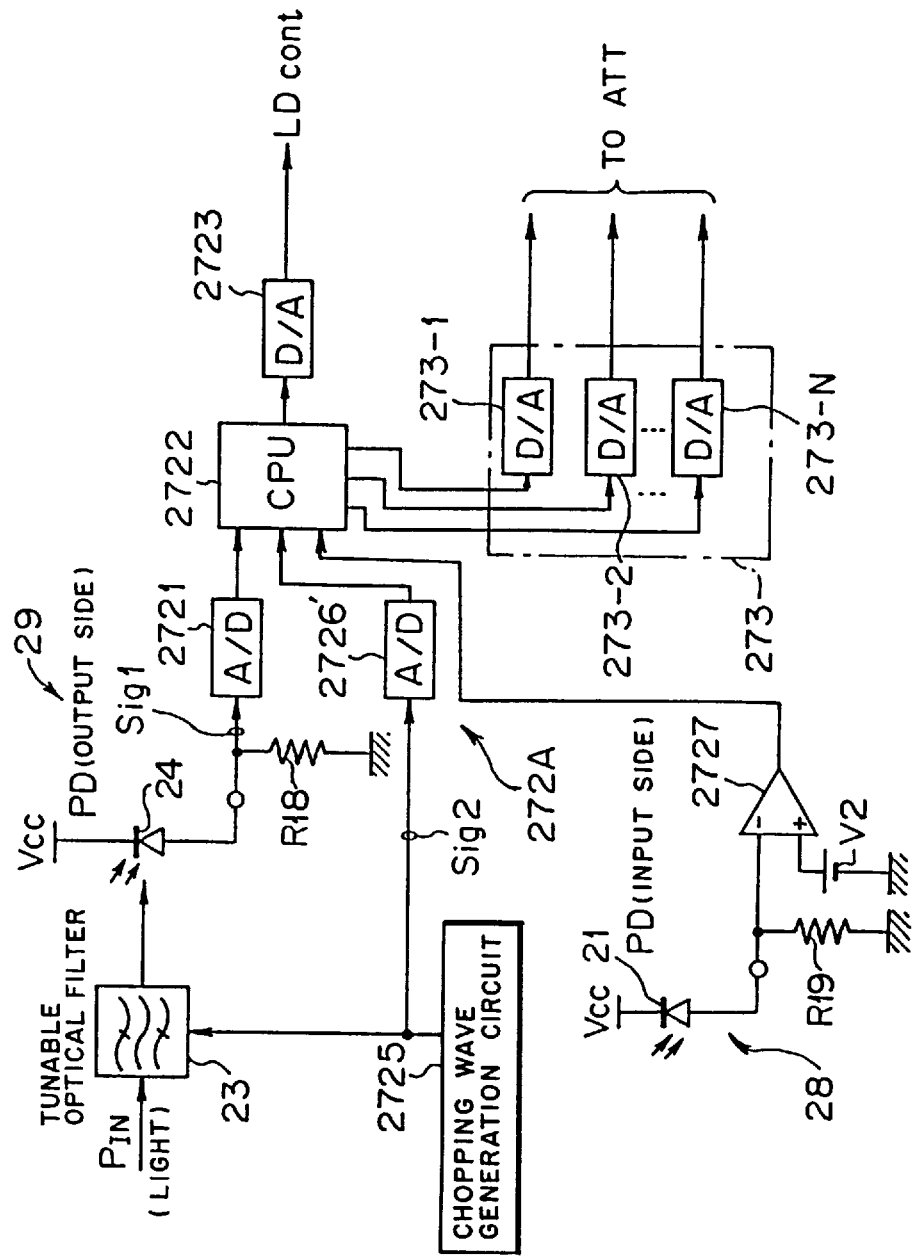
FIG. 13 is a block diagram showing a detailed construction of the optical signal identification section of the multi-wavelength optical batch amplification apparatus of FIG. 12.

In this instance, the control section 27A includes, in addition to an ALC circuit 271 similar to that described hereinabove with reference to FIGS. 5 and 7, an optical signal identification section 272A and an optical attenuator (ATT) control circuit 273. Referring to FIG. 13, also the optical signal identification section 272A in the modified control section 27A includes an A/D converter 2721, a CPU 2722, a D/A converter 2723, a chopping wave generation circuit 2725, an A/D converter 2726' and a comparator 2727. The ATT control circuit 273 includes a plurality of D/A converters 273-1 to 273-N corresponding to the variable optical attenuators 31-1 to 31-N, respectively.

In the optical signal identification section 272A shown in FIG. 13, the CPU 2722 calculates the power of an output optical signal per one wave of the wavelengths $\lambda 1$ to $\lambda n$ based on number information of component optical signals of the output optical signal obtained from the pulse signals Sig1 and Sig2 and the total power of the input optical signals from the entire input light detection section 28 and outputs digital signals to the variable optical attenuators 31-1 to 31-N. In particular, the CPU 2722 outputs a digital signal indicating the attenuation amount of "0" to one of the variable optical attenuators 31-1 to 31-N corresponding to the component output optical signal of one of the wavelengths $\lambda 1$ to $\lambda n$ which exhibits the lowest output power, but outputs, to each of the other variable optical attenuators 31-1 to 31-N corresponding to the component output optical signals of the other wavelengths than that of the lowest output power, a digital signal indicating such an increased attenuation amount that the output power of the component output optical signal may be equal to that of the component output optical signal of the wavelength of the lowest output power.

As a result, the pumping light output power of the pumping laser diode 22 and the attenuation amounts of the variable optical attenuators 31-1 to 31-N are adjusted in accordance with the digital signals so that the powers of the component optical signals of the output optical signal to be outputted from the optical signal output line 20 are controlled so that they may be equal to one another among the individual wavelengths $\lambda 1$ to $\lambda n$.

Figure 14:
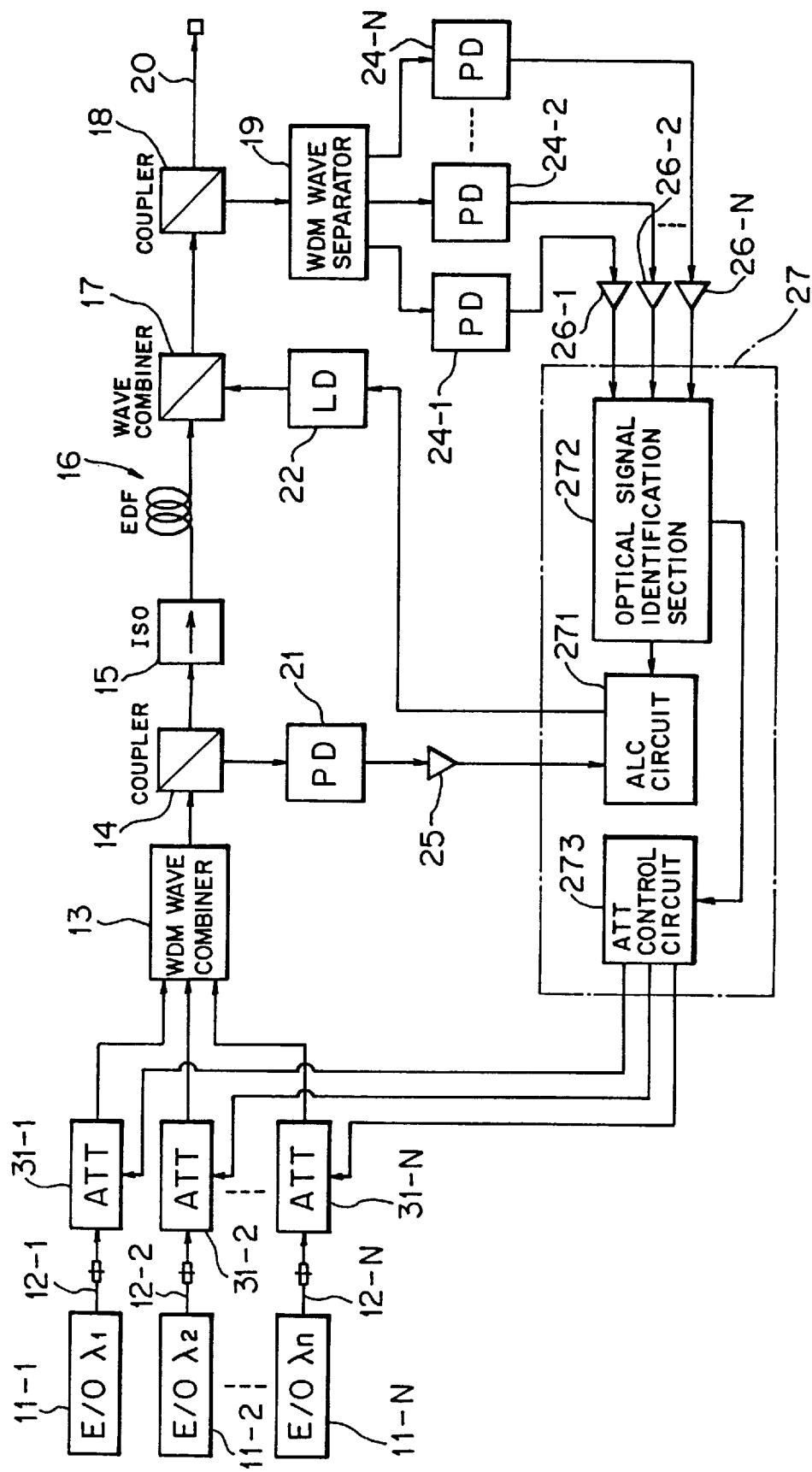
FIGS. 14 to 17 are block diagrams showing different modified constructions of the multi-wavelength optical batch amplification apparatus of FIG. 5.

It is to be noted that, also in this instance, the individual output light detection section 29 described above may be modified in such a manner as seen in FIG. 14. Referring to FIG. 14, the individual output light detection section 29 includes a coupler 18, a WDM wave separator 19, photodiodes (PD) 24-1 to 24-N and amplification sections 26-1 to 26-N. In the modified individual output light detection section 29, the output of the EDF optical amplifier 16 is branched by the coupler 18 and separated into signals of different wavelengths $\lambda 1$ to $\lambda n$ by the WDM wave separator 19. The signals of the wavelengths $\lambda 1$ to $\lambda n$ are converted into electric signals corresponding to the powers thereof by the photodiodes 24-1 to 24-N to monitor the powers of the individual wavelengths $\lambda 1$ to $\lambda n$, respectively.

Figure 15:
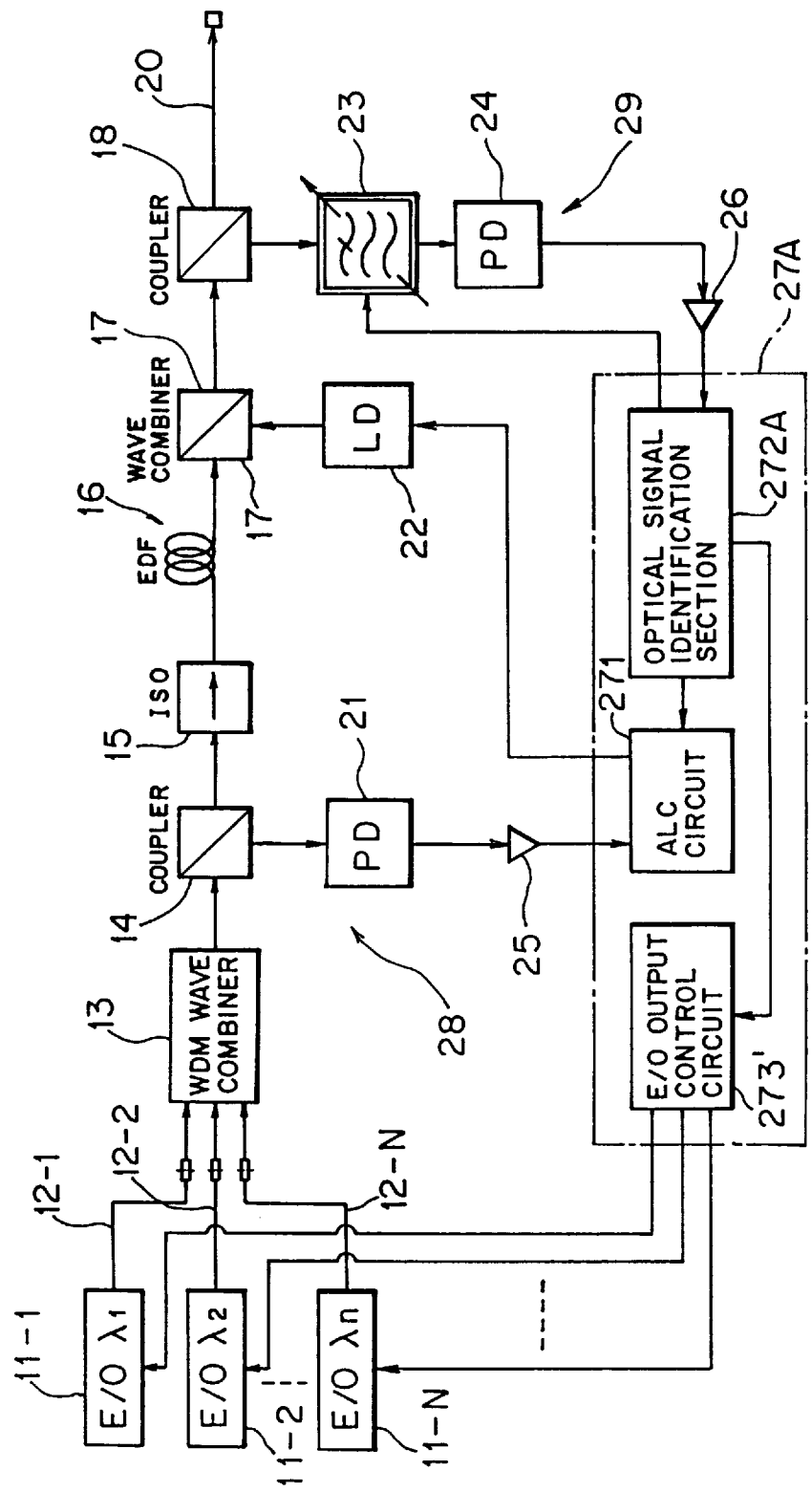

The multi-wavelength optical batch amplification apparatus described hereinabove with reference to FIG. 5 may alternatively be modified in such a manner as shown in FIG. 15. Referring to FIG. 15, the modified multi-wavelength optical batch amplification apparatus shown is a modification to and different from the modified multi-wavelength optical batch amplification apparatus of FIG. 12 in that it does not include the variable optical attenuators 31-1 to 31-N but the optical signal sources 11-1 to 11-N are constructed as adjustable output optical signal sources whose outputs is adjustable and the control section 27A directly controls, in place of the variable optical attenuators 31-1 to 31-N, the outputs of the optical signal sources 11-1 to 11-N to control the powers of component optical signals of the output optical signal separated by the WDM wave separator 19 so that they may individually be fixed equally to each other as described hereinabove.

Therefore, in this instance, the control section 27A includes an optical signal source (E/O) output control circuit 273' having a similar construction to that of the ATT control circuit 273 which includes a plurality of D/A converters 273-1 to 273-N described hereinabove with reference to FIG. 11. It is to be noted that the ALC circuit 271 and the optical signal identification section 272A are similar to those described hereinabove with reference to FIGS. 7 and 13, respectively.

Thus, with the modified multi-wavelength optical batch amplification apparatus shown in FIG. 15, the control section 27A calculates the power of the output optical signal per one wave of the wavelengths λ1 to λn from information such as the total power of the input optical signals obtained from the entire input light detection section 28, the wavelength and number information of component optical signals of the output optical signal obtained from the individual output light detection section 29 and so forth. Then, the control section 27A directly controls the outputs of the optical signal sources 11-1 to 11-N and the pumping laser diode 22 based on the thus calculated power to control the powers of the component optical signals of the output optical signal amplified in a batch by the EDF optical amplifier 16 so that they may be fixed equally to one another among the individual wavelengths λ1 to λn.

It is to be noted that, also with the modified multi-wavelength optical batch amplification apparatus shown in FIG. 15, where the individual output light detection section 29 is formed from a coupler 18, a WDM wave separator 19, photodiodes (PD) 24-1 to 24-N and amplification sections 26-1 to 26-N as shown in FIG. 14, the output of the EDF optical amplifier 16 is branched by the coupler 18 and separated into signals of the wavelengths λ1 to λn by the WDM wave separator 19 and then the signals of the wavelengths λ1 to λn are converted into electric signals corresponding to the powers thereof by the photodiodes 24-1 to 24-N, respectively, and consequently, the powers of the component optical signals of the output optical signal can be monitored for the individual wavelengths λ1 to λn with a higher degree of certainty.

Figure 16:
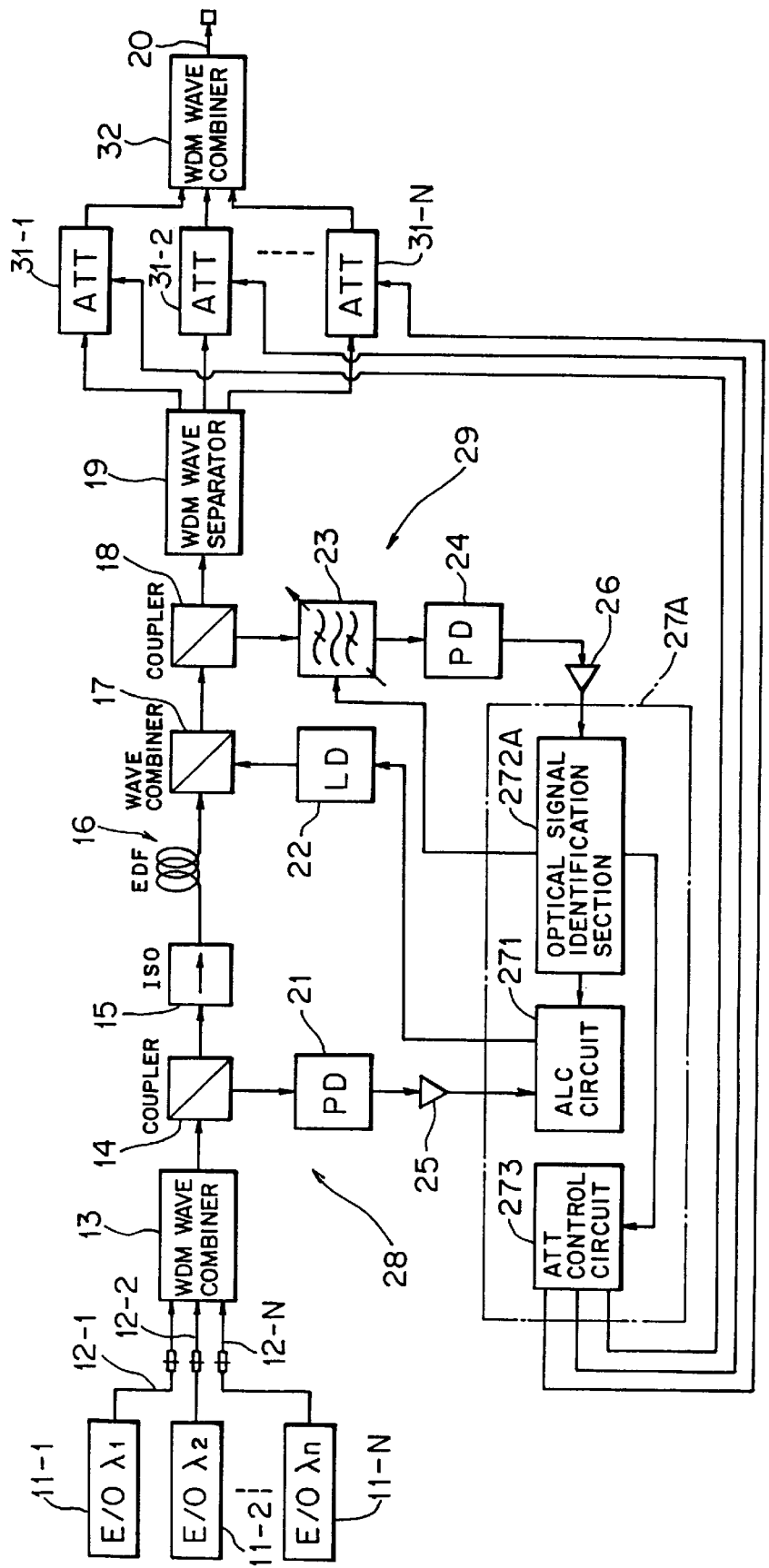

The multi-wavelength optical batch amplification apparatus described above with reference to FIG. 5 may otherwise be modified in such a manner as shown in FIG. 16. Referring to FIG. 16, the modified multi-wavelength optical batch amplification apparatus shown is different from the multi-wavelength optical batch amplification apparatus of FIG. 5 in that it additionally includes a plurality of variable optical attenuators (ATT: optical signal attenuation section) 31-1 to 31-N similar to those described hereinabove with reference to FIG. 12 and a WDM (wavelength multiplexing) wave combiner 32 for combining output optical signals of the wavelengths λ1 to λn from the variable optical attenuators 31-1 to 31-N. The variable optical attenuators 31-1 to 31-N are provided on the output side of the WDM wave separator 19, that is, on the output side of the EDF optical amplifier 16 corresponding to the optical signal sources 11-1 to 11-N.

Thus, with the modified multi-wavelength optical batch amplification apparatus shown in FIG. 16, the control section 27A calculates the power of the output optical signal per one wave of the wavelengths λ1 to λn from information such as the total power of the input optical signals obtained from the entire input light detection section 28, the wavelength and number information of component optical signals of the output optical signal obtained from the individual output light detection section 29 and so forth. Then, the control section 27A controls the variable optical attenuators 31-1 to 31-N and the pumping laser diode 22 based on the thus calculated output power to control the powers of the component optical signals of the output optical signal on the output side of the EDF optical amplifier 16 so that they may be fixed equally to one another among the individual wavelengths λ1 to λn.

Thereafter, the component optical signals of the output optical signal of the wavelengths λ1 to λn are combined (wavelength multiplexed) by the WDM wave combiner 32 and outputted by way of the optical signal output line 20.

Figure 17:
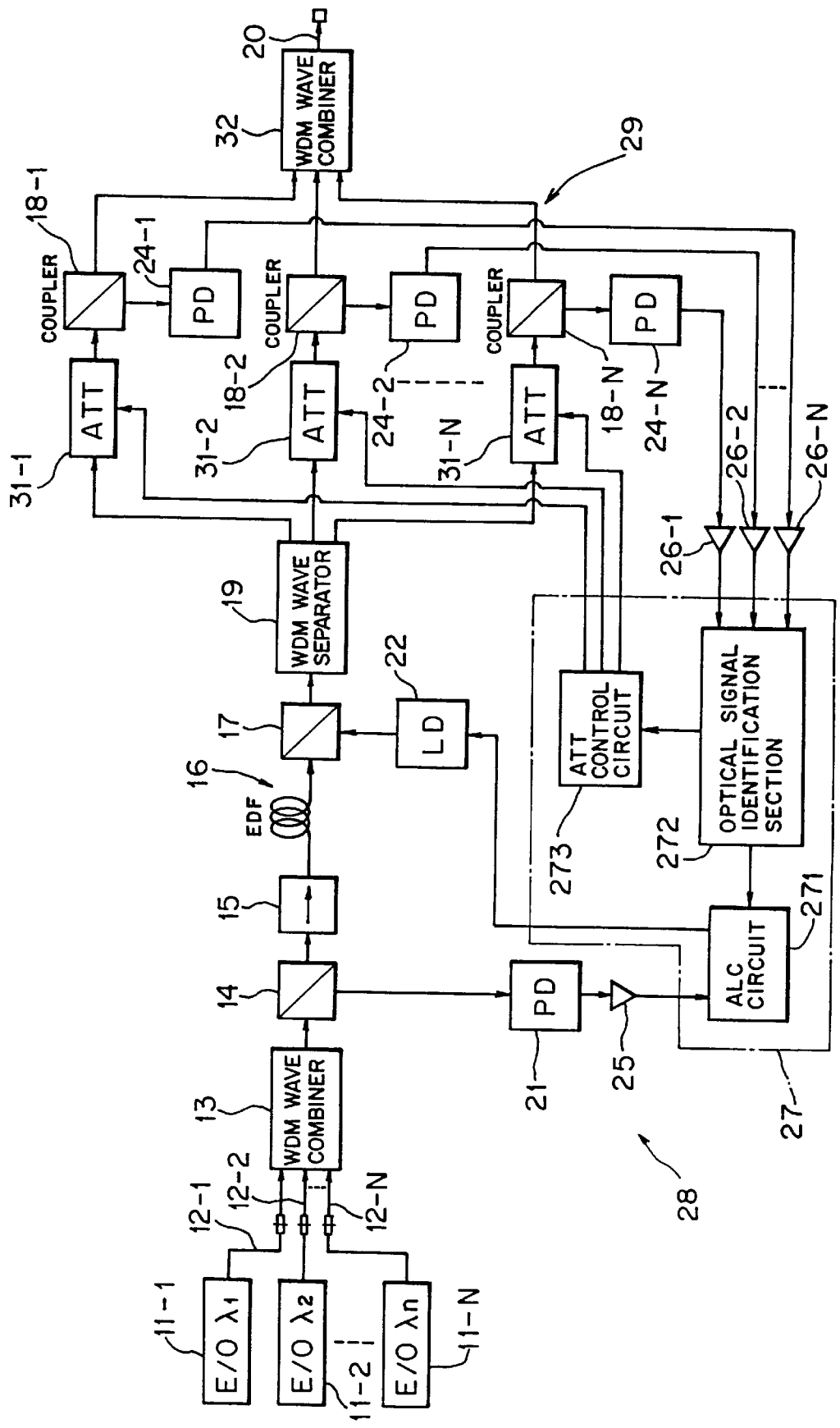

The modified multi-wavelength optical batch amplification apparatus shown in FIG. 16 may be further modified in such a manner as seen in FIG. 17. Referring to FIG. 17, the multi-wavelength optical batch amplification apparatus shown is modified such that the individual output light detection section 29 includes a plurality of couplers 18-1 to 18-N, a plurality of photodiodes (PD) 24-1 to 24-N and a plurality of amplification sections 26-1 to 26-N. In the modified individual output light detection section 29, component optical signals of the output optical signal separated by the WDM wave separator 19 are branched by the couplers 18-1 to 18-N and converted into electric signals corresponding to the powers thereof by the photodiodes 24-1 to 24-N, respectively. Consequently, the number information, the powers of the component optical signals of the output optical signal and so forth can be monitored with a higher degree of certainty.

c. Second Embodiment

Figure 18:
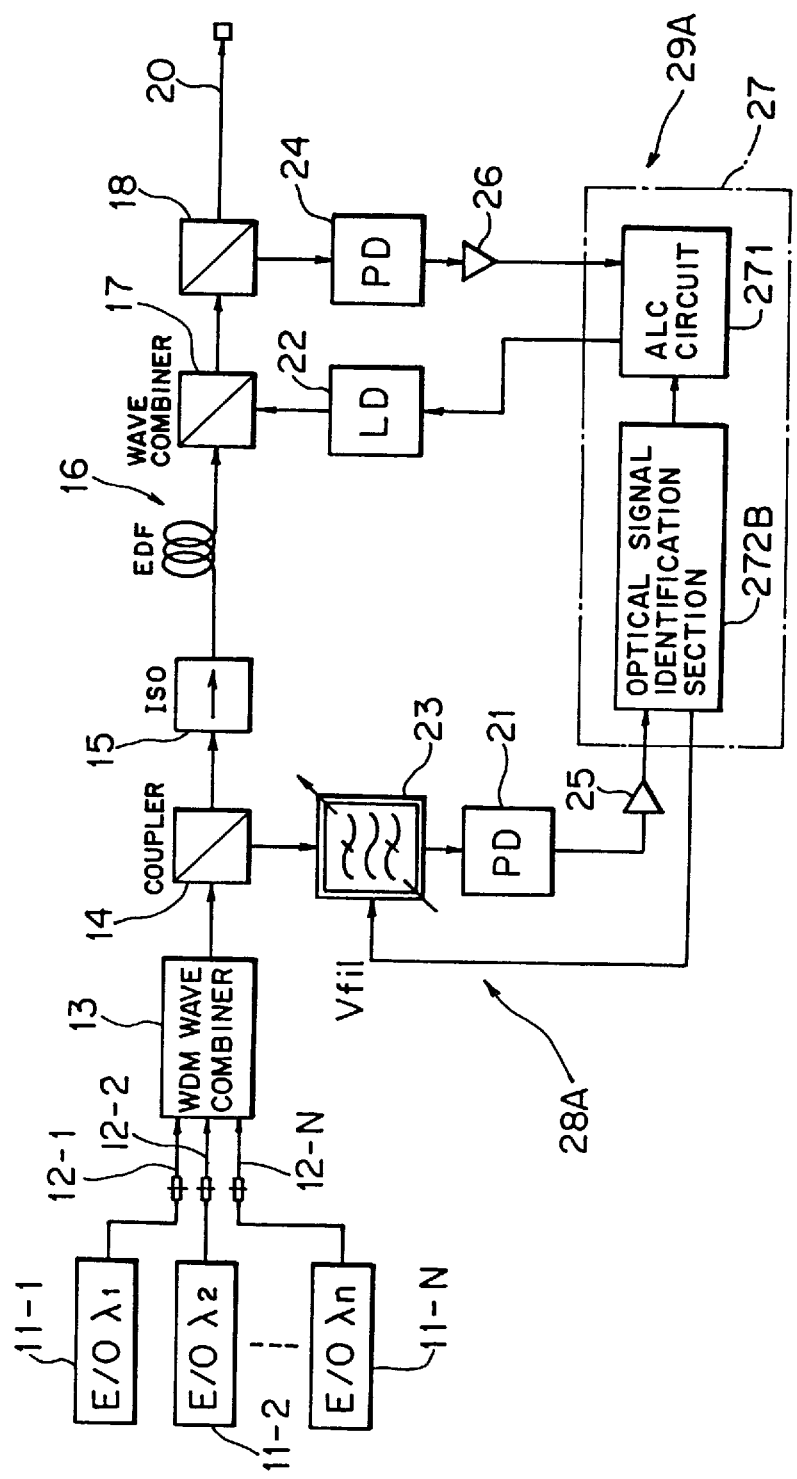
FIG. 18 is a block diagram showing a construction of another multi-wavelength optical batch amplification apparatus to which the present invention is applied.

Referring now to FIG. 18, there is shown in block diagram a construction of a multi-wavelength optical batch amplification apparatus according to a second preferred embodiment of the present invention. The multi-wavelength optical batch amplification apparatus of the present embodiment is a modification to and includes several common components to those of the multi-wavelength optical batch amplification apparatus of the first embodiment described hereinabove with reference to FIG. 5. Overlapping detailed description of such common components is omitted herein to avoid redundancy.

The multi-wavelength optical batch amplification apparatus includes a plurality of optical signal sources (E/O) 11-1 to 11-N (N is a natural number) which output optical signals (input optical signals) of different wavelengths λ1 to λn from each other (n is a natural number), and a plurality of optical signal input lines 12-1 to 12-N for transmitting the optical signals of the different wavelengths from the optical signal sources 11-1 to 11-N, respectively.

The multi-wavelength optical batch amplification apparatus further includes a wavelength multiplexing (WDM) wave combiner 13, two couplers (CPL) 14 and 18, an isolator (ISO) 15, an erbium doped fiber (EDF) optical amplifier 16, a wave combiner 17 and an optical signal output line 20 which transmits an output optical signal amplified in a batch by the EDF optical amplifier 16.

The multi-wavelength optical batch amplification apparatus further includes two photodiodes (PD) 21 and 24, a laser diode (pumping laser diode (LD)) 22, a tunable optical filter 23, two amplification sections 25 and 26 for amplifying electric signal outputs of the photodiodes 21 and 24 to a required signal level, respectively, and a control section 27.

In the present embodiment, an individual input light detection section 28A for monitoring the powers of input optical signals of the wavelengths λ1 to λn on the input side of the EDF optical amplifier 16 is formed from the tunable optical filter 23, the photodiode 21 and the amplification section 25, and an entire output light detection section 29A for monitoring the total output power of component optical signals of the output optical signal on the output side of the EDF optical amplifier 16 is formed from the photodiode 24 and the amplification section 26.

In particular, while, in the multi-wavelength optical batch amplification apparatus of the first embodiment described above, the total power of input optical signals is monitored on the input side of the EDF optical amplifier 16 by the entire input light detection section 28 and component optical signals of an output optical signal are monitored for the individual wavelengths λ1 to λn on the output side of the EDF optical amplifier 16 by the individual output light detection section 29, in the multi-wavelength optical batch amplification apparatus of the present embodiment, input optical signals are conversely monitored for the individual wavelengths $\lambda 1$ to $\lambda n$ on the input side of the EDF optical amplifier 16 by the individual input light detection section 28A while the total power of component optical signals of an output optical signal is monitored on the output side of the EDF optical amplifier 16 by the entire output light detection section 29A.

To this end, the control section 27 in the present embodiment includes an optical signal identification section 272B and an ALC circuit 271 which is similar to that described hereinabove with reference to FIG. 5. The control section 27 thus controls the output power of pumping light to be outputted from the pumping laser diode 22 based on results of detection by monitoring of optical signals by the individual input light detection section 28A and the entire output light detection section 29A described above to control the powers of the component optical signals of the output optical signal for the individual wavelengths $\lambda 1$ to $\lambda n$ to be outputted from the optical signal output line 20 on the output side of the EDF optical amplifier 16 so that they may be equal to each other.

Figure 19:
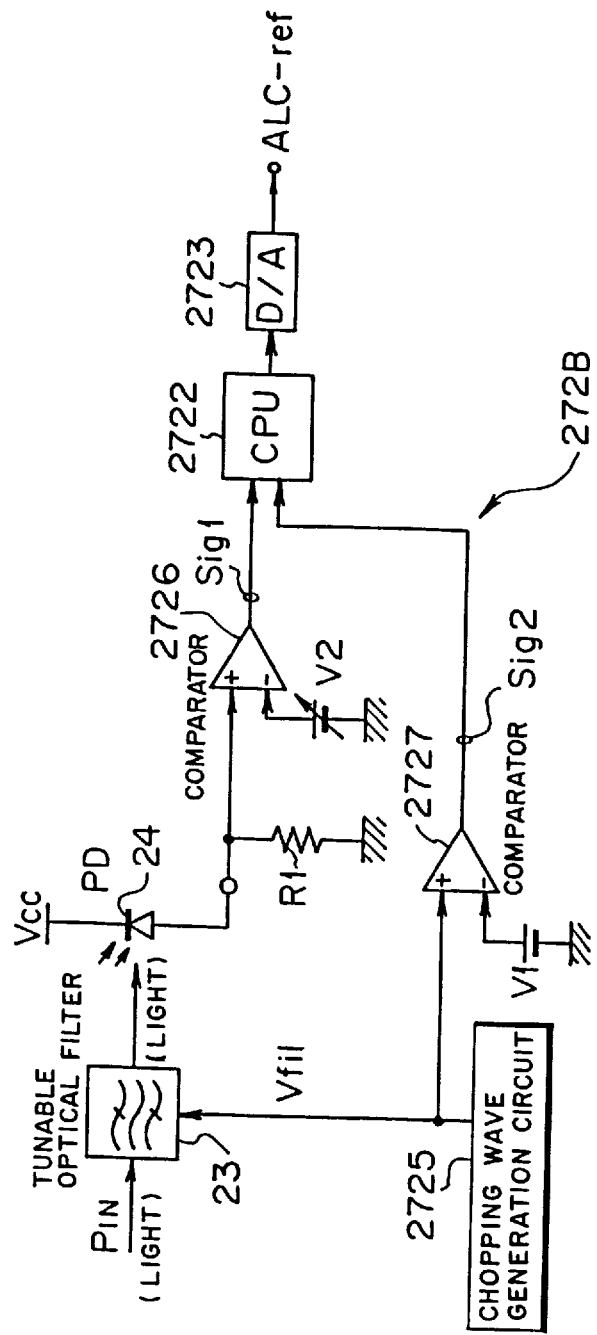
FIG. 19 is a block diagram showing a detailed construction of an optical signal identification section of the multi-wavelength optical batch amplification apparatus of FIG. 18.

The optical signal identification section 272B monitors input optical signals of the individual wavelengths $\lambda 1$ to $\lambda n$ obtained by the tunable optical filter 23 of the individual input light detection section 28A to obtain number information of the input optical signals. Referring to FIG. 19, the optical signal identification section 272B includes a CPU 2722, a D/A converter 2723, a chopping wave generation circuit 2725 and a comparator 2727.

Also in the present embodiment, the chopping wave generation circuit 2725 generates a chopping wave which exhibits a maximum voltage value after each period t1 as seen in FIG. 9(*a*) and outputs the chopping wave as an application voltage Vfil to the tunable optical filter 23 and as an input to the comparator 2727.

The comparator 2726 compares a voltage value of an input optical signal transmitted through the tunable optical filter 23 with a reference voltage V2 and outputs a "H" level pulse as a pulse signal Sig1 each time an input optical signal is received. The comparator 2727 compares the voltage value of the chopping wave supplied thereto from the chopping wave generation circuit 2725 with another reference voltage V1 and outputs a "H" level pulse each time the voltage value of the chopping wave exhibits a level higher than the reference voltage V1. Thus, the comparator 2727 outputs a pulse signal Sig2 which exhibits a "H" level after each period t1.

The CPU 2722 detects the number of pulses of the pulse signal Sig1 from the comparator 2726 within one period (t1) of the pulse signal Sig2 from the comparator 2727 to detect number information of the input optical signals and outputs a voltage value corresponding to the number information of the input optical signals as a digital signal. The D/A converter 2723 converts the voltage value in the form of a digital amount from the CPU 2722 into an analog signal and outputs the analog signal as a reference voltage (ALC-ref) for the ALC circuit 271.

In the multi-wavelength optical batch amplification apparatus of the construction described above, when a plurality of input optical signals of different wavelengths $\lambda 1$ to $\lambda n$ from the optical signal sources 11-1 to 11-N are amplified in a batch by the EDF optical amplifier 16 and outputted from the optical signal output line 20, a multi-wavelength input optical signal branched by the coupler 14 is transmitted through the tunable optical filter 23 for the individual wavelengths $\lambda 1$ to $\lambda n$ in response to an application voltage Vfil received from the optical signal identification section 272B. Then, the input optical signals of the multi-wavelength optical signal are converted into electric signals corresponding to the powers thereof for the individual wavelengths $\lambda 1$ to $\lambda n$ by the photodiode 21 and outputted to the optical signal identification section 272B of the control section 27.

Meanwhile, in the entire output light detection section 29A, the total power of the output optical signals branched by the coupler 18 is converted into an electric signal by the photodiode 24 and outputted to the ALC circuit 271 of the control section 27.

Then, in the optical signal identification section 272B, the CPU 2722 detects number information of the input optical signals from the pulse signal Sig1 outputted from the comparator 2726 and the pulse signal Sig2 outputted from the comparator 2727 and outputs a voltage value corresponding to the number information of the input optical signals as a digital signal. The voltage value in the form of a digital amount is converted into an analog signal by the D/A converter 2723 and outputted as a reference voltage (ALC-ref) for the ALC circuit 271.

Further, in the ALC circuit 271, a control voltage corresponding to the reference voltage (ALC-ref) is outputted to the pumping laser diode 22. Consequently, the pumping light output power of the pumping laser diode 22 is adjusted based on the control voltage to control (feedforward control) the output optical signal so that the output optical signal per one wavelength may be equal to each other on the output side of the EDF optical amplifier 16.

In this manner, with the multi-wavelength optical batch amplification apparatus of the present embodiment, the individual input light detection section 28A monitors input optical signals for the individual wavelengths $\lambda 1$ to $\lambda n$ on the input side of the EDF optical amplifier 16 while the entire output light detection section 29A monitors the total power of an output optical signal on the output side of the EDF optical amplifier 16, and the control section 27 controls the pumping light output power of the pumping laser diode 22 based on results of the detection. Consequently, the powers of the output optical signals on the output side of the EDF optical amplifier 16 can be controlled so that they may be fixed equally to each other for the individual wavelengths $\lambda 1$ to $\lambda n$.

Accordingly, even if the power of an optical signal of some wavelength of the multi-wavelength optical signal in which the input optical signals of the different wavelengths $\lambda 1$ to $\lambda n$ are multiplexed and combined drops, this does not have any influence on the optical signals of the other wavelengths, and the output optical signal can be fixed equally for the individual wavelengths.

Further, with the multi-wavelength optical batch amplification apparatus described above, since the tunable optical filter 23 is employed in the individual input light detection section 28A, input optical signals can be monitored for the individual wavelengths $\lambda 1$ to $\lambda n$ on the input side of the EDF optical amplifier 16 very readily.

Figure 20:
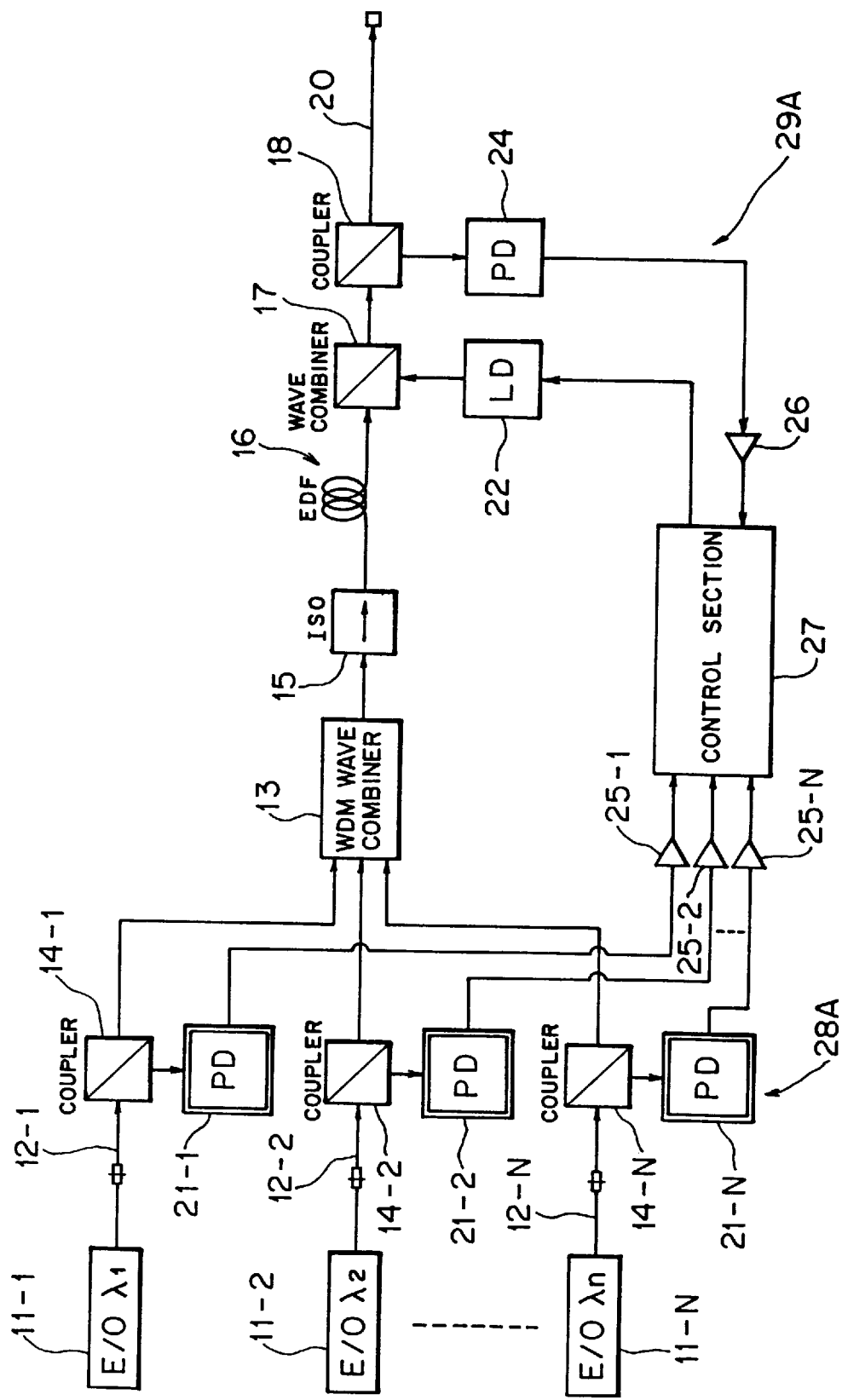
FIG. 20 is a block diagram showing a modified construction of the multi-wavelength optical batch amplification apparatus of FIG. 18.

While the multi-wavelength optical batch amplification apparatus described above is constructed such that the tunable optical filter 23 is employed for the individual input light detection section 28A, it may be modified, for example, in such a manner as shown in FIG. 20. Referring to FIG. 20, the individual input light detection section 28A includes couplers 14-1 to 14-N provided for the optical signal input lines 12-1 to 12-N, respectively, photodiodes (PD) 21-1 to 21-N for converting input optical signals of wavelengths $\lambda 1$ to $\lambda n$ branched by the couplers 14-1 to 14-N into electric signals corresponding the powers of them, and amplification sections 25-1 to 25-N for amplifying the electric signals obtained by the photodiodes 21-1 to 21-N to a desired signal level, respectively, and monitors the input optical signals from the optical signal input lines 12-1 to 12-N for the individual wavelengths λ1 to λn, respectively.

Figure 21:
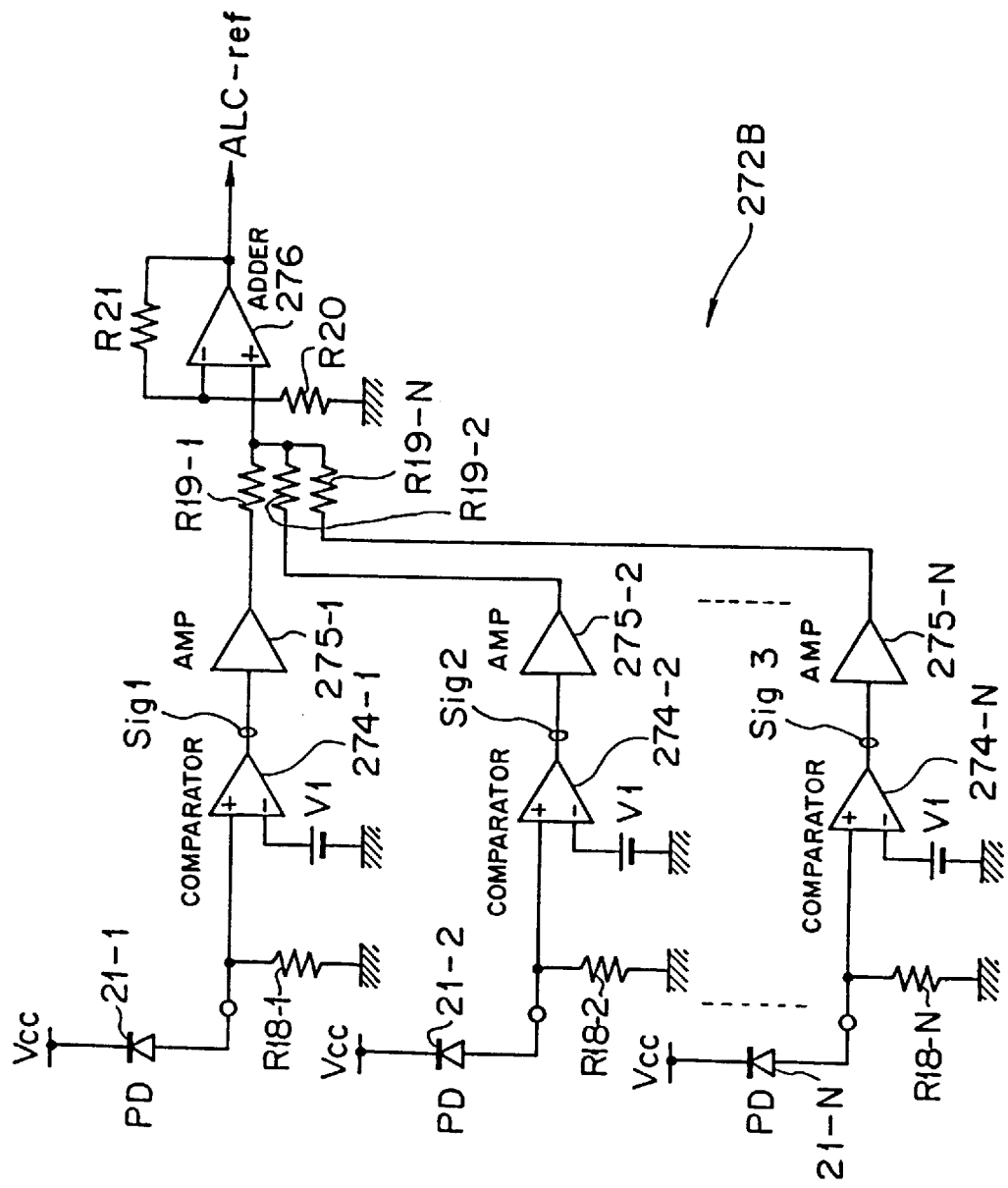
FIG. 21 is a block diagram showing a detailed construction of the optical signal identification section of the modified multi-wavelength optical batch amplification apparatus of FIG. 20.

In this instance, the optical signal identification section 272B in the control section 27 described above includes, as shown in FIG. 21, comparators 274-1 to 274-N and amplifiers (AMP) 275-1 to 275-N provided corresponding to the individual wavelengths λ1 to λn, respectively, and an adder 276 for adding the outputs of the amplifiers 275-1 to 275-N. It is to be noted that, in FIG. 21, reference characters R18-1 to R18-N, R19-1 to R19-N, R20 and R21 denote each a resistor, and V1 denotes a voltage source for supplying a reference voltage for the comparators 274-1 to 274-N.

Thus, in the optical signal identification section 272B, the voltage values of the individual wavelengths λ1 to λn obtained by photoelectric conversion in accordance with the powers of them by the photodiodes 21-1 to 21-N are compared with the reference voltage V1 by the comparators 274-1 to 274-N, respectively. Then, the outputs of the comparators 274-1 to 274-N are amplified to a desired voltage value by the amplifiers 275-1 to 275-N, respectively, and added by the adder 276 to obtain a voltage value corresponding to the number of the input optical signals. The voltage value is supplied as a reference voltage (ALC-ref) for the ALC circuit 271 (refer to FIG. 18) to the ALC circuit 271.

Then, the ALC circuit 271 produces a control voltage for the pumping laser diode 22 based on the total power of the output optical signal obtained by the photodiode 24 constructing the entire output light detection section 29A and the reference voltage (ALC-ref) from the optical signal identification section 272B and outputs the control voltage to the pumping laser diode 22. Consequently, the pumping light output power of the pumping laser diode 22 is adjusted in accordance with the control voltage to control the powers of the component optical signals of the output optical signal of the wavelengths λ1 to λn to be outputted from the optical signal output line 20 so that they may be fixed equally on the output side of the EDF optical amplifier 16.

In this manner, also with the modified multi-wavelength optical batch amplification apparatus shown in FIG. 20, the individual input light detection section 28A monitors input optical signals for the individual wavelengths λ1 to λn while the entire output light detection section 29A monitors the total power of the output optical signal, and the control section 27 detects the output optical signal power per one wavelength of the wavelengths λ1 to λn and controls the pumping light output power of the pumping laser diode 22. Consequently, the powers of the component optical signals of the output optical signal on the output side of the EDF optical amplifier 16 can be controlled so that they may be fixed equally for the individual wavelengths λ1 to λn.

Further, in this instance, since the couplers 14-1 to 14-N and the photodiodes 21-1 to 21-N are used for the individual input light detection section 28A so that the input optical signals on the input side of the EDF optical amplifier 16 are monitored for the individual wavelengths λ1 to λn from the optical signal input lines 12-1 to 12-N, information for the control section 27 such as number information of input optical signals can be obtained with a higher degree of certainty.

The individual input light detection section 28A may be constructed otherwise such that it may monitor input optical signals directly from the optical signal sources 11-1 to 11-N for the individual wavelengths λ1 to λn.

Figure 22:
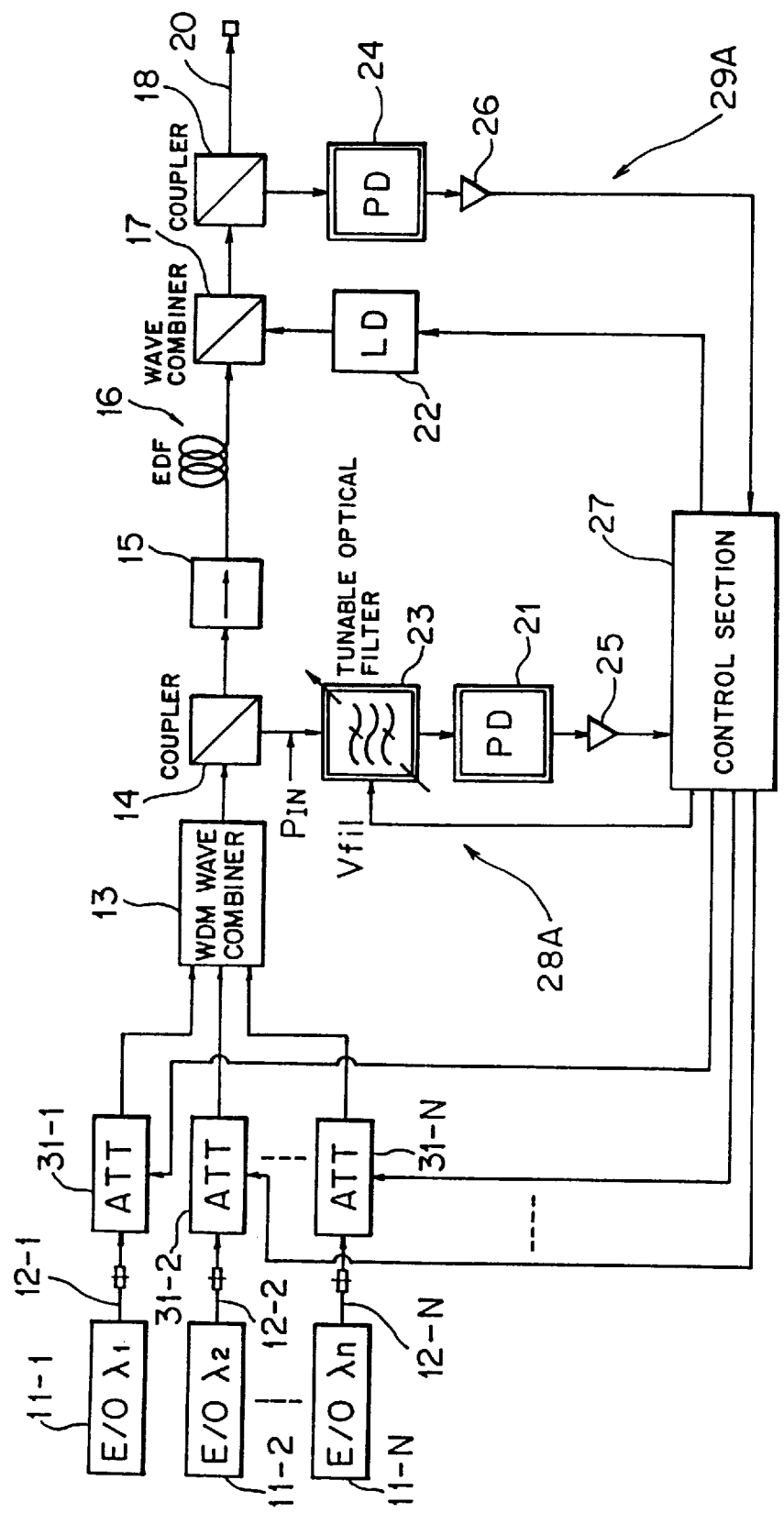
FIGS. 22 to 24 are block diagrams showing different modified constructions of the multi-wavelength optical batch amplification apparatus of FIG. 18.

While the multi-wavelength optical batch amplification apparatus described hereinabove with reference to FIG. 18 is constructed such that the pumping light output power of the pumping laser diode 22 is controlled to control the output powers of the component optical signals of the output optical signal so that they may be fixed equally, it may be modified in such a manner as seen in FIG. 22. Referring to FIG. 22, similarly as in the first embodiment described above, variable optical attenuators (ATT: optical amplifier output adjustment sections) 31-1 to 31-N are provided for the individual optical signal input lines 12-1 to 12-N, respectively, and the control section 27 controls the pumping light output power of the pumping laser diode 22 as well as the attenuation factors of the variable optical attenuators 31-1 to 31-N based on control information (number information of the input optical signals, the total power of the output optical signals and so forth) for the control section 27 obtained by the individual input light detection section 28A and the entire output light detection section 29A. Consequently, the powers of the component optical signals of the output optical signal on the output side of the EDF optical amplifier 16 can be controlled so that they may be fixed equally for the individual wavelengths λ1 to λn.

It is to be noted that, in this instance, the ATT control circuit 273 in the first embodiment having the construction described hereinabove with reference to FIG. 13 is employed in the control section 27 and the attenuation factors of the variable optical attenuators 31-1 to 31-N are controlled by the ATT control circuit 273.

Further, also in this instance, where the individual input light detection section 28A is constructed such that the input optical signals on the input side of the EDF optical amplifier 16 are monitored for the individual wavelengths λ1 to λn from the optical signal input lines 12-1 to 12-N (or optical signal sources 11-1 to 11-N) as described hereinabove with reference to FIG. 20, control information for the control section 27 such as number information of input optical signals can be obtained with a higher degree of certainty.

Figure 23:
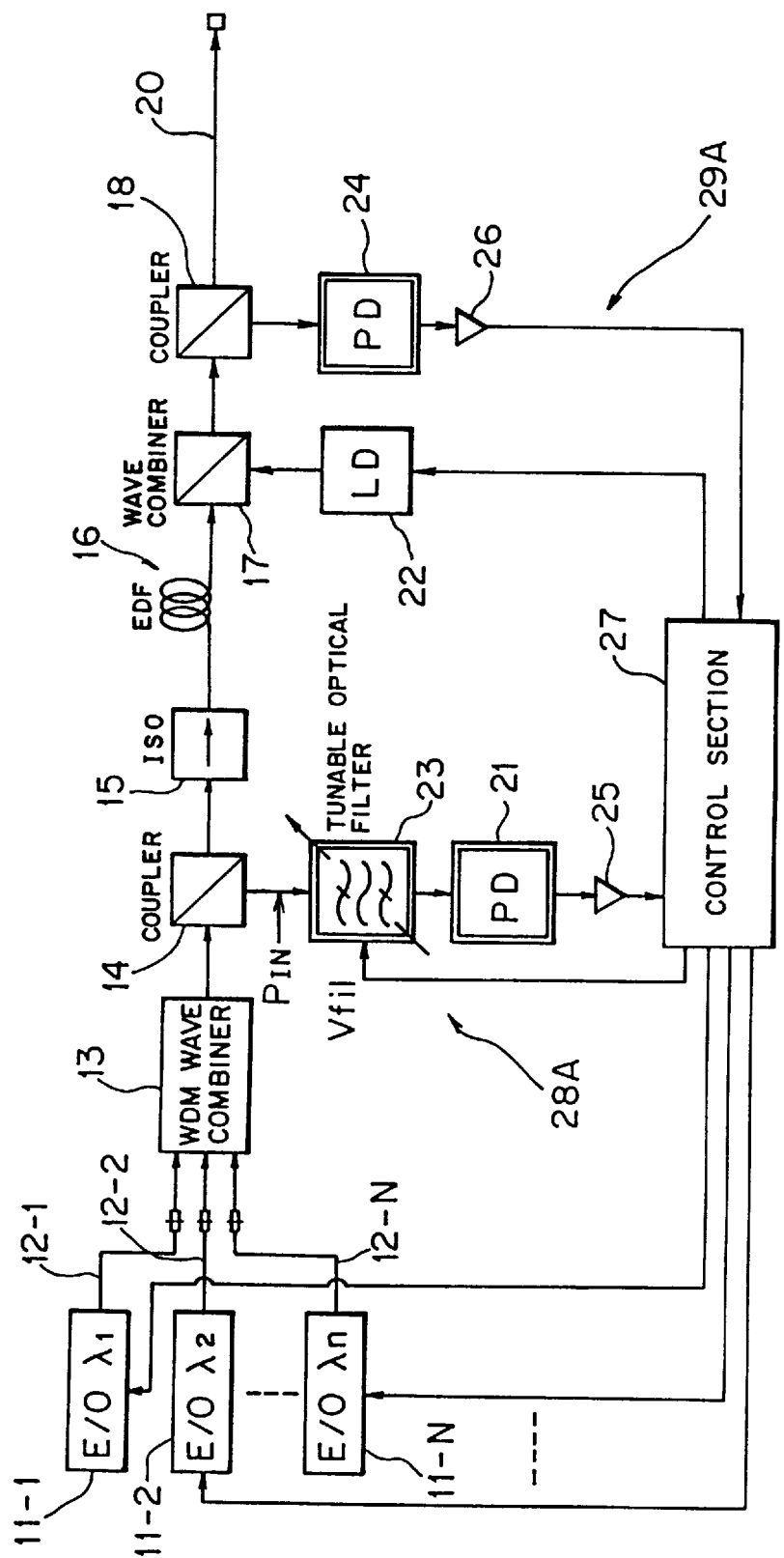

The multi-wavelength optical batch amplification apparatus described hereinabove with reference to FIG. 12 may be modified otherwise in such a manner as shown in FIG. 23. Referring to FIG. 23, in the modified multi-wavelength optical batch amplification apparatus shown, the optical signal sources 11-1 to 11-N are constructed as adjustable output optical signal sources whose outputs are adjustable, and the control section 27 similarly detects the output power per one wavelength of the wavelengths λ1 to λn from control information (number information of the input optical signals, the total power of the output optical signals and so forth) for the control section 27 obtained by the individual input light detection section 28A and the entire output light detection section 29A. Then, the control section 27 controls the output powers of the pumping laser diode 22 and the optical signal sources 11-1 to 11-N based on the thus detected output power per one wavelength to control the powers of the component optical signals of the output optical signal to be outputted from the optical signal output line 20 so that they may individually be fixed for the individual wavelengths λ1 to λn on the output side of the EDF optical amplifier 16.

It is to be noted that, in this instance, an E/O output control circuit 273' similar to that employed in the first embodiment described hereinabove with reference to FIG. 15 is employed in the control section 27, and the outputs of the optical signal sources 11-1 to 11-N are controlled by the E/0 output control circuit 273'.

Figure 24:
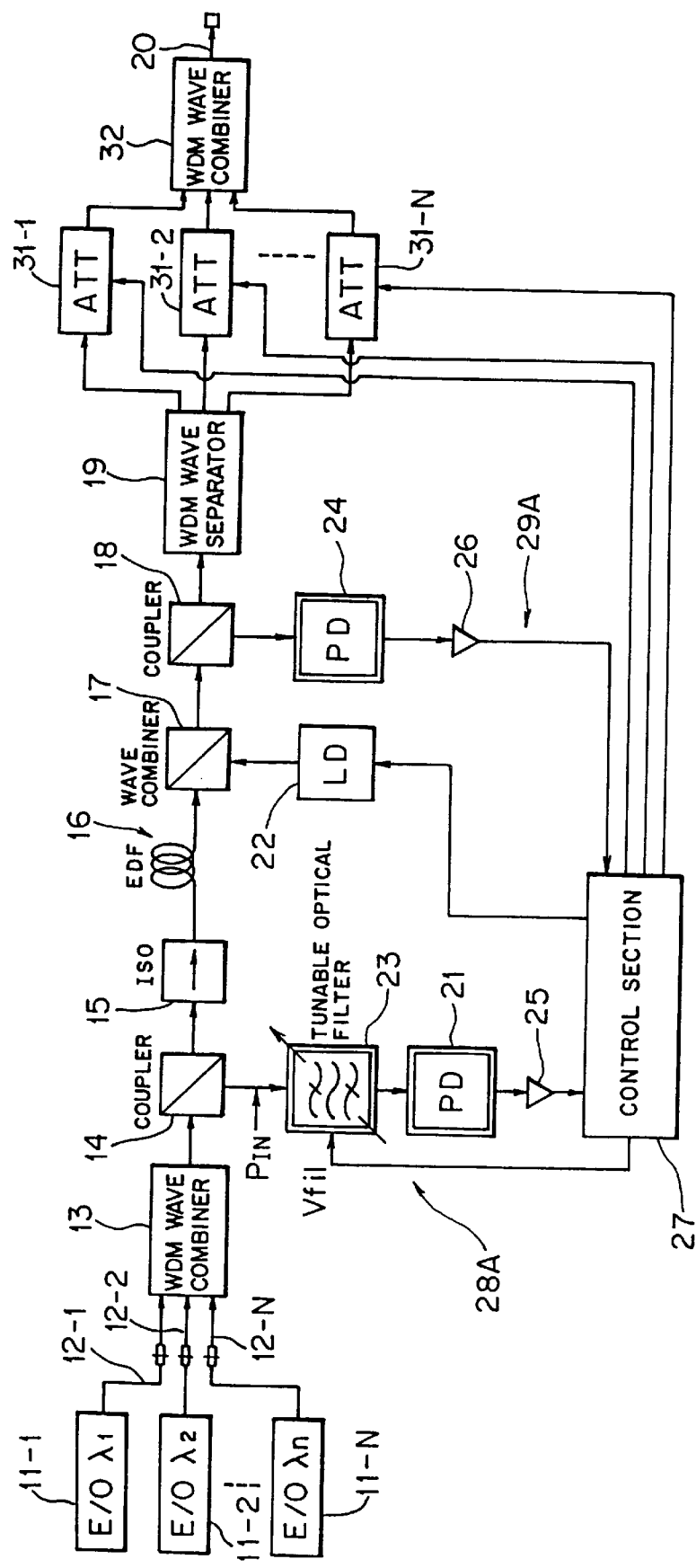

The multi-wavelength optical batch amplification apparatus of the embodiment described hereinabove with reference to FIG. 18 may be modified otherwise in such a manner as shown in FIG. 24. Referring to FIG. 24, in the modified multi-wavelength optical batch amplification apparatus shown, variable optical attenuators (ATT: optical amplifier output adjustment sections) 31-1 to 31-N are provided for individual optical signal output lines of the WDM wave separator 19, and the control section 27 detects the output power per one wavelength of the wavelengths λ1 to λn from control information (number information of input optical signals, the total power of the output optical signals and so forth) for the control section 27 obtained from the individual input light detection section 28A and the entire output light detection section 29A. Then, the control section 27 controls the output powers of the pumping laser diode 22 and the variable optical attenuators 31-1 to 31-N based on the thus detected output power per one wavelength to control the powers of the output optical signals on the output side of the EDF optical amplifier 16 so that they may be fixed equally for the wavelengths λ1 to λn in a similar manner as described above.

Thereafter, the output optical signals of the wavelengths λ1 to λn are combined by the WDM wave combiner 32 and outputted by way of the optical signal output line 20.

It is to be noted that, in this instance, the ATT control circuit 273 in the first embodiment having the construction described hereinabove with reference to FIG. 13 is employed in the control section 27, and the attenuation factors of the variable optical attenuators 31-1 to 31-N are controlled by the ATT control circuit 273.

d. Third Embodiment

Figure 25:
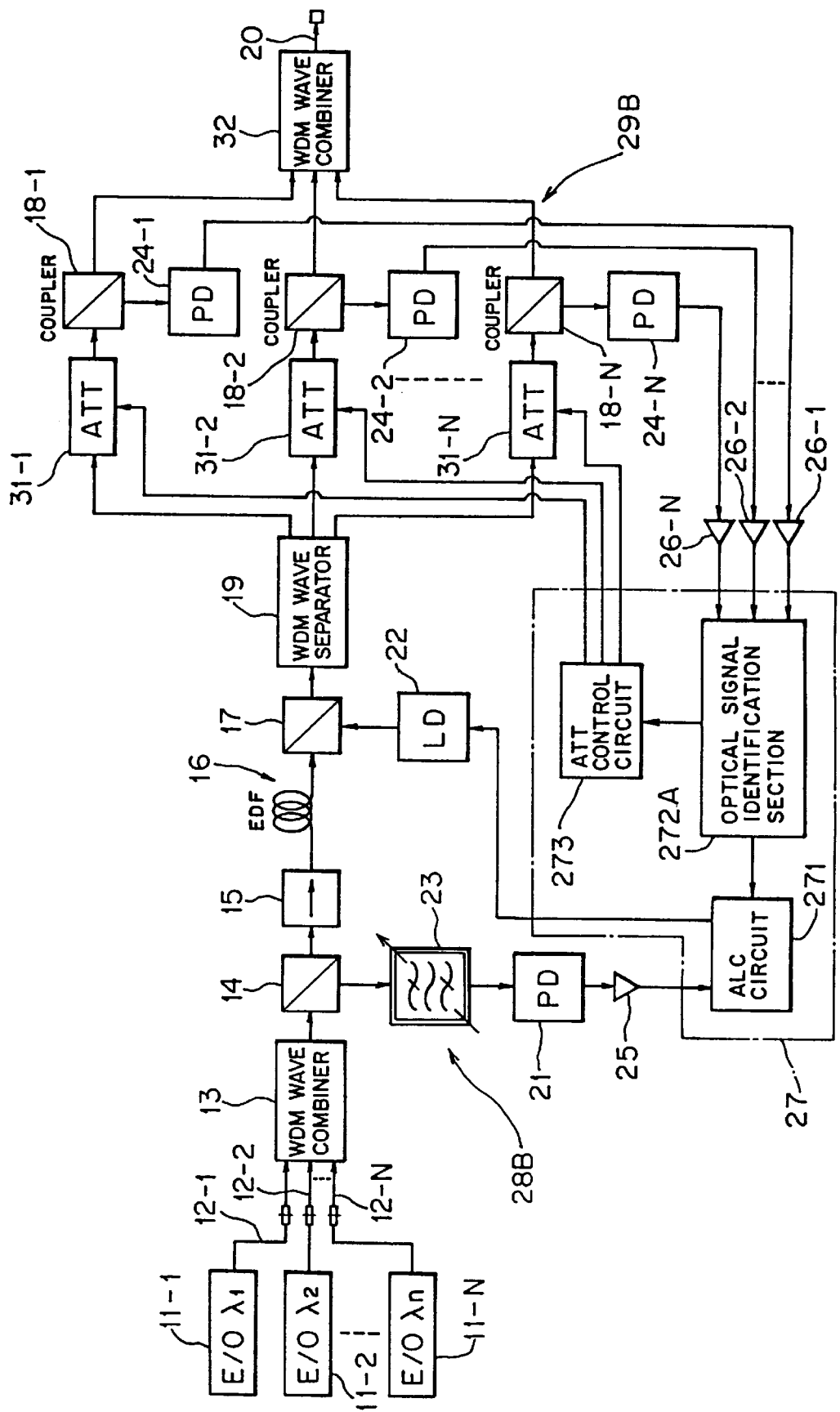
FIG. 25 is a block diagram showing a construction of a further multi-wavelength optical batch amplification apparatus to which the present invention is applied.

Referring now to FIG. 25, there is shown in block diagram a construction of a multi-wavelength optical batch amplification apparatus according to a third preferred embodiment of the present invention. The multi-wavelength optical batch amplification apparatus of the present embodiment is a modification to and includes several common components to those of the multi-wavelength optical batch amplification apparatus of the first embodiment described hereinabove with reference to FIG. 5. Overlapping detailed description of such common components is omitted herein to avoid redundancy.

The multi-wavelength optical batch amplification apparatus includes a plurality of optical signal sources (E/O) 11-1 to 11-N (N is a natural number) which output optical signals (input optical signals) of different wavelengths λ1 to λn (n is a natural number), and a plurality of optical signal input lines 12-1 to 12-N for transmitting the optical signals of the different wavelengths from the optical signal sources 11-1 to 11-N, respectively.

The multi-wavelength optical batch amplification apparatus further includes a wavelength multiplexing (WDM) wave combiner 13, two couplers (CPL) 14 and 18, an isolator (ISO) 15, an erbium doped fiber (EDF) optical amplifier 16, a wave combiner 17 and an optical signal output line 20 which transmits an output optical signal amplified in a batch by the EDF optical amplifier 16.

The multi-wavelength optical batch amplification apparatus further includes a photodiode (PD) 21, a laser diode (pumping laser diode (LD)) 22, an amplification section 25 for amplifying an electric signal output of the photodiode 21 to a required signal level, and a control section 27.

Then, also in the multi-wavelength optical batch amplification apparatus shown in FIG. 25, an individual input light detection section 28B for monitoring the powers of input optical signals of the wavelengths λ1 to λn on the input side of the EDF optical amplifier 16 is formed from the tunable optical filter 23, the photodiode 21 and the amplification section 25, and an individual output light detection section 29B for monitoring individual output optical signals for the individual wavelengths λ1 to λn on the output side of the EDF optical amplifier 16 is formed from the couplers 18-1 to 18-N which branch output optical signals separated by the WDM wave separator 19, the photodiodes (PD) 24-1 to 24-N which photo-electrically convert the output optical signals branched by the couplers 18-1 to 18-N, respectively, and the amplification sections 26-1 to 26-N which amplify the electric signals obtained by the photodiodes 24-1 to 24-N to a desired signal level, respectively. Thus, the output optical signals after separated by the WDM wave separator 19 are individually monitored for the individual wavelengths λ1 to λn.

In particular, in the multi-wavelength optical batch amplification apparatus of the present embodiment, input optical signals are monitored for the individual wavelengths λ1 to λn on the input side of the EDF optical amplifier 16 by the individual input light detection section 28B and output optical signals are monitored for the individual wavelengths λ1 to λn on the output side of the EDF optical amplifier 16 by the individual output light detection section 29B.

Further, in the multi-wavelength optical batch amplification apparatus shown in FIG. 25, variable optical attenuators (ATT: optical amplifier output adjustment sections) 31-1 to 31-N are provided on the output side of the WDM wave separator 19 (on the output side of the EDF optical amplifier 16) corresponding to the optical signal sources 11-1 to 11-N, respectively. Then, the control section 27 controls the output powers of the pumping laser diode 22 and the variable optical attenuators 31-1 to 31-N based on the output power per one wavelength of the wavelengths λ1 to λn obtained from the individual input light detection section 28B and the individual output light detection section 29B to control the powers of the output optical signals on the output side of the EDF optical amplifier 16 so that they may be fixed equally for the wavelengths λ1 to λn.

Figure 26:
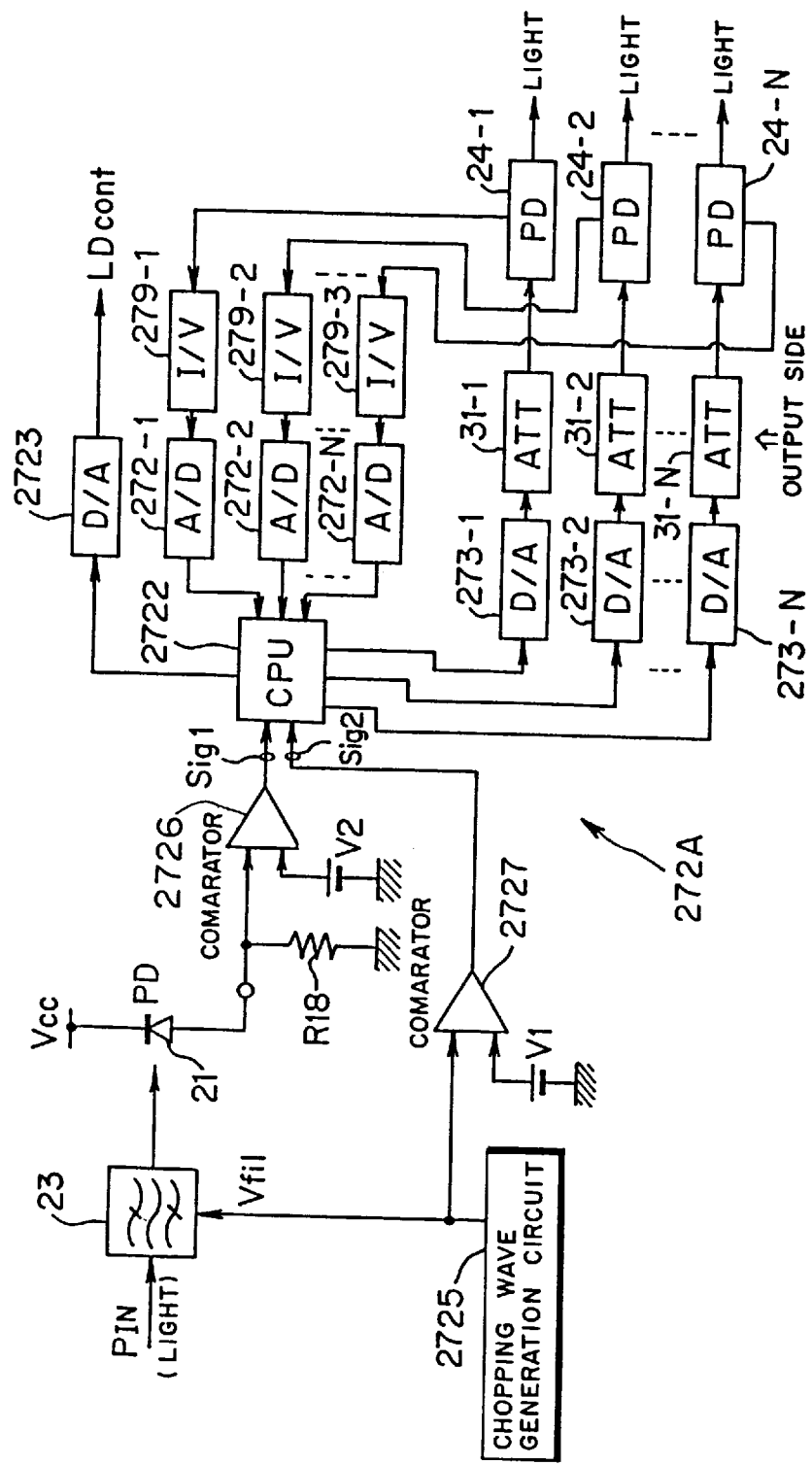
FIG. 26 is a block diagram showing a detailed construction of an optical signal identification section of the multi-wavelength optical batch amplification apparatus of FIG. 25.

To this end, the control section 27 in the present embodiment includes an ALC circuit 271, an optical signal identification section 272A and a variabel optical attenuator (ATT) control circuit 273. Referring to FIG. 26, the optical signal identification section 272A includes a CPU 2722, a D/A converter 2723, a chopping wave generation circuit 2725, a plurality of A/D converters 272-1 to 272-N, and a plurality of current to voltage (I/V) converters 279-1 to 279-N. Meanwhile, the ATT control circuit 273 includes a plurality of D/A converters 273-1 to 273-N.

Also in the present embodiment, the chopping wave generation circuit 2725 generates a chopping wave which exhibits a maximum voltage value after each period t1 as seen in FIG. 9(a) and outputs the chopping wave as an application voltage Vfil to the tunable optical filter 23 and as an input to the comparator 2727. The comparator 2726 compares a voltage value of an input optical signal transmitted through the tunable optical filter 23 with a reference voltage V2 and outputs a "H" level pulse as a pulse signal Sig1 each time an input optical signal is received. The comparator 2727 compares the voltage value of the chopping wave supplied thereto from the chopping wave generation circuit 2725 with another reference voltage V1 and outputs a "H" level pulse each time the voltage value of the chopping wave exhibits a level higher than the reference voltage V1. Thus, the comparator 2727 outputs a pulse signal Sig2 which exhibits a "H" level after each period t1.

The I/V converters 279-1 to 279-N convert values of electric currents obtained by photoelectric conversion by the photodiodes 24-1 to 24-N from output optical signals branched by the couplers 18-1 to 18-N into voltage values, respectively. The A/D converters 272-1 to 272-N convert the voltage values inputted thereto from the I/V converters 279-1 to 279-N into digital amounts and outputs the digital values to the CPU 2722.

The CPU 2722 also in this instance detects the number of pulses of the pulse signal Sig1 from the comparator 2726 within one period (t1) of the pulse signal Sig2 from the comparator 2727 to detect number information of the input optical signals and detects power information for the individual wavelengths $\lambda 1$ to $\lambda n$ obtained by way of the I/V converters 279-1 to 279-N and the A/D converters-272-1 to 272-N. Then, the CPU 2722 produces control voltages for the pumping laser diode 22 and the variable optical attenuators 31-1 to 31-N based on the number information and the power information thus detected and outputs the control voltages each in the form of a digital amount.

The D/A converters 273-1 to 273-N and the D/A converter 2723 convert the voltage values each in the form of a digital amount from the CPU 2722 into analog signals.

In the multi-wavelength optical batch amplification apparatus of the construction described above, when input optical signals of different wavelengths $\lambda 1$ to $\lambda n$ from the optical signal sources 11-1 to 11-N are amplified in a batch by the EDF optical amplifier 16 and are separated into output optical signals of the individual wavelengths $\lambda 1$ to $\lambda n$ by the WDM wave separator 19 to obtain the output optical signals, a multi-wavelength input optical signal branched by the coupler 14 is transmitted through the tunable optical filter 23 for the individual wavelengths $\lambda 1$ to $\lambda n$ in response to an application voltage Vfil received from the optical signal identification section 272A. Then, the input optical signals of the multi-wavelength optical signal are converted into electric signals based on the powers thereof for the individual wavelengths $\lambda 1$ to $\lambda n$ by the photodiode 21 and outputted to the control section 27.

Meanwhile, in the individual output light detection section 29B, the output optical signals for the individual wavelengths $\lambda 1$ to $\lambda n$ branched by the couplers 18-1 to 18-N are converted into electric signals by the photodiodes 24-1 to 24-N, respectively, and outputted to the control section 27.

Then, in the optical signal identification section 272A of the control section 27, the CPU 2722 detects number information of the input optical signals from the pulse signals Sig1 and Sig2 and the I/V converters 279-1 to 279-N convert the electric currents of the output optical signals for the individual wavelengths $\lambda 1$ to $\lambda n$ from the photodiodes 24-1 to 24-N into voltage values, respectively. The voltage values are converted into voltage values each in the form of a digital amount by the A/D converters 272-1 to 272-N to obtain the output powers of the individual wavelengths $\lambda 1$ to $\lambda n$, respectively The power per one wavelength is calculated based on the number information and the output power.

Then, the CPU 2722 outputs a control voltage in the form of a digital amount for controlling the power per one wavelength to a desired power. The control voltage is converted into voltage values each in the form of an analog amount by the D/A converter 2723 and the D/A converters 273-1 to 273-N and outputted as control voltages for the pumping laser diode 22 and the A/D converters 272-1 to 272-N, respectively.

As a result, the pumping light output power of the pumping laser diode 22 and the attenuation factors of the variable optical attenuators 31-1 to 31-N are adjusted based on the control voltages to control (feedforward control) the output optical signals so that the output power per one wavelength may be fixed equally on the output side of the EDF optical amplifier 16. In this instance, the feedback control is achieved by constructing the multi-wavelength optical batch amplification apparatus such that the output of the individual output light detection section 29B is inputted to the ALC circuit 271 and the output of the individual input light detection section 28B is inputted to the optical signal identification section 272A.

In this manner, with the multi-wavelength optical batch amplification apparatus of the present embodiment, when input optical signals of different wavelengths $\lambda 1$ to $\lambda n$ from the optical signal sources 11-1 to 11-N are amplified in a batch by the EDF optical amplifier 16 and are branched into output optical signals for the individual wavelengths $\lambda 1$ to $\lambda n$ by the WDM wave separator 19 to obtain the output optical signals, the input optical signals can be monitored for the individual wavelengths $\lambda 1$ to $\lambda n$ on the input side of the EDF optical amplifier 16 by the individual input light detection section 28B and the output optical signals can be monitored for the individual wavelengths $\lambda 1$ to $\lambda n$ on the output side of the EDF optical amplifier 16 by the individual output light detection section 29B.

Accordingly, the control section 27 can control the output powers of the pumping laser diode 22 and the variable optical attenuators 31-1 to 31-N based on the output power per one wavelength of the wavelengths $\lambda 1$ to $\lambda n$ obtained from the individual input light detection section 28B and the individual output light detection section 29B to control the powers of the output optical signals on the output side of the EDF optical amplifier 16 so that they may be fixed equally for the individual wavelengths $\lambda 1$ to $\lambda n$. Consequently, even if the power of an optical signal of some wavelength from among the input optical signals of the different wavelengths $\lambda 1$ to $\lambda n$ drops, the powers of the output optical signals on the output side of the EDF optical amplifier 16 can be controlled so that they may be fixed equally for the individual wavelengths $\lambda 1$ to $\lambda n$.

Further, with the multi-wavelength optical batch amplification apparatus shown in FIG. 25, since control information such as number information, the powers and so forth of optical signals for the control section 27 can be obtained not only from the input side but also from the output side of the EDF optical amplifier 16 by means of the individual output light detection section 29B, the powers of the output optical signals on the output side of the EDF optical amplifier 16 can be controlled so that they may be fixed equally for the individual wavelengths $\lambda 1$ to $\lambda n$.

It is to be noted that the individual input light detection section 28B may be constructed in such a manner as shown in FIG. 20 wherein it includes a plurality of couplers 14-1 to 14-N, a plurality of photodiodes (PD) 21-1 to 21-N and a plurality of amplification sections 25-1 to 25-N and the input optical signals from the optical signal input lines 12-1 to 12-N are monitored for the individual wavelengths $\lambda 1$ to $\lambda n$. Meanwhile, the individual output light detection section 29B can be constructed in such a manner as shown in FIG. 5 wherein it includes a tunable optical filter 23 and an amplification section 26.

The individual input light detection section 28B may alternatively be constructed such that it directly monitors the input optical signals from the optical signal sources 11-1 to 11-N for the individual wavelengths $\lambda 1$ to $\lambda n$.

It is to be noted that, while the control section 27 in the multi-wavelength optical batch amplification apparatus described above controls the pumping laser diode 22 and the variable optical attenuators 31-1 to 31-N, also the multi-wavelength optical batch amplification apparatus in the present embodiment may be modified, similarly as described hereinabove in connection with the first and second embodiments, such that the control section 27 controls only the pumping laser diode 22 based on the output power per one wavelength of the wavelengths λ1 to λn obtained by the individual input light detection section 28B and the individual output light detection section 29B. Also in the modified multi-wavelength optical batch amplification apparatus, the powers of the output optical signals on the output side of the EDF optical amplifier 16 can be controlled so that they may be fixed equally for the individual wavelengths λ1 to λn.

Further, similarly as described hereinabove in connection with the first and second embodiments, the multi-wavelength optical batch amplification apparatus of the present embodiment may otherwise be modified such that variable optical attenuators 31-1 to 31-N are provided for the individual optical signal input lines 12-1 to 12-N, respectively, and the control section 27 controls the variable optical attenuators 31-1 to 31-N provided for the optical signal input lines 12-1 to 12-N based on the output power per one wavelength of the wavelengths λ1 to λn obtained by the individual input light detection section 28B and the individual output light detection section 29B. Also in this instance, the powers of the output optical signals can be controlled so that they may be fixed equally for the individual wavelengths λ1 to λn.

Furthermore, similarly as described hereinabove in connection with the first and second embodiments, the multi-wavelength optical batch amplification apparatus of the present embodiment may otherwise be modified such that the optical signal sources (E/O) 11-1 to 11-N are constructed as adjustable output optical signal sources whose outputs are adjustable, and the control section 27 directly adjusts the outputs of the optical signal sources 11-1 to 11-N based on the output power per one wavelength of the individual wavelengths λ1 to λn obtained by the individual input light detection section 28B and the individual output light detection section 29B. Also in this instance, the powers of the output optical signals on the output side of the EDF optical amplifier 16 can be controlled so that they may uniformly be fixed for the individual wavelengths λ1 to λn.

e. Fourth Embodiment

Figure 27:
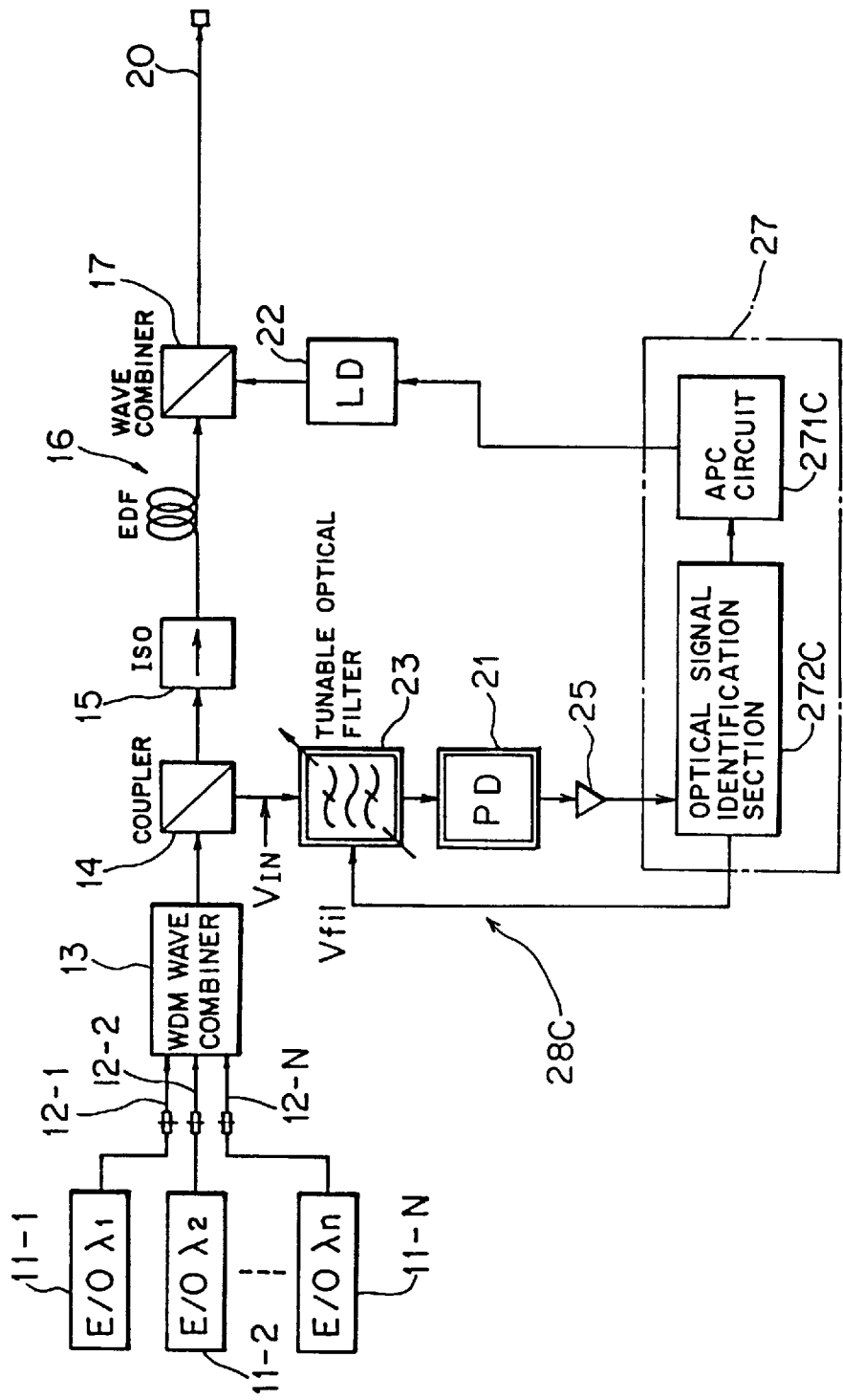
FIG. 27 is a block diagram showing a construction of a still further multi-wavelength optical batch amplification apparatus to which the present invention is applied.

Referring now to FIG. 27, there is shown in block diagram a construction of a multi-wavelength optical batch amplification apparatus according to a fourth preferred embodiment of the present invention. The multi-wavelength optical batch amplification apparatus of the present embodiment is a modification to and includes several common components to those of the multi-wavelength optical batch amplification apparatus of the first embodiment described hereinabove with reference to FIG. 5. Overlapping detailed description of such common components is omitted herein to avoid redundancy.

The multi-wavelength optical batch amplification apparatus includes a plurality of optical signal sources (E/O) 11-1 to 11-N (N is a natural number) which output optical signals (input optical signals) of different wavelengths λ1 to λn (n is a natural number). and a plurality of optical signal input lines 12-1 to 12-N for transmitting the optical signals of the different wavelengths from the optical signal sources 11-1 to 11-N, respectively.

The multi-wavelength optical batch amplification apparatus further includes a wavelength multiplexing (WDM) wave combiner 13, two couplers (CPL) 14 and 18, an isolator (ISO) 15, an erbium doped fiber (EDF) optical amplifier 16, a wave combiner 17 and an optical signal output line 20 which transmits an output optical signal amplified in a batch by the EDF optical amplifier 16.

The multi-wavelength optical batch amplification apparatus further includes a photodiode (PD) 21, a laser diode (pumping laser diode (LD)) 22, a tunable optical filter 23, an amplification section 25 for amplifying an electric signal output of the photodiode 21 to a required signal level, and a control section 27.

Then, also in the multi-wavelength optical batch amplification apparatus shown in FIG. 27, an individual input light detection section (means) 28C for monitoring the powers of input optical signals of the wavelengths λ1 to λn on the input side of the EDF optical amplifier 16 is formed from the tunable optical filter 23, the photodiode 21 and the amplification section 25. It is to be noted that the multi-wavelength optical batch amplification apparatus in the present embodiment does not include means for monitoring output optical signals on the output side of the EDF optical amplifier 16.

Thus, the control section 27 in the present embodiment includes, as seen in FIG. 27, an automatic power control (APC) circuit 271C and an optical signal identification section 272C.

The APC circuit 271C controls the pumping light output power of the pumping laser diode 22 to a fixed value. The optical signal identification section 272C detects, from input optical signals of the individual wavelengths λ1 to λn which have transmitted through the tunable optical filter 23 of the individual input light detection section 28C, number information of the input optical signals.

Figure 28:
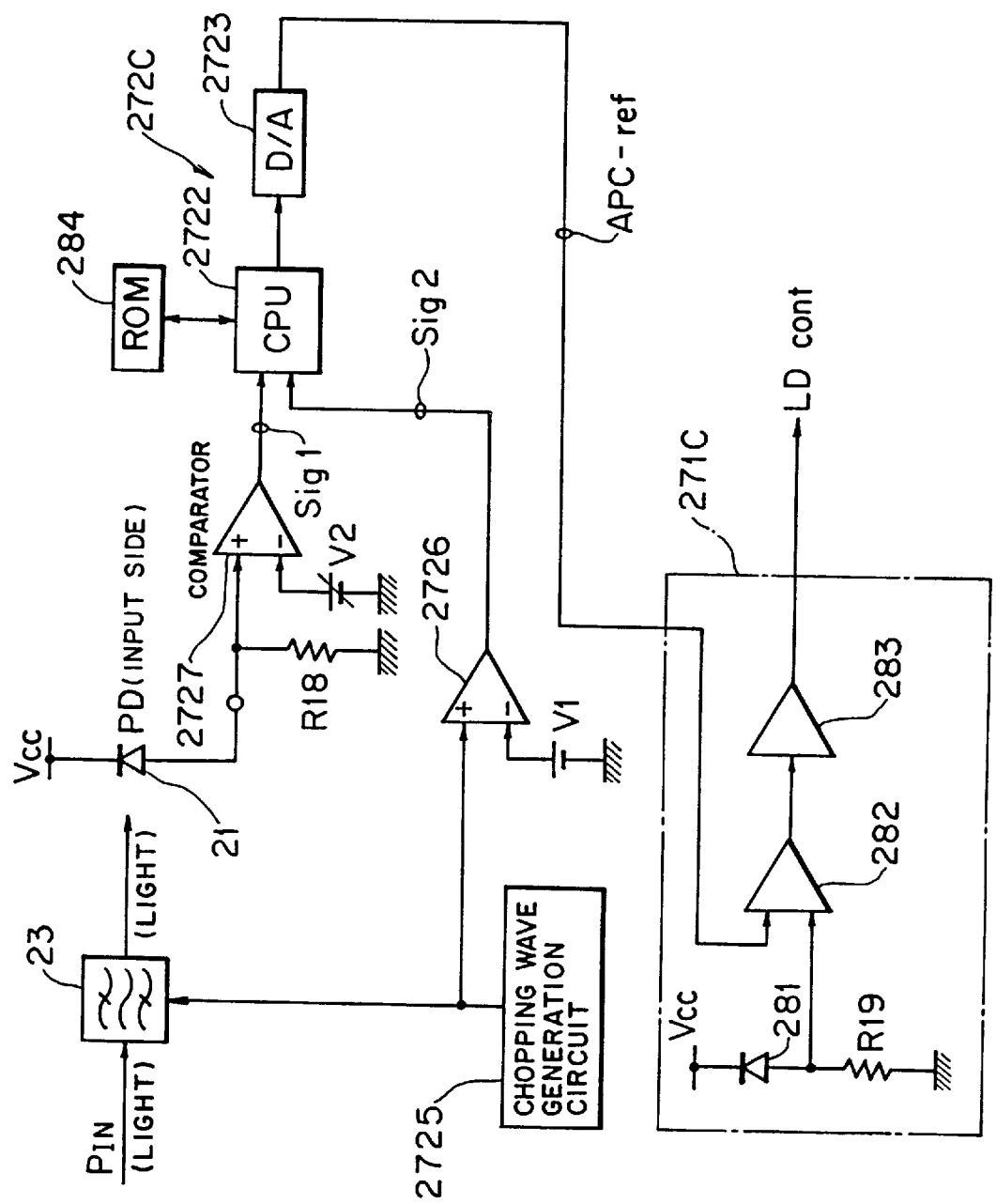
FIG. 28 is a block diagram showing a detailed construction of an optical signal identification section of the multi-wavelength optical batch amplification apparatus of FIG. 27.

Referring to FIG. 28, the APC circuit 271C includes a photodiode (PD) 281, a comparator 282 and an amplifier 283. Meanwhile, the optical signal identification section 272C includes a CPU 2722, a D/A converter 2723, a chopping wave generation circuit 2725, two comparators 2726 and 2727, a read only memory (ROM) 284 and a resistor R18.

In the APC circuit 271C, the comparator 282 compares a control voltage (APC-ref) from the optical signal identification section 272C, which will be described below, with a reference voltage produced by the photodiode (PD) 281 and the resistor R19 to produce and output a control voltage for the pumping laser diode 22. The amplifier 283 amplifies the output of the comparator 282 to a desired voltage value.

On the other hand, in the optical signal identification section 272C, also the chopping wave generation circuit 2725 in the present embodiment generates a chopping wave which exhibits a maximum voltage value V1, for example, after each time period t1 as described hereinabove with reference to FIG. 9(*a*) and outputs the chopping wave as an application voltage Vfil to the tunable optical filter 23 and as an applied voltage to the comparator 2726. The comparator 2726 compares the output voltage of the chopping wave generation circuit 2725 with another reference voltage V2 and outputs a pulse signal Sig1 (refer to FIG. 9(*b*)) which exhibits a "H" level each time the output voltage of the chopping wave generation circuit 2725 exhibits a higher value than the reference voltage V1.

The comparator 2727 compares the voltage of an input optical signal obtained by photoelectric conversion by the photodiode 21 on the input side with the reference voltage V2 and outputs a pulse signal Sig2 (refer to FIG. 9(*b*)) which exhibits a "H" level pulse each time the total power of the input optical signals becomes higher than the reference voltage V2. When a "H" level pulse is outputted from the comparator 2727, it is recognized by the CPU 2722 that the level of some of the input optical signals has dropped (including an interruption condition).

The CPU 2722 detects number information of the input optical signals based on the outputs of the comparators 2726 and 2727 and outputs a voltage corresponding to the number information as a control voltage (APC-ref) for the APC circuit 271C in the form of a digital amount. The D/A converter 2723 converts the control voltage (APC-ref) in the form of a digital amount from the CPU 2722 into an analog signal and outputs the analog signal to the APC circuit 271C.

The ROM 284 stores data to be used for processing performed by the CPU 2722.

In the multi-wavelength optical batch amplification apparatus of the present embodiment having the construction described above, when input optical signals of different wavelengths $\lambda 1$ to $\lambda n$ from the optical signal sources 11-1 to 11-N are amplified in a batch by the EDF optical amplifier 16, a multi-wavelength input optical signal branched by the coupler 14 is inputted to the tunable optical filter 23. The thus inputted optical signal is transmitted through the tunable optical filter 23 for the individual wavelengths $\lambda 1$ to $\lambda n$ in response to an application voltage Vfil received from the chopping wave generation circuit 2725 of the optical signal identification section 272C. Then, the input optical signals of the multi-wavelength optical signal having transmitted through the tunable optical filter 23 are converted into electric signals corresponding to the powers of the input optical signals for the individual wavelengths $\lambda 1$ to $\lambda n$ by the photodiode 21 and outputted to the control section 27.

Further, in the optical signal identification section 272C of the control section 27, the CPU 2722 counts the number of pulses of the pulse signal Sig1 within one period (t1) of the pulse signal Sig2 to obtain number information of the input optical signals. Then, the CPU 2722 outputs a voltage value of a control voltage in the form of a digital signal for controlling the power per one wavelength to a desired level in response to the number information.

The digital signal is converted into a voltage value in the form of an analog amount by the D/A converter 2723 and outputted as a control voltage (APC-ref) for the APC circuit 271C. In the APC circuit 271C, the control voltage (APC-ref) is outputted to the pumping laser diode 22 by way of the comparator 282 and the amplifier 283.

As a result, the APC circuit 271C adjusts the pumping light output power of the pumping laser diode 22 to control (feedforward control) the power per one wavelength of the component optical signals of the output optical signal so that it may be fixed on the output side of the EDF optical amplifier 16.

In this manner, with the multi-wavelength optical batch amplification apparatus of the present embodiment, when input optical signals of different wavelengths $\lambda 1$ to $\lambda n$ from the optical signal sources 11-1 to 11-N are amplified in a batch by the EDF optical amplifier 16 to obtain an output optical signal, the input optical signals can be monitored for the individual wavelengths $\lambda 1$ to $\lambda n$ on the input side of the EDF optical amplifier 16 by the individual input light detection section 28C and the control section 27 can control the pumping laser diode 22 based on control information (the number information of the input optical signals and so forth) for the control section 27 obtained by the individual input light detection section 28C.

Accordingly, the power of the output optical signal on the output side of the EDF optical amplifier 16 can be controlled so that it may be fixed equally for the individual wavelengths $\lambda 1$ to $\lambda n$. Consequently, even if the power of an optical signal of some wavelength from among the input optical signals of the different wavelengths $\lambda 1$ to $\lambda n$ in a multiplexed combined condition drops, the power of the output optical signal on the output side of the EDF optical amplifier 16 can be controlled so that it may be fixed equally for the individual wavelengths $\lambda 1$ to $\lambda n$.

Further, in the present embodiment, since the individual input light detection section 28C for monitoring input optical signals for the individual wavelengths $\lambda 1$ to $\lambda n$ is provided only on the input side of the EDF optical amplifier 16, the power per one wavelength of the wavelengths $\lambda 1$ to $\lambda n$ can be obtained and the power of the output optical signal can be controlled so that it may be fixed equally for the individual wavelengths $\lambda 1$ to $\lambda n$ with a very simple construction.

Figure 29:
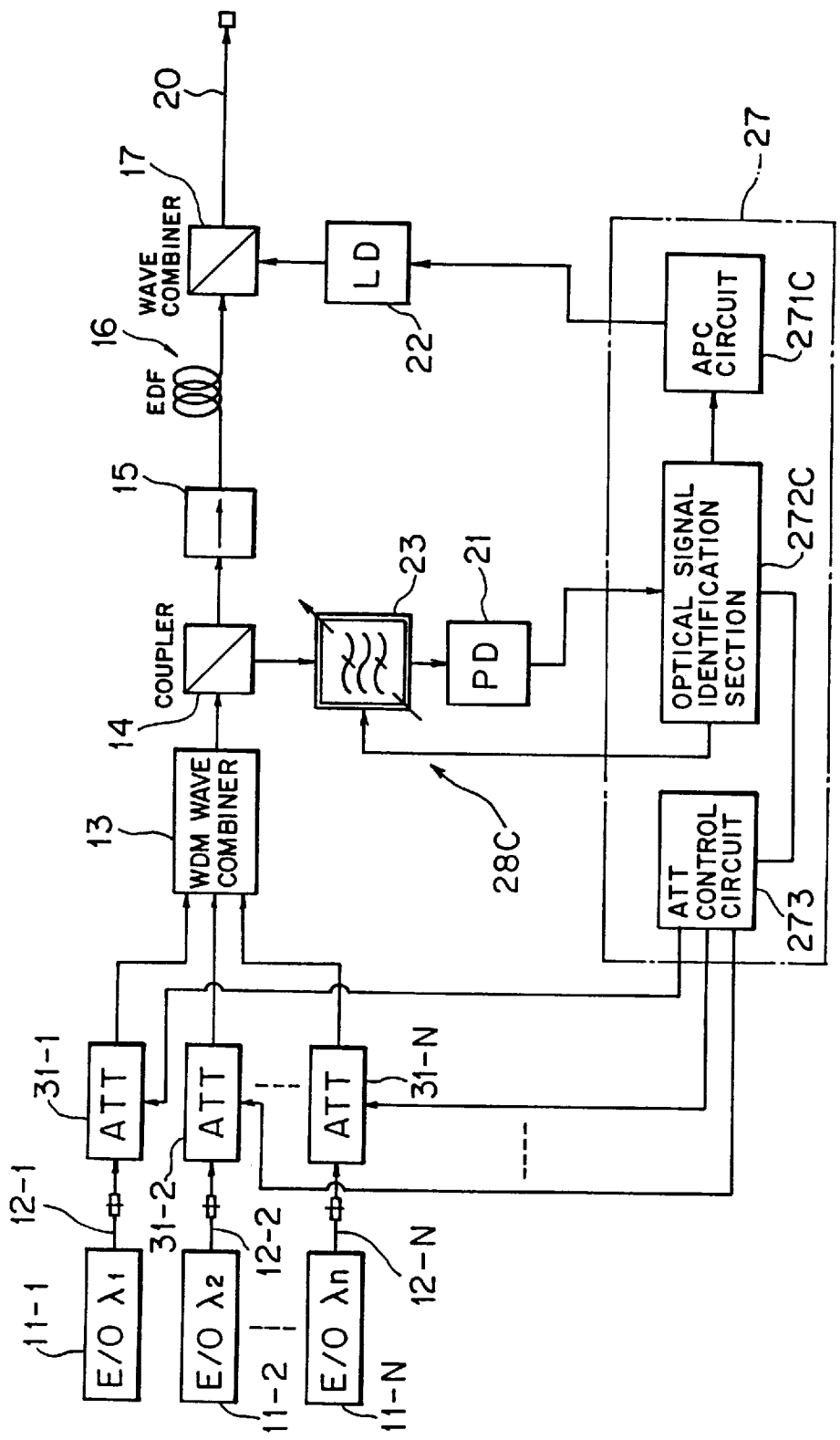
FIG. 29 is a block diagram showing a modified construction of the multi-wavelength optical batch amplification apparatus of FIG. 27.

Also the multi-wavelength optical batch amplification apparatus of the present embodiment may be modified, similarly as described hereinabove in connection with the first to third embodiments, in such a manner as seen in FIG. 29. Referring to FIG. 29, the modified multi-wavelength optical batch amplification apparatus shown includes variable optical attenuators (ATT: optical amplifier output adjustment means) 31-1 to 31-N provided for the individual optical signal input lines 12-1 to 12-N, and the control section 27 controls the pumping laser diode 22 and the variable optical attenuators 31-1 to 31-N based on the power per one wavelength of the wavelengths $\lambda 1$ to $\lambda n$ obtained by the individual input light detection section 28C described above. Also in this instance, the power of the output optical signal on the output side of the EDF optical amplifier 16 can be controlled so that it may be fixed equally for the individual wavelengths $\lambda 1$ to $\lambda n$.

Figure 30:
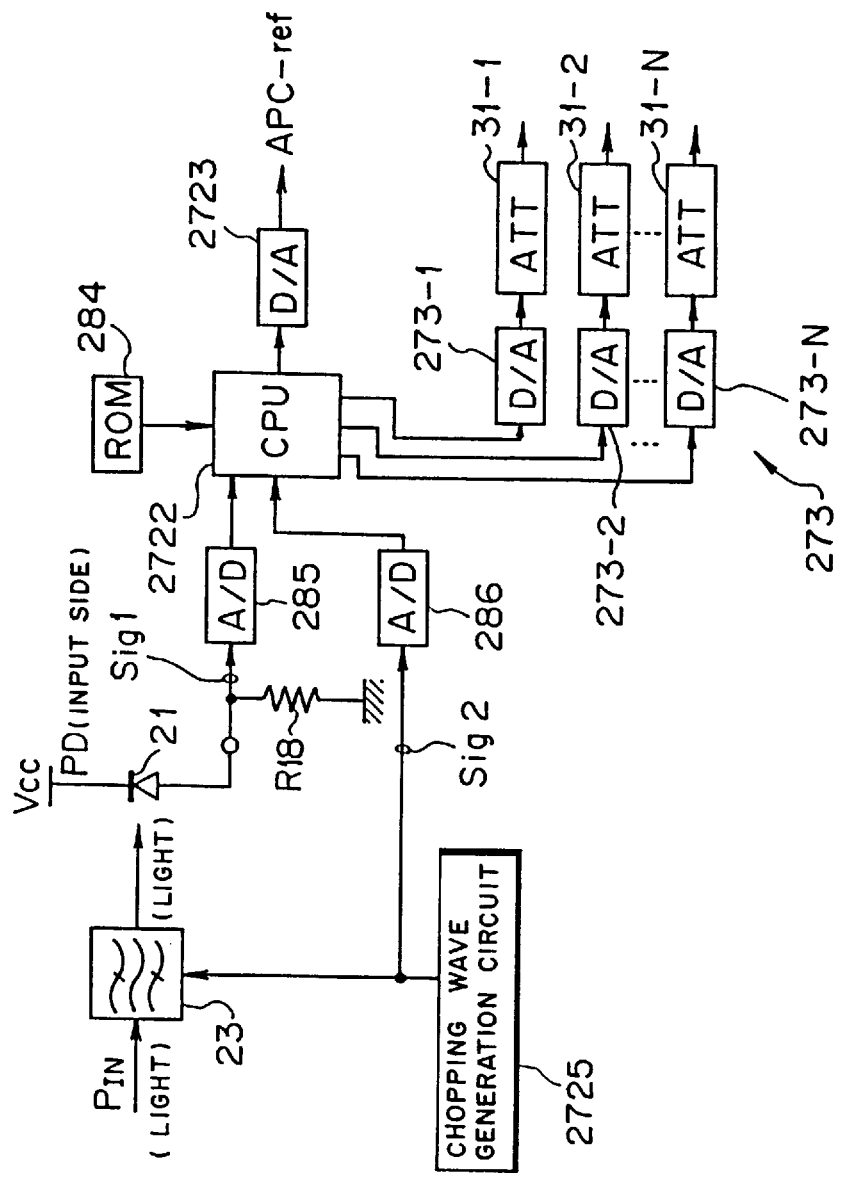
FIG. 30 is a block diagram showing a detailed construction of the optical signal identification section of the multi-wavelength optical batch amplification apparatus of FIG. 29.

In this instance, the control section 27 includes a variable optical attenuator (ATT) control circuit 273. Meanwhile, the optical signal identification section 272C includes, as shown in FIG. 30, a read only memory (ROM) 284, A/D converters 285 and 286, a CPU 2722, a D/A converter 2723, a chopping wave generation circuit 2725 and a resistor R18. The ATT control circuit 273 includes D/A converters 273-1 to 273-N.

Also in the multi-wavelength optical batch amplification apparatus shown in FIG. 29, when input optical signals of different wavelengths $\lambda 1$ to $\lambda n$ from the optical signal sources 11-1 to 11-N are amplified in a batch by the EDF optical amplifier 16, the multi-wavelength input optical signal branched by the coupler 14 is transmitted through the tunable optical filter 23 for the individual wavelengths $\lambda 1$ to $\lambda n$ in response to an application voltage Vfil received from the optical signal identification section 272A and converted into electric signals corresponding to the powers of the input optical signals of the individual wavelengths $\lambda 1$ to $\lambda n$ by the photodiode 21. The electric signals are outputted to the control section 27.

Then, in the optical signal identification section 272C of the control section 27, the CPU 2722 counts the number of pulses of the pulse signal Sig1 within one period (t1) of the pulse signal Sig2 to obtain number information of the input optical signals. Then, the CPU 2722 outputs voltage values of control voltages each in the form of a digital signal for controlling the power per one wavelength to a desired level in accordance with the number information. The digital signals are outputted to the D/A converters 273-1 to 273-N and the D/A converter 2723.

The digital signals are converted into voltage values each in the form of an analog amount by the D/A converters 273-1 to 273-N and the D/A converter 2723 and outputted as control voltages for the variable optical attenuators 31-1 to 31-N and a control voltage (APC-ref) for the APC circuit 271C, respectively.

As a result, the APC circuit 271C adjusts the pumping light output power of the pumping laser diode 22 and adjusts the attenuation factors of the variable optical attenuators 31-1 to 31-N to perform feedforward control of the powers of the output optical signals of the individual wavelengths λ1 to λn on the output side of the EDF optical amplifier 16 so that they may be fixed equally.

Accordingly, with the multi-wavelength optical batch amplification apparatus described above, when input optical signals of different wavelengths λ1 to λn from the optical signal sources 11-1 to 11-N are amplified in a batch by the EDF optical amplifier 16, the input optical signals can be monitored for the individual wavelengths λ1 to λn on the input side of the EDF optical amplifier 16 by the individual input light detection section 28C and the control section 27 can control the pumping light output power of the pumping laser diode 22 and the attenuation factors of the variable optical attenuators 31-1 to 31-N provided for the optical signal input lines 12-1 to 12-N based on the output power per one wavelength of the wavelengths λ1 to λn obtained by the individual input light detection section 28C, respectively.

Accordingly, comparing with an alternative control wherein only the pumping light output power of the pumping laser diode 22 is controlled, the powers of the output optical signal on the output side of the EDF optical amplifier 16 can be controlled with a higher degree of certainty so that it may be fixed equally for the individual wavelengths λ1 to λn. Consequently, even if the power of an optical signal of some wavelength from among the input optical signals of the different wavelengths λ1 to λn drops, the power of the output optical signal on the output side of the EDF optical amplifier 16 can be controlled so that it may be fixed equally for the individual wavelengths λ1 to λn.

Figure 31:
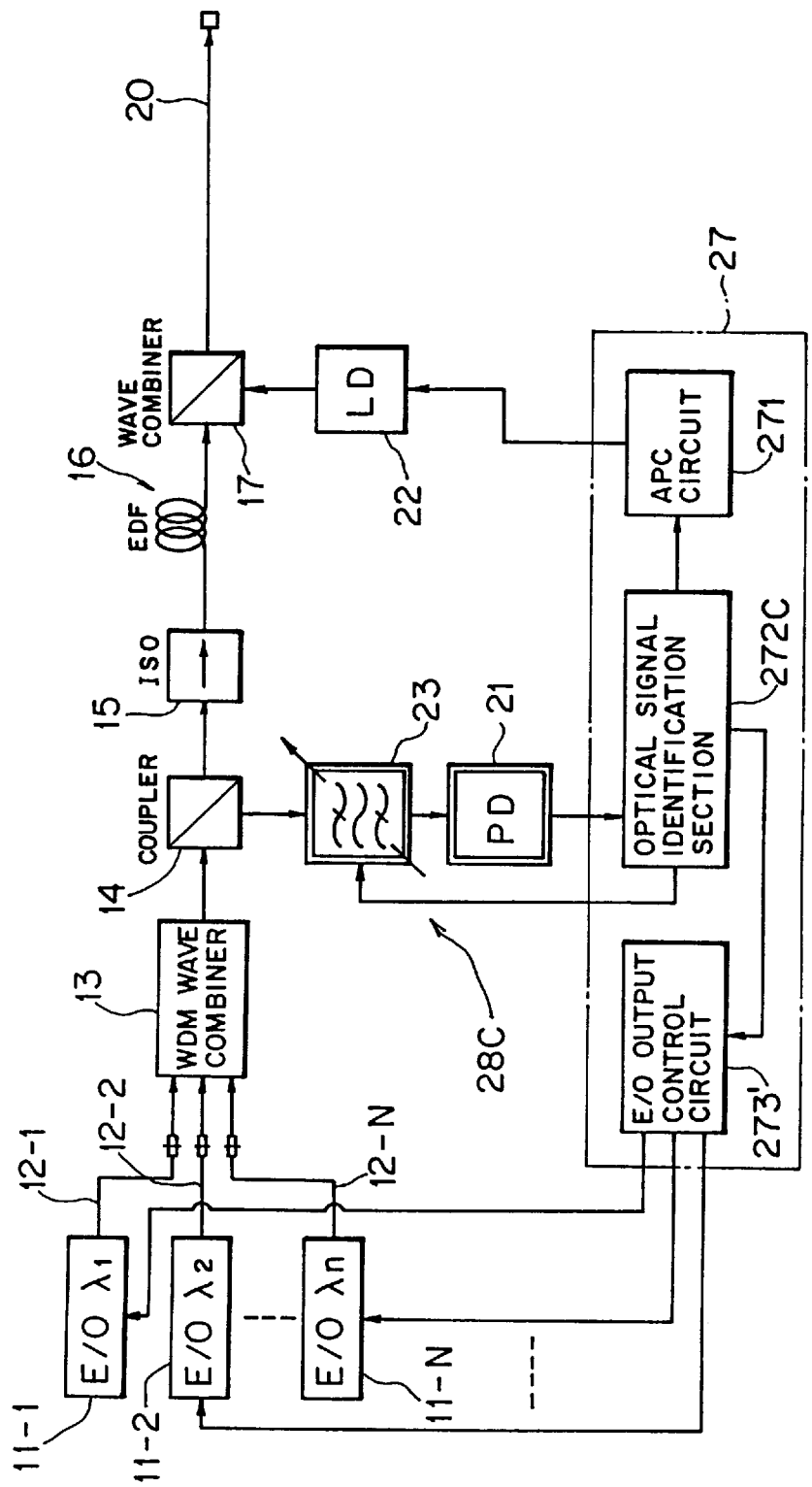
FIGS. 31 and 32 are block diagrams showing different modified constructions of the multi-wavelength optical batch amplification apparatus of FIG. 27.

Further, also the multi-wavelength optical batch amplification apparatus of the present embodiment may be modified, similarly as described hereinabove in connection with the first to third embodiments, in such a manner as seen in FIG. 31. Referring to FIG. 31, in the modified multi-wavelength optical batch amplification apparatus shown, the optical signal sources 11-1 to 11-N are constructed as adjustable output optical signal sources whose outputs are adjustable, and the control section 27 directly controls the outputs of the optical signal sources 11-1 to 11-N based on the output power per one wavelength of the individual wavelengths λ1 to λn obtained by the individual input light detection section 28C. Also in this instance, the powers of the component optical signals of the output optical signal on the output side of the EDF optical amplifier 16 can be controlled so that they may be fixed equally for the individual wavelengths λ1 to λn.

Figure 32:
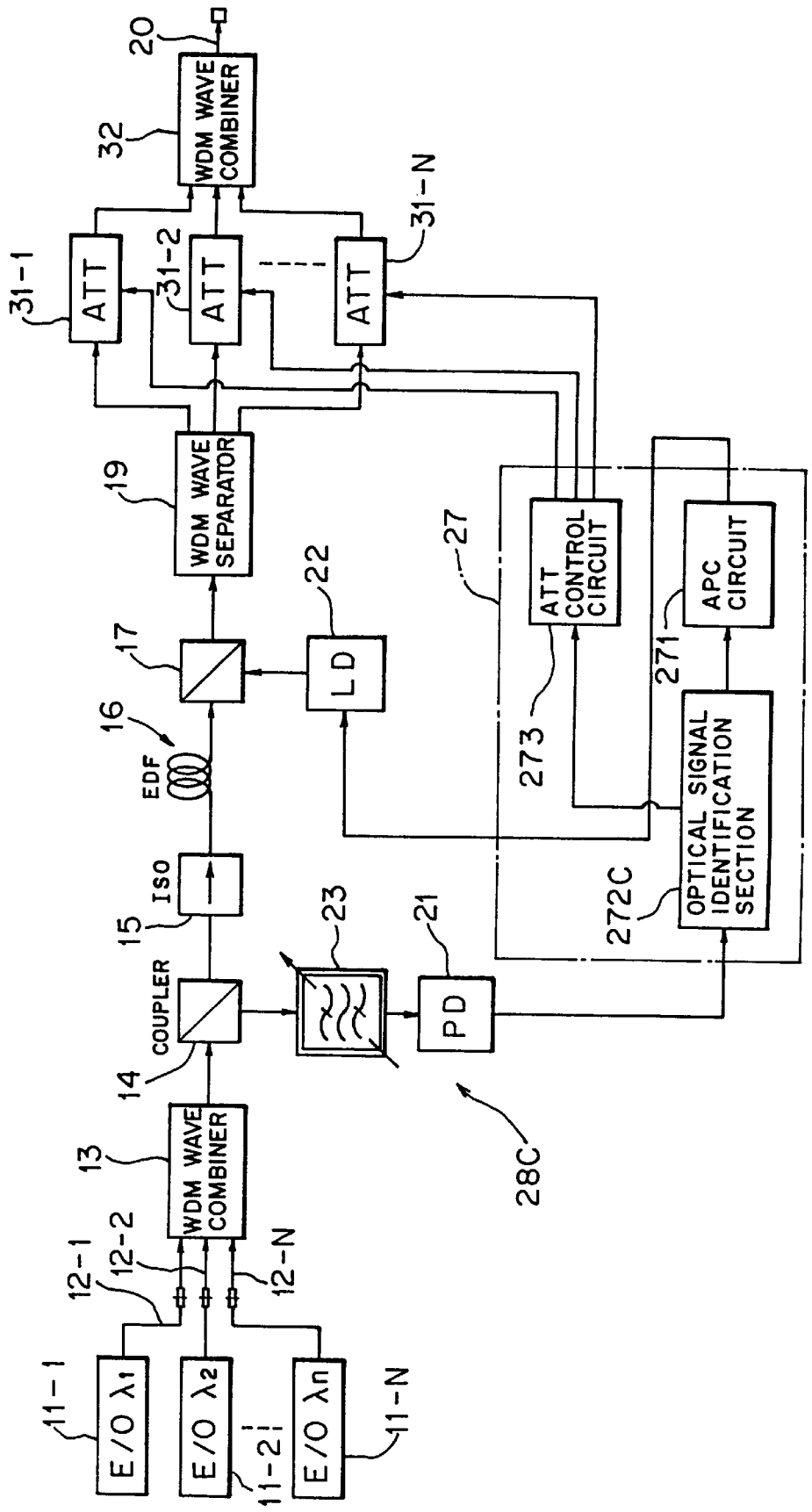
Figure 33:
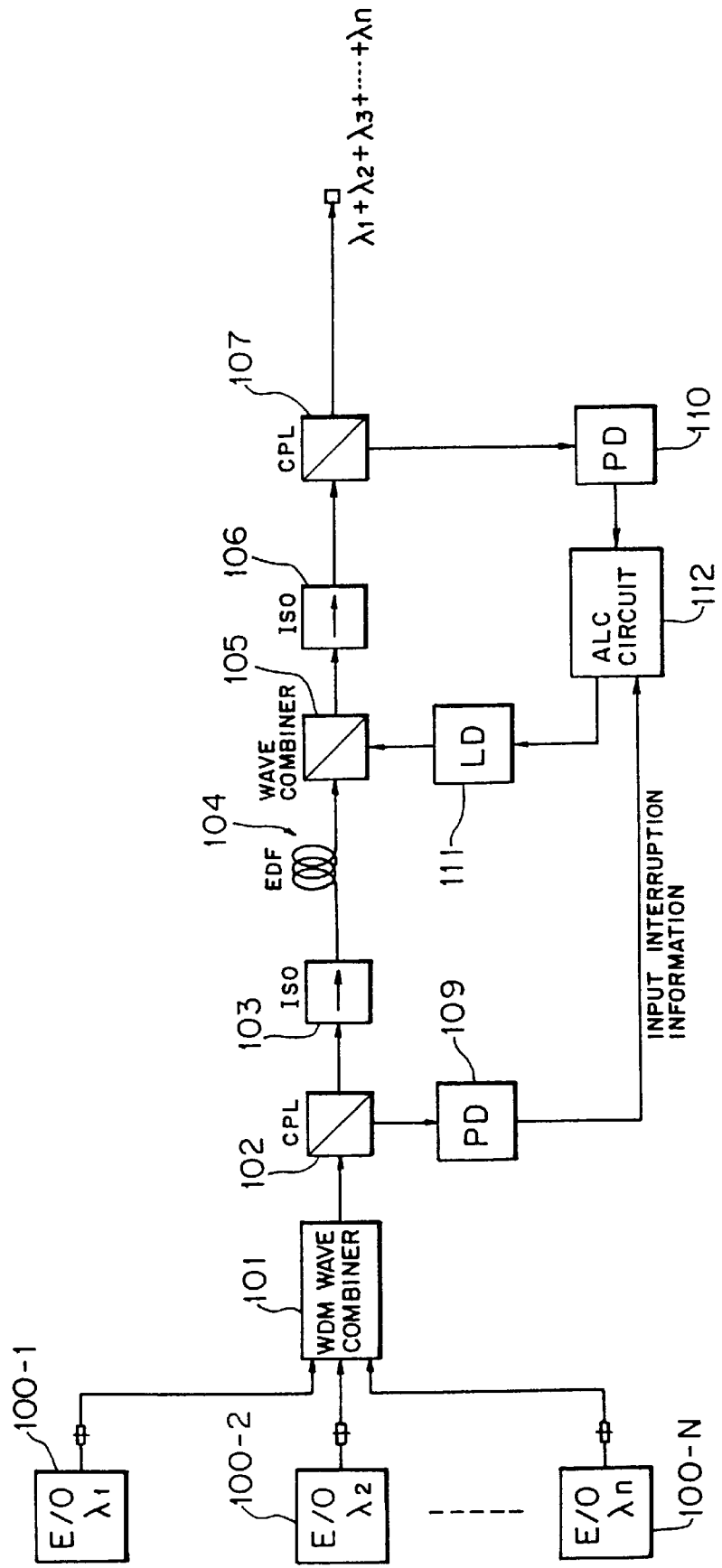
FIG. 33 is a block diagram showing a construction of an ordinary multi-wavelength optical batch amplification apparatus.
Figure 34:
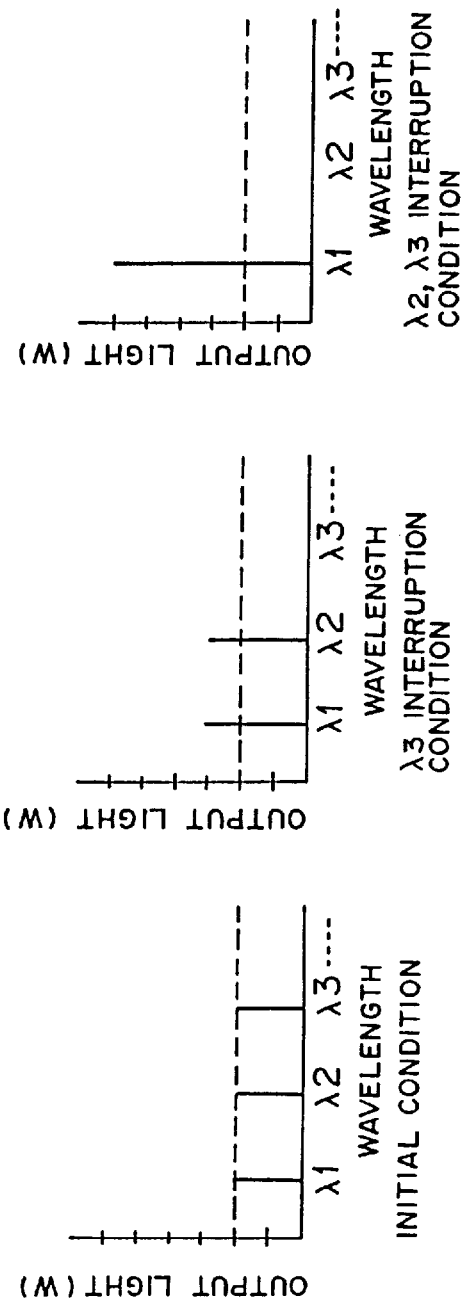
FIGS. 34(a) to 34(c) are diagrams illustrating operation of the multi-wavelength optical batch amplification apparatus of FIG. 33.
Figure 35:
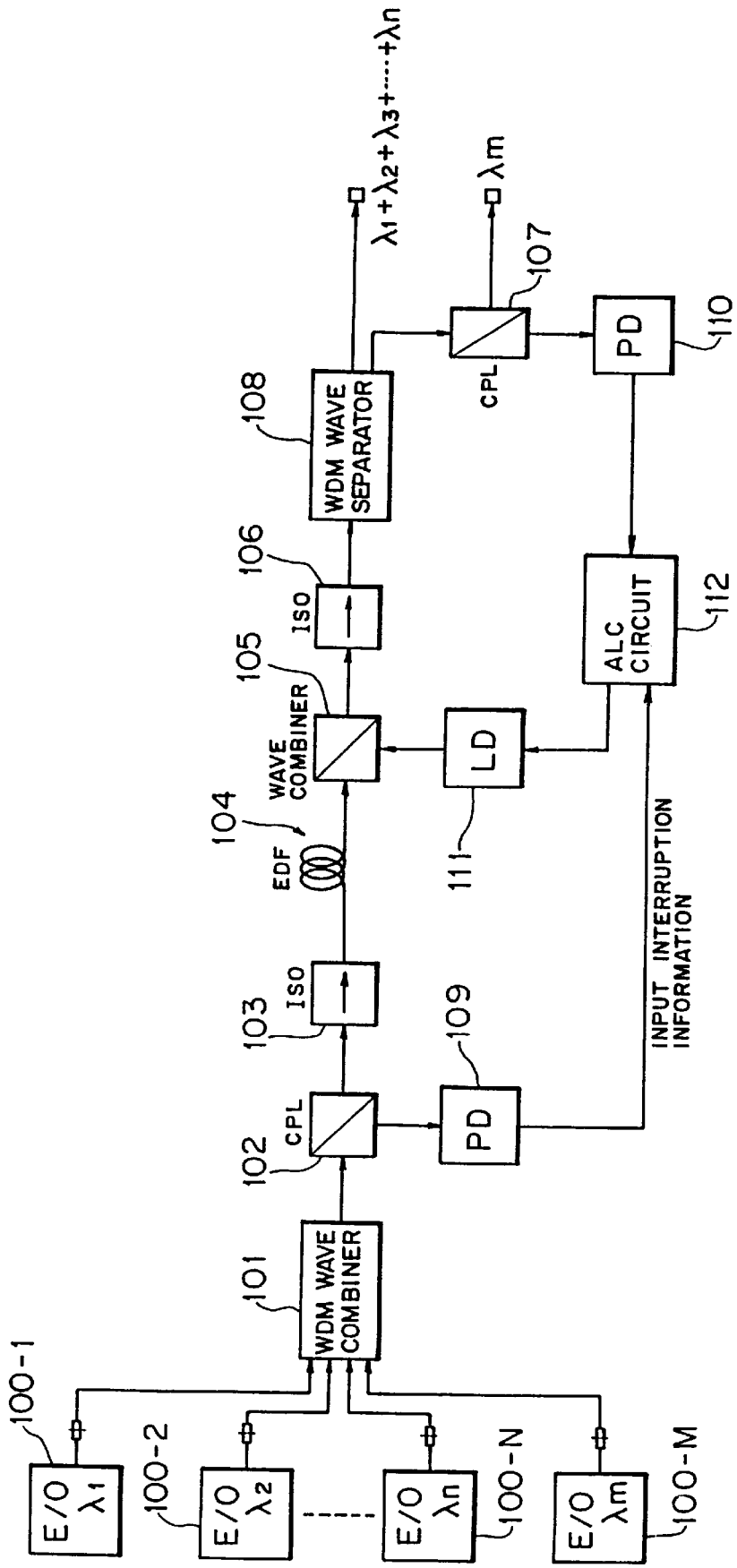
FIG. 35 is a block diagram showing a construction of another ordinary multi-wavelength optical batch amplification apparatus.

The multi-wavelength optical batch amplification apparatus of the present embodiment may be modified otherwise in such a manner as shown in FIG. 32. Referring to FIG. 32, in the modified multi-wavelength optical batch amplification apparatus shown, the variable optical attenuators 31-1 to 31-N described hereinabove are provided for optical output lines of the WDM wave separator 19, and the control section 27 controls the attenuation factors of the variable optical attenuators 31-1 to 31-N based on the output power per one wavelength of the wavelengths λ1 to λn obtained by the individual input light detection section 28C to control the powers of the component optical signals of the output optical signal on the output side so that they may be fixed equally for the wavelengths λ1 to λn in a similar manner as described above.

The present invention is not limited to the specifically described embodiment, and variations and modifications may be made without departing from the scope of the present invention.

What is claimed is:

1. A multi-wavelength optical amplification apparatus, comprising:

a plurality of optical signal sources for outputting a plurality of optical signals having different wavelengths from each other;

a plurality of optical signal input lines for transmitting the optical signals of the different wavelengths from said optical signal sources;

a wave combiner for combining the input optical signals from said optical signal input lines into a multi-wavelength optical signal;

an optical amplifier for amplifying the multi-wavelength optical signal from said wave combiner;

input light detection means for monitoring a power of the multi-wavelength optical signal on the input side of said optical amplifier;

output light detection means for monitoring a power of the output optical signal on the output side of said optical amplifier for the individual different wavelengths;

optical amplifier output adjustment means for adjusting the output of said optical amplifier; and control means for controlling said optical amplifier output adjustment means based on results of detection by said input light detection means and said output light detection means so that the power of the output optical signal on the output side of said optical amplifier may be fixed equally for the individual different wavelengths.

2. A multi-wavelength optical amplification apparatus as claimed in claim 1, wherein said output light detection means includes a tunable optical filter for monitoring the power of the output optical signal on the output side of said optical amplifier for the individual different wavelengths.

3. A multi-wavelength optical amplification apparatus as claimed in claim 1, wherein said output light detection means monitors powers of optical signals separated from the output optical signal on the output side of said optical amplifier.

4. A multi-wavelength optical amplification apparatus as claimed in claim 1, wherein said optical amplifier output adjustment means includes a pumping light source for said optical amplifier, and said control means controls said pumping light source based on the results of detection by said input light detection means and said output light detection means so that the power of the output optical signal on the output side of said optical amplifier may be fixed equally for the individual different wavelengths.

5. A multi-wavelength optical amplification apparatus as claimed in claim 1, wherein said optical amplifier output adjustment means includes optical signal attenuation means provided for said optical signal input lines, and said control means controls said optical signal attenuation means based on the results of detection by said input light detection means and said output light detection means so that the power of the output optical signal on the output side of said optical amplifier may be fixed equally for the individual different wavelengths.

6. A multi-wavelength optical amplification apparatus as claimed in claim 1, wherein said optical signal sources are individually formed as adjustable output optical signal sources which serve also as said optical amplifier output adjustment means, and said control means controls said adjustable output optical signal sources based on the results of detection by said input light detection means and said output light detection means so that the power of the output optical signal on the output side of said optical amplifier may be fixed equally for the individual different wavelengths.

7. A multi-wavelength optical amplification apparatus as claimed in claim 1, wherein said optical amplifier output adjustment means includes a plurality of optical signal attenuation means for individually adjusting attenuation factors of optical signals separated from the output optical signal on the output side of said optical amplifier, and said control means controls said optical signal attenuation means based on the results of detection by said input light detection means and said output light detection means so that the power of the output optical signal on the output side of said optical amplifier may be fixed equally for the individual different wavelengths.

8. A multi-wavelength optical amplification apparatus, comprising:

a plurality of optical signal sources for outputting a plurality of optical signals having different wavelengths from each other;

a plurality of optical signal input lines for transmitting the optical signals of the different wavelengths from said optical signal sources;

a wave combiner for combining the input optical signals from said optical signal input lines into a multi-wavelength optical signal;

an optical amplifier for amplifying the multi-wavelength optical signal from said wave combiner;

input light detection means for monitoring powers of the input optical signals on the input side of said optical amplifier;

output light detection means for monitoring a power of the multi-wavelength optical signal on the output side of said optical amplifier;

optical amplifier output adjustment means for adjusting the output of said optical amplifier; and control means for controlling said optical amplifier output adjustment means based on results of detection by said input light detection means and said output light detection means so that the power of the output optical signal on the output side of said optical amplifier may be fixed equally for the individual different wavelengths.

9. A multi-wavelength optical amplification apparatus as claimed in claim 8, wherein said input light detection means includes a tunable optical filter for monitoring powers of the input optical signals on the input side of said optical amplifier.

10. A multi-wavelength optical amplification apparatus as claimed in claim 8, wherein said input light detection means monitors powers of the input optical signals from said optical signal sources or said optical signal input lines.

11. A multi-wavelength optical amplification apparatus as claimed in claim 8, wherein said optical amplifier output adjustment means includes a pumping light source for said optical amplifier, and said control means controls said pumping light source based on the results of detection by said input light detection means and said entire output light detection means so that the power of the output optical signal on the output side of said optical amplifier may be fixed equally for the individual different wavelengths.

12. A multi-wavelength optical amplification apparatus as claimed in claim 8, wherein said optical amplifier output adjustment means includes optical signal attenuation means provided for said optical signal input lines, and said control means controls said optical signal attenuation means based on the results of detection by said input light detection means and said output light detection means so that the power of the output optical signal on the output side of said optical amplifier may be fixed equally for the individual different wavelengths.

13. A multi-wavelength optical amplification apparatus as claimed in claim 8, wherein said optical signal sources are individually formed as adjustable output optical signal sources which serve also as said optical amplifier output adjustment means, and said control means controls said adjustable output optical signal sources based on the results of detection by said input light detection means and said output light detection means so that the power of the output optical signal on the output side of said optical amplifier may be fixed equally for the individual different wavelengths.

14. A multi-wavelength optical amplification apparatus as claimed in claim 8, wherein said optical amplifier output adjustment means includes a plurality of optical signal attenuation means for individually adjusting attenuation factors of optical signals separated from the output optical signal on the output side of said optical amplifier, and said control means controls said optical signal attenuation means based on the results of detection by said input light detection means and said output light detection means so that the power of the output optical signal on the output side of said optical amplifier may be fixed equally for the individual different wavelengths.

15. A multi-wavelength optical amplification apparatus, comprising:

a plurality of optical signal sources for outputting a plurality of optical signals having different wavelengths from each other;

a plurality of optical signal input lines for transmitting the optical signals of the different wavelengths from said optical signal sources;

a wave combiner for combining the input optical signals from said optical signal input lines into a multi-wavelength optical signal;

an optical amplifier for amplifying the multi-wavelength optical signal from said wave combiner;

input light detection means for monitoring powers of the input optical signals on the input side of said optical amplifier;

output light detection means for monitoring a power of the output optical signal on the output side of said optical amplifier for the individual different wavelengths;

optical amplifier output adjustment means for adjusting the output of said optical amplifier; and control means for controlling said optical amplifier output adjustment means based on results of detection by said input light detection means and said output light detection means so that the power of the output optical signal on the output side of said optical amplifier may be fixed equally for the individual different wavelengths.

16. A multi-wavelength optical amplification apparatus as claimed in claim 15, wherein said input light detection means includes a tunable optical filter for monitoring powers of the input optical signals on the input side of said optical amplifier.

17. A multi-wavelength optical amplification apparatus as claimed in claim 15, wherein said input light detection means monitors powers of the input optical signals from said optical signal sources or said optical signal input lines.

18. A multi-wavelength optical amplification apparatus as claimed in claim 15, wherein said output light detection means includes a tunable optical filter for monitoring powers of the output optical signal on the output side of said optical amplifier for the individual different wavelengths.

19. A multi-wavelength optical amplification apparatus as claimed in claim 15, wherein said output light detection means monitors powers of optical signals separated from the output optical signal on the output side of said optical amplifier.

20. A multi-wavelength optical amplification apparatus as claimed in claim 15, wherein said optical amplifier output adjustment means includes a pumping light source for said optical amplifier, and said control means controls said pumping light source based on the results of detection by said input light detection means and said output light detection means so that the power of the output optical signal on the output side of said optical amplifier may be fixed equally for the individual different wavelengths.

21. A multi-wavelength optical amplification apparatus as claimed in claim 15, wherein said optical amplifier output adjustment means includes optical signal attenuation means provided for said optical signal input lines, and said control means controls said optical signal attenuation means based on the results of detection by said input light detection means and said output light detection means so that the power of the output optical signal on the output side of said optical amplifier may be fixed equally for the individual different wavelengths.

22. A multi-wavelength optical amplification apparatus as claimed in claim 15, wherein said optical signal sources are individually formed as adjustable output optical signal sources which serve also as said optical amplifier output adjustment means, and said control means controls said adjustable output optical signal sources based on the results of detection by said input light detection means and said output light detection means so that the power of the output optical signal on the output side of said optical amplifier may be fixed equally for the individual different wavelengths.

23. A multi-wavelength optical amplification apparatus as claimed in claim 15, wherein said optical amplifier output adjustment means includes a plurality of optical signal attenuation means for individually adjusting attenuation factors of optical signals separated from the output optical signal on the output side of said optical amplifier, and said control means controls said optical signal attenuation means based on the results of detection by said input light detection means and said output light detection means so that the power of the output optical signal on the output side of said optical amplifier may be fixed equally for the individual different wavelengths.

24. A multi-wavelength optical amplification apparatus, comprising:
a plurality of optical signal sources for outputting a plurality of optical signals having different wavelengths from each other;
a plurality of optical signal input lines for transmitting the optical signals of the different wavelengths from said optical signal sources;
a wave combiner for combining the input optical signals from said optical signal input lines into a multi-wavelength optical signal;
an optical amplifier for amplifying the multi-wavelength optical signal from said wave combiner;
input light detection means including a tunable optical filter for monitoring powers of the input optical signals on the input side of said optical amplifier;
optical amplifier output adjustment means for adjusting the output of said optical amplifier; and
control means for controlling said optical amplifier output adjustment means based on results of detection by said input light detection means so that the power of the output optical signal on the output side of said optical amplifier may be fixed equally for the individual different wavelengths.

25. A multi-wavelength optical amplification apparatus as claimed in claim 24, wherein said optical amplifier output adjustment means includes a pumping light source for said optical amplifier, and said control means controls said pumping light source based on the result of detection by said input light detection means so that the power of the output optical signal on the output side of said optical amplifier may be fixed equally for the individual different wavelengths.

26. A multi-wavelength optical amplification apparatus as claimed in claim 24, wherein said optical amplifier output adjustment means includes optical signal attenuation means provided for said optical signal input lines, and said control means controls said optical signal attenuation means based on the result of detection by said input light detection means so that the power of the output optical signal on the output side of said optical amplifier may be fixed equally for the individual different wavelengths.

27. A multi-wavelength optical amplification apparatus as claimed in claim 24, wherein said optical signal sources are individually formed as adjustable output optical signal sources which serve also as said optical amplifier output adjustment means, and said control means controls said adjustable output optical signal sources based on the result of detection by said input light detection means so that the power of the output optical signal on the output side of said optical amplifier may be fixed equally for the individual different wavelengths.

28. A multi-wavelength optical amplification apparatus as claimed in claim 24, wherein said optical amplifier output adjustment means includes a plurality of optical signal attenuation means for individually adjusting attenuation factors of optical signals separated from the output optical signal on the output side of said optical amplifier, and said control means controls said optical signal attenuation means based on the result of detection by said input light detection means so that the power of the output optical signal on the output side of said optical amplifier may be fixed equally for the individual different wavelengths.

29. A multi-wavelength optical amplification apparatus, comprising:
an optical amplifier for amplifying a multi-wavelength optical signal including a plurality of optical signals having different wavelengths from each other;
input light detection means for monitoring a power of the multi-wavelength optical signal on the input side of said optical amplifier;
output light detection means for monitoring a power of the output optical signal on the output side of said optical amplifier for the individual different wavelengths;
optical amplifier output adjustment means for adjusting the output of said optical amplifier; and
control means for controlling said optical amplifier output adjustment means based on results of detection by said input light detection means and said output light detection means so that the power of the output optical signal on the output side of said optical amplifier may be fixed equally for the individual different wavelengths.

30. A multi-wavelength optical amplification apparatus, comprising:
an optical amplifier for amplifying a multi-wavelength optical signal including a plurality of optical signals having different wavelengths from each other;
input light detection means for monitoring a power of the multi-wavelength optical signal on the input side of said optical amplifier;
output light detection means for monitoring a power of the multi-wavelength optical signal on the output side of said optical amplifier;

optical amplifier output adjustment means for adjusting the output of said optical amplifier; and control means for controlling said optical amplifier output adjustment means based on results of detection by said input light detection means and said output light detection means so that the power of the output optical signal on the output side of said optical amplifier may be fixed equally for the individual different wavelengths.

31. A multi-wavelength optical amplification apparatus, comprising:

an optical amplifier for amplifying a multi-wavelength optical signal including a plurality of optical signals having different wavelengths from each other;

input light detection means for monitoring powers of the optical signals on the input side of said optical amplifier;

output light detection means for monitoring a power of the output optical signal on the output side of said optical amplifier for the individual different wavelengths;

optical amplifier output adjustment means for adjusting the output of said optical amplifier; and control means for controlling said optical amplifier output adjustment means based on results of detection by said input light detection means and said output light detection means so that the power of the output optical signal on the output side of said optical amplifier may be fixed equally for the individual different wavelengths.

32. A multi-wavelength optical amplification apparatus, comprising:

an optical amplifier for amplifying a multi-wavelength optical signal including a plurality of optical signals having different wavelengths from each other;

input light detection means including a tunable optical filter for monitoring powers of the optical signals on the input side of said optical amplifier;

optical amplifier output adjustment means for adjusting the output of said optical amplifier; and control means for controlling said optical amplifier output adjustment means based on a result of detection by said input light detection means so that the power of the output optical signal on the output side of said optical amplifier may be fixed equally for the individual different wavelengths.

* * * * *